US006256600B1

(12) United States Patent
Bolton et al.

(10) Patent No.: US 6,256,600 B1
(45) **Date of Patent: *Jul. 3, 2001**

(54) PREDICTION AND OPTIMIZATION METHOD FOR HOMOGENEOUS POROUS MATERIAL AND ACCOUSTICAL SYSTEMS

(75) Inventors: John Stuart Bolton, West Lafayette, IN (US); Heng-Yi Lai, Vernon, CT (US); Jonathan H. Alexander, Roseville, MN (US); Srinivas Katragadda, West Lafayette, IN (US)

(73) Assignees: 3M Innovative Properties Company, St. Paul, MN (US); Purdue Research Foundation, West Lafayette, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/858,514

(22) Filed: May 19, 1997

(51) Int. Cl.[7] .............................. G06F 9/455; G06G 7/48

(52) U.S. Cl. ........................................ 703/6; 703/1; 703/2

(58) Field of Search ............................ 364/578; 395/500, 395/500.27, 500.28, 500.3, 500.31; 73/597; 257/40; 521/64; 428/601

(56) References Cited

U.S. PATENT DOCUMENTS

| | | | | |
|---|---|---|---|---|
| 5,048,340 | * | 9/1991 | Thompson et al. | 73/597 |
| 5,298,694 | | 3/1994 | Thompson et al. | 181/286 |
| 5,527,387 | | 6/1996 | Anderson et al. . | |
| 5,586,646 | * | 12/1996 | Kossovsky et al. | 257/40 |
| 5,633,291 | * | 5/1997 | Dyer et al. | 521/64 |
| 5,681,661 | * | 10/1997 | Kelly | 428/601 |

OTHER PUBLICATIONS

Hamilton and Hayward, Finite Element Modelling of 1–3 Composite Transducers for Underwater Applications, 7/93, pp. 1113–1116.*

Ledbetter and Dunn, Microstructure and Elastic–Constant Measurement of Two–Phase Materials, 1995, pp. 625–634.*

Newnham nad Shrout, Acoustic Properties of Particle/Polymer Composites for Transducer Backing Applications, 7/89 pp. 713–716.*

(List continued on next page.)

*Primary Examiner*—Kevin J. Teska
*Assistant Examiner*—Samuel Broda
(74) *Attorney, Agent, or Firm*—James A. Rogers

(57) ABSTRACT

A computer controlled method for predicting acoustical properties for a generally homogeneous porous material includes providing at least one prediction model for determining one or more acoustical properties of homogeneous porous materials, providing a selected prediction model for use in predicting acoustical properties for the generally homogeneous porous material, and providing an input set of at least microstructural parameters corresponding to the selection model. One or more macroscopic properties for the homogeneous porous material are determined based on the input set of the microstructural parameters and acoustical properties for the homogeneous porous material are generated as a function of the one or more macroscopic properties and the selected prediction model. Such a prediction method may be used to predict acoustical properties for a generally homogeneous limp fibrous material with use of a flow resistivity model for predicting flow resistivity of homogeneous limp fibrous materials based on an input set of microstructural parameters. Another computer controlled method for predicting acoustical properties of multiple component acoustical systems is provided which uses a transfer matrix process for determining acoustical properties of the system based at least in part on microstructural inputs provided for one or more components of the acoustical system.

48 Claims, 20 Drawing Sheets

OTHER PUBLICATIONS

Biot, M.A., "General Solutions of the Equations of Elasticity and Consolidation for a Porous Material", *Journal of Applied Mechanics*, 23, pp. 91–96 (1956A).

Davies, C.N., *Air Filtration*, Academic Press, New York, NY, table of contents and pp. 35–36 (1973).

Delany, M.E. and Bazley, E.N., "Acoustical Characteristics of Fibrous Absorbent Materials", *National Physical Laboratories Aerodynamics Division Report*, AC 37 (1996).

Pich, J., *Theory of Aerosal Filtration by Fibrous and Membrane Filters*, Academics Press, London and New York, chapter IX (copyright 1966, reprinted 1977).

Ingard, *Notes On Sound Absorption Technology*; Noise Control Foundation: Poughkeepsie, NY; 1994.

Katragadda et al., "A model for sound absorption by and sound transmission through limp fibrous layers", abstract of presentation at ASA/Acoustical Society of America, St. Louis, MO (Oct. 1995).

Allard, *Propagation of Sound in Porous Media: Modelling Sound Absorbing Materials*, cover title pg. and table of contents, Elsevier Science Publishers ltd., NY, 6 pages (1993).

Attenborough, "Acoustical Characteristics of Porous Materials, " *Physics Reports 82*: 179–227 (1982).

Beranek, "Acoustical Properties of Homogeneous, Isotropic Rigid Tiles and Flexible Blankets," *Journal of the Acoustical Society of America* 19:556–568 (1947).

Bies et al., "Flow Resistance Information For Acoustical Design," *Applied Acoustics*13:357–391 (1980).

Biot, "The Elastic Coefficients of the Theory of Consolidation," *Journal of the Applied Mechanics* 24:594–601 (1957).

Biot, "Theory of Propagation of Elastic Waves in a Fluid–Saturated Porous Solid. I. Low Frequency Range. II. Higher Frequency Range," *Journal of the Acoustical Society of America* 28:168–191 (195B).

Bolton et al., "Sound Transmission Through Multi–Panel Structures Lined With Elastic Porous Materials," *Journal of Sound and vibration* 191:317–347 (1996).

Bolton et al., "Normal Incidence Sound Transmission through Double–Panel System Lined with Relatively Stiff, Partially Reticulated Polyurethane Foam," Applied Acoustics 39:23–51 (1993).

Crandall, *Theory of Vibrating Systems and Sound* Appendix A, Van Nostrand Company, NY, 229–241 (1927).

Davies, "The Separation of Airborne dust and Particles," *Pro. Inst. Mech. Eng.* Institution of Mechanical engineers, London, Proceedings 1B: 185–213 (1952).

Delany et al., "Acoustical Properties of Fibrous Absorbent Materials," *Applied Acoustics 3*:105–116 (1970).

Dunn et al., "Calculation of Acoustic Impedance of Multi–layer Absorbers," *Applied Acoustics 19*: 321–334 (1986).

Gardner et al., "Rdiation efficiency calculation for verification of boundary elemant acoustic codes," *Noise Control Eng. J. 44*: 215–223 (1996).

Göransson, "A Weighted Residual Formation of the Acoustic Wave Propagation Through Flexible Porous Material and a Comparison with a Limp Material Model," *Journal of Sound and Vibration 182*:479–494 (1995).

Hamilton et al., *Finite Element Modelling of 1–3 Composite Transducers for Underwater Application*, 1113–1116 (1993).

Happel, "Viscous Flow Relative to Arrays of Cylinders," *A. I. Ch. E. Journal 5*:174–177 (1959).

Ingard, "Locally and Nonlocally Reacting Flexible Porous Layers; A Comparison of Acoustical Properties," *Journal of Engineering for Industry–Transaction of the ASME, 103*:302–313 (1981).

Ingard et al., "Measurement of Acoustic Flow Resistance," *Journal of Sound and Vibration 103*:567–572 (1985).

Ingard, *Notes onSound Adsorption Technology*, Version 94–02, published and distributed by Noise Control Foundation, Poughkeepsie, NY (1994).

Kang et al., "A Finite Element Model for Sound Transmission Through foam–Lined double–Panel Structures," *J. Acoust. Soc. Am. 99*:2755–2765 (1996).

Kang et al., "Optimal Design of Acoustical Foam Treatment," *Journal of Vibration and Acoustics–Transaction of the ASME 188*:498–504 (1996).

Kang et al., "Sound transmission through elastic porous wedges and foam layers having spatially graded properties," *J. Acoust. Soc. Am. 102*:3319–3332 (1997).

Kang, "studies od Sound Absorption by and Transmission Through Layers of Elastic Noise Control Foams: Element Modeling and Effects of Anisotropy," Ph.D Thesis, title page and table of contents, School of Mechanical Engineering, Purdue University, 4 pages (1994).

Katragadda et al., "A model for sond adsorption by and sound transmission through limp fibrous layers," abstract of presentation at ASA/Acoustical Socity of America, St. Louis, MO (1995).

Kawasima, "Sound Propagation In a fibre Block as a Composite Medium," *Acoustica 10*:208–217 (1996).

Kosten et al., "Acoustic Properties of Flexible and Porous Materials," *Acoustica 7*:372–378 (1957).

Kuwabara, "The Forces Experienced by Randomly Distributed Parallel Circular cylinders or Spheres in Viscous Flow at Small Reynolds Numbers," *Journal of the Physical Society of Japan 14*:527–532 (1959).

Ledbetter et al., Microstructure and Elastic–Contant Meausrement of Two–Phase Materials, 625–634 (1995).

Monna, "Absorption of Sound by Porous Walls," *Physica* 5:129–142 (1938).

Morse et al., "Sound Waves in Rooms," *Reviews of Modern Physics 16*:69–150 (1944).

Mullholland et al., "The Transmission Loss of Double Panels," *J. Sound Vib. 6*:324–334 (1967).

Newnham et al., Acoustical properties of Particle/Polymer Composites for Transducer Backing Applications 713–716 (1989).

Nichols Jr., "Flow–Resistance Characteristics of Fibrous Acoustical Materials," *Journal of the Acoustical Society of America 19*:866–871 (1947).

Pierce, *Acoustics: An Introduction to Its Physical Principles and Applications*, cover, title page and table of contents, New York: McGraw–Hill 6 pages (1981).

Shiau, "Multi–Dimensional Wave Propagation In Elastic Porous Materials With Application To Sound Absorption, Transmission and Impedance Measurement," Ph.D. Thesis, title page and table of contents, School of Mechanical Engineering, Purdue University, 5 pages (1991).

Sides et al., "Application of a Generalized Acoustic Propagation Theory to Finrous Absorbents," *Journal of Sound and Vibration 19*:49–64 (1971).

Smith et al., "Theory of Acoustical Wave Propagation in Porous Media," *Journal of the Acoustical society of America 52*:247–253 (1972).

Strutt et al., *Theory of Sound 2*, Article 351, 2nd Edition, dover Publication, NY 328–333 (1945).
Voronia, "Acoustic Properties of Fibrous Materials," *Applied Acoustics 42*:165–174 (1994).
Kang, "Studies of Sound Adsorption by and Transmission Through Layers of Elastic Noise Control Foams: Finite Element Modeling ad Effects of Anisotropy," Ph.D. Thesis, School of Mechanical engineering, Purdue University (1974).
Shiau, "Multi–Dimensional Wave Propagation In Elastic Porous Materials With Applications To Sound Adsorption, Transmission and Impedance Measurement," Ph.D. Thesis, School of Mechanical Engineering, Purdue University (1991).
Woodcock et al., "Acoustic Method For Determining the Effective FLow Resistivity of Fibrous Materials," *Journal of Sound and Vibration 153*:186–191 (1992).
Zwikker et al., *Sound Absorbing Materials*, cover pr. preface and table of contents, Elsevier Publishing Co., Inc., NY, 4 pages (1949).

Article: R.H. Nichols, "Flow–Resistance characteristics of Fibrous Acoustical Materials," *Journal of the Acoustical Society of America*, vol. 19, No. 5, Sep. 1947, pp. 866–871.

Article: N. Voronina, "Acoustic Properties of Fibrous Materials," *Applied Accoustics*, vol. 42, 1994, pp. 165–174.

Article: P. Göransson, "A Weighted Residual Formulation of the Acoustic Wave Propagation Through a Flexible Porous Material and a Comparison with a Limp Material Model," *Journal of Sound and Vibration*, Vol. 182, No. 3, 1995, pp. 479–494.

* cited by examiner

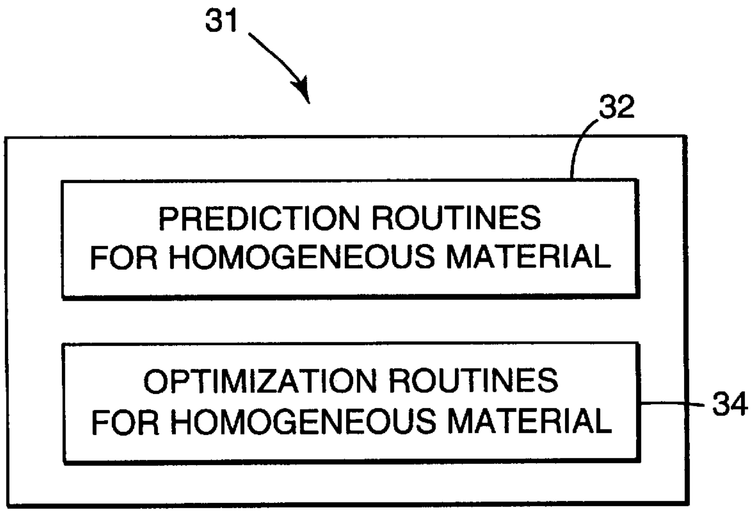
Fig. 3
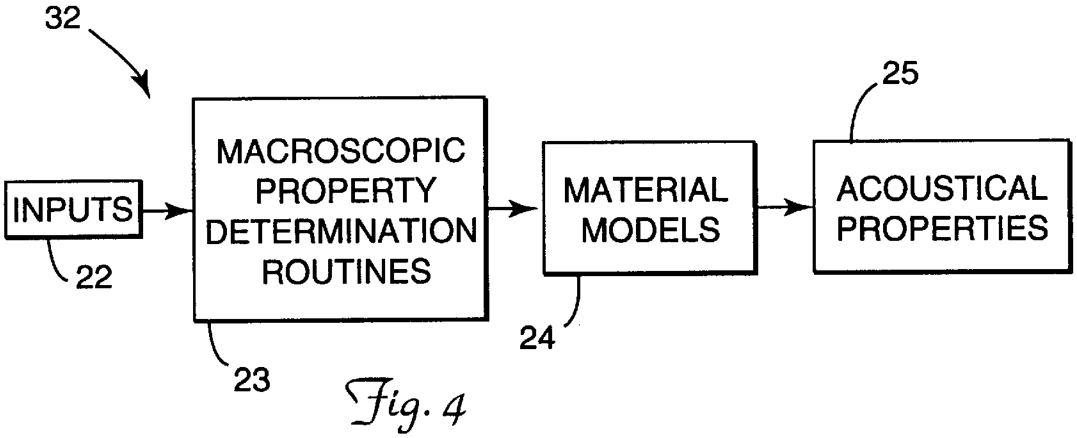
Fig. 4
Fig. 5
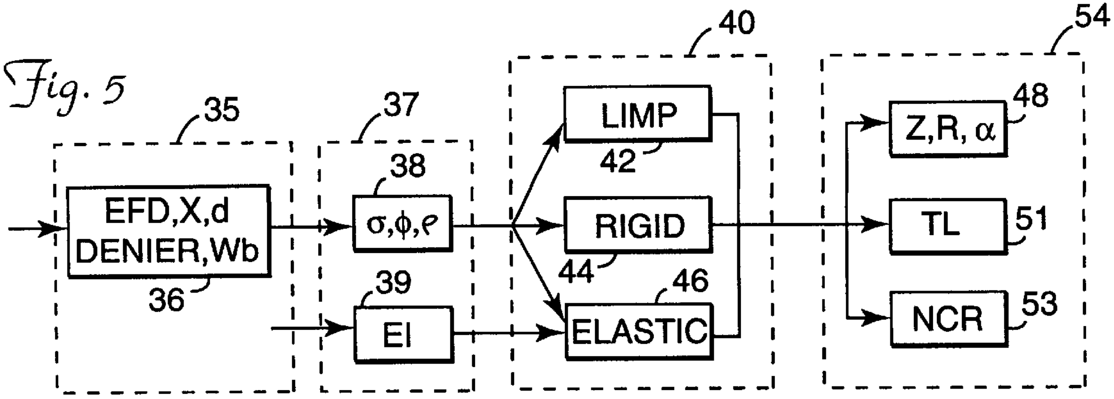

| $\overline{\alpha}/\rho b$ | $\overline{\alpha}$ | $\rho b$ | EFD | Denier | % | d | Wb |
|---|---|---|---|---|---|---|---|
| 0.226167740 | 0.942365583 | 4.1667 | x1 | 2 | 0.1 | 0.06 | 0.25 |
| 0.226166680 | 0.942361168 | 4.1667 | ↑ | 4 | 0.1 | 0.06 | 0.25 |
| 0.226166352 | 0.942359799 | 4.1667 | | 6 | 0.1 | 0.06 | 0.25 |
| 0.226166195 | 0.942359145 | 4.1667 | | 8 | 0.1 | 0.06 | 0.25 |
| 0.226166104 | 0.942358765 | 4.1667 | | 10 | 0.1 | 0.06 | 0.25 |
| 0.226166044 | 0.942358519 | 4.1667 | | 12 | 0.1 | 0.06 | 0.25 |
| 0.226166003 | 0.942358346 | 4.1667 | | 14 | 0.1 | 0.06 | 0.25 |
| 0.226165973 | 0.942358219 | 4.1667 | | 16 | 0.1 | 0.06 | 0.25 |
| 0.222688408 | 0.927868366 | 4.1667 | | 2 | 0.2 | 0.06 | 0.25 |
| 0.222683002 | 0.927845841 | 4.1667 | | 4 | 0.2 | 0.06 | 0.25 |
| 0.222681326 | 0.927838859 | 4.1667 | ↓ | 6 | 0.2 | 0.06 | 0.25 |
| 0.222680525 | 0.927835520 | 4.1667 | x1 | 8 | 0.2 | 0.06 | 0.25 |

Fig. 17A

| $\overline{\alpha}/\rho b$ | $\overline{\alpha}$ | $\rho b$ | EFD | Denier | % | d | Wb |
|---|---|---|---|---|---|---|---|
| 0.158222594 | 0.922965132 | 5.83 | x2 | 2 | 0.1 | 0.060 | 0.35 |
| 0.158219528 | 0.922947249 | 5.83 | ↑ | 4 | 0.1 | 0.060 | 0.35 |
| 0.158218578 | 0.922941708 | 5.83 | | 6 | 0.1 | 0.060 | 0.35 |
| 0.158218124 | 0.922939058 | 5.83 | | 8 | 0.1 | 0.060 | 0.35 |
| 0.158217860 | 0.922937519 | 5.83 | | 10 | 0.1 | 0.060 | 0.35 |
| 0.158217689 | 0.922936520 | 5.83 | | 12 | 0.1 | 0.060 | 0.35 |
| 0.158217569 | 0.922935821 | 5.83 | | 14 | 0.1 | 0.060 | 0.35 |
| 0.158217481 | 0.922935306 | 5.83 | | 16 | 0.1 | 0.060 | 0.35 |
| 0.154556524 | 0.901579722 | 5.83 | | 2 | 0.2 | 0.060 | 0.35 |
| 0.154543268 | 0.901502395 | 5.83 | | 4 | 0.2 | 0.060 | 0.35 |
| 0.154539158 | 0.901478419 | 5.83 | | 6 | 0.2 | 0.060 | 0.35 P |
| 0.154537192 | 0.901466954 | 5.83 | ↓ | 8 | 0.2 | 0.060 | 0.35 |
| 0.154536051 | 0.901460296 | 5.83 | x2 | 10 | 0.2 | 0.060 | 0.35 |

Fig. 17B

PREDICTION AND OPTIMIZATION METHOD FOR HOMOGENEOUS POROUS MATERIAL AND ACCOUSTICAL SYSTEMS

FIELD OF THE INVENTION

The present invention relates to the design of homogeneous porous materials and acoustical systems. More particularly, the present invention pertains to the prediction and optimization of acoustical properties for homogeneous porous materials and multiple component acoustical systems.

BACKGROUND OF THE INVENTION

Different types of materials are used in many applications, such as noise reduction, thermal insulation, filtration, etc. For example, fibrous materials are often used in noise control problems for the purpose of attenuating the propagation of sound waves. Fibrous materials may be made of various types of fibers, including natural fibers, e.g., cotton and mineral wool, and artificial fibers, e.g., glass fibers and polymeric fibers such as polypropylene, polyester and polyethylene fibers. The acoustical properties of many types of materials are based on macroscopic properties of the bulk materials, such as flow resistivity, tortuosity, porosity, bulk density, bulk modulus of elasticity, etc. Such macroscopic properties are, in turn, controlled by manufacturing controllable parameters, such as, the density, orientation, and structure of the material. For example, macroscopic properties for fibrous materials are controlled by the shape, diameter, density, orientation and structure of fibers in the fibrous materials. Such fibrous materials may contain only a single fiber component or a mixture of several fiber components having different physical properties. In addition to the solid phase of the fiber components of the fibrous materials, a fibrous material's volume is saturated by fluid, e.g., air. Thus, fibrous materials are characterized as a type of porous material.

Various acoustical models are available for various materials, including acoustical models for use in the design of porous materials. Existing acoustical models for porous materials can generally be divided into two categories: rigid frame models and elastic frame models. The rigid models can be applied to porous materials having rigid frames, such as porous rock and steel wool. In a rigid porous material, the solid phase of the material does not move with the fluid phase, and only one longitudinal wave can propagate through the fluid phase within the porous materials. Rigid porous materials are typically modeled as an equivalent fluid which has complex bulk density and complex bulk modulus of elasticity. On the other hand, the elastic models can be applied to porous materials whose frame bulk modulus is comparable to that of the fluid within the porous materials, e.g., polyurethane foam, polyimide foam, etc. There are three types of waves that can propagate in an elastic porous material, i.e., two compressional waves and one rotational wave. The motions of the solid phase and the fluid phase of an elastic porous material are coupled through viscosity and inertia, and the solid phase experiences shear stresses induced by incident sound hitting the surface of the material at oblique incidence.

However, such rigid and elastic material models, some of which are described below, do not provide adequate modeling of limp fibrous materials, e.g., limp polymeric fibrous materials such as those comprised of, for example, polypropylene fibers and polyester fibers. The term "limp" as used herein refers to porous materials whose bulk elasticity, in vacuo, of the material is less than that of air.

The acoustical study of porous materials can be found as early as in Lord Rayleigh's study of sound propagation through a hard wall having parallel cylindrical capillary pores as described in Strutt et al., *Theory of Sound,* Vol. II, Article 351, 2$^{nd}$ Edition, Dover Publications, NY (1945). Models based on the assumption that the frame of the porous material does not move with the fluid phase of the porous material are categorized as the rigid frame porous models. Various rigid porous material models have been proposed, including those described in Monna, A. F., "Absorption of Sound by Porous Wall," *Physica* 5, pp. 129–142 (1938); Morse, P. M, and Bolt, R. H., "Sound Waves in Rooms," *Reviews of Modern Physics* 16, pp. 69–150 (1944); and Zwikker, C. and Kosten, C. W., *Sound Absorbing Materials,* Elsevier, N.Y. (1949). These models assumed, similar to Rayleigh's work, that the sound wave propagation within a rigid porous material can be described by using equations of motion and continuity of the interstitial fluid.

Rigid porous materials have also been modeled as an equivalent fluid having complex density, as described in Crandall, I. B., *Theory of Vibrating Systems and Sound,* Appendix A, Van Nostrand Company, NY (1927), and having complex propagation constants when viscous and thermal effects were considered. In Delany, M. E. and Bazley, E. N., Acoustical Characteristics of Fibrous Absorbent Materials," *National Physical Laboratories, Aerodynamics Division Report,* AC 37 (1969) the acoustical properties of rigid fibrous materials were studied differently. As described therein, a semi-empirical model of characteristic impedance and propagation coefficient as a function of frequency divided by flow resistance was established. This model was based on the measured characteristic impedance of fibrous materials having a wide range of flow resistance. In Smith, P. G. and Greenkorn, R. A., "Theory of Acoustical Wave Propagation in Porous Media," *Journal of the Acoustical Society of America,* Vol. 52, pp. 247–253 (1972), the effects of porosity, permeability (inverse of flow resistivity), shape factor and other macrostructural parameters on acoustical wave propagation in rigid porous media were investigated. Further, some rigid porous material theories applied the concept of complex density while others used flow resistance. A comparison of these two approaches was described in Attenborough, K., "Acoustical Characteristics of Porous Materials," *Physics Reports,* 82(3), pp. 179–227 (1982). In summary, the rigid porous material models only allow one longitudinal wave to propagate through the rigid medium and the rigid frame is not excited by the fluid phase within the porous material. Such rigid porous material models do not adequately predict the acoustical properties of limp porous materials.

As opposed to rigid porous models, elastic models of porous materials have also been described. By considering the vibration of the solid phase of a porous material due to its finite stiffness, Zwikker and Kosten arrived at an elastic model taking into account the coupling effects between the solid and fluid phases as described in Zwikker, C. and Kosten, C. W., *Sound Absorbing Materials,* Elsevier, N.Y. (1949). This work was extended by Kosten and Janssen, as described in Kosten, C. W. and Janssen, J. H., "Acoustical Properties of Flexible Porous Materials," *Acoustica* 7, pp. 372–378 (1957), which adapted the expression of complex density given by Crandall (1927) and complex density of air within pores given by Zwikker and Kosten (1949). A model that corrected the error of fluid compression effects in the work of Zwikker and Kosten (1949) and considered the oscillation of solid phase excited by normally incident sound has also been set forth. In this model, a fourth order wave equation indicated that two longitudinal waves can propagate in elastic porous materials as opposed to the single wave in rigid materials. In Shiau, N. M., "Multi-Dimensional Wave Propagation In Elastic Porous Materials With Applications To sound Absorption, Transmission and Impedance Measurement," Ph.D. Thesis, School of Mechanical Engineering, Purdue University (1991), Bolton, J. S., Shiau, N. M., and Kang, Y. J., "Sound Transmission Through Multi-Panel Structures Lined With Elastic Porous Materials," *Journal of Sound and Vibration* 191, pp. 317–347 (1996), and Allard, J. F., *Propagation of Sound in Porous Media: Modeling Sound Absorbing Materials,* Elsevier Science Publishers Ltd., NY (1993) Biot's theory as described in Biot, M. A., "General Solutions of the Equations of Elasticity and Consolidation for a Porous Material," *Journal of Applied Mechanics* 23, pp. 91–96 (1956A); Biot, M. A., "Theory of Propagation of Elastic Waves in a Fluid-Saturated Porous Solid. I. Low Frequency Range. II. Higher Frequency Range," *Journal of the Acoustical Society of America* 28, pp. 168–191 (1956B); and Biot, M. A., "The Elastic Coefficients of the Theory of Consolidation," *Journal of the Applied Mechanics* 24, pp. 594–601 (1957) in the field of geophysics, was adapted to develop elastic porous material models which allow the shear wave propagation through the elastic frame induced by obliquely incident sound to be considered. In these elastic models, the stress-strain relations and equations of motions of solid and fluid phases yield one fourth order equation governing two compressional waves and one second order equation governing one rotational wave.

However, when an acoustical wave propagates in a limp porous material, the vibration of the solid phase is excited only by the viscous and inertial forces through the coupling with the fluid phase. Due to lack of frame stiffness in such limp porous materials, no independent wave can propagate through the solid phase of the limp media. This fact leads to numerical singularities when the bulk stiffness in an elastic model is made small or set equal to zero in an attempt to model a limp porous material. Therefore, the types of waves in a limp material are reduced to only one compressional wave and the elastic models for limp porous materials are not adequate for use in design of limp porous materials.

Limp porous materials have been studied explicitly by a relatively small number of investigators; e.g., Beranek, L. L., "Acoustical Properties of Homogeneous, Isotropic Rigid Tiles and Flexible Blankets," *Journal of the Acoustical Society of America* 19, pp. 556–568 (1947), Ingard, K. U., "Locally and Nonlocally Reacting Flexible Porous Layers: A Comparison of Acoustical Properties," *Transactions of the American Society of Mechanical Engineers, Journal of Engineering for Industry* 103, pp. 302–313 (1985), and Goransson, P., "A Weighted Residual Formulation of the Acoustic Wave Propagation Through Flexible Porous Material and a Comparison with a Limp Material Model," *Journal of Sound and Vibration* 182, pp. 479–494 (1995).

There have also been attempts to develop acoustical models for fibrous materials: e.g., parallel resiliently supported fibers in Kawasima, Y., "Sound Propagation In a Fibre Block as a Composite Medium," *Acustica,* 10, pp. 208–217 (1960), and transversely stacked elastic fibers in Sides, D. J., Attenborough, K., and Mulholland, K. A., "Application of a Generalized Acoustic Propagation Theory to Fibrous Absorbents," *Journal of Sound and Vibration,* 19, pp. 49–64 (1971). The model of Kawasima (1960) results in a set of equations similar to those of Zwikker and Kosten (1949) and thus describe one-dimensional wave propagation in an elastic porous medium. By following this approach, limp materials can only be treated as a special case by setting the elasticity constants equal to zero, which may lead to numerical singularities. The model of Sides, Attenborough and Mulholland (1971) incorporates the Biot (1956B) model, but in a one-dimensional form, and it is assumed that the bulk solid phase has a finite stiffness. Thus, in this model properties of two longitudinal waves within the porous material are governed by a fourth order equation. Again numerical singularities would result if the bulk stiffness of the material were set equal to zero, i.e., if the material were assumed to be limp.

The macroscopic property, flow resistance, used in many of the models as described in the above cited and incorporated references, is one of the more significant properties of fibrous porous materials in determining their acoustical behavior. Therefore, the determination of flow resistance is of significant importance. In Nichols, R. H. Jr., Flow-Resistance Characteristics of Fibrous Acoustical Materials," *Journal of the Acoustical Society of America,* Vol. 19, No. 5, pp. 866–871 (1947), an expression of flow resistance in power law of fiber radius, material thickness and surface density is expressed. The power was determined experimentally and the value varied for different types of construction of the material. Delany and Bazley, in Delany, M. E. and Bazley, E. N., "Acoustical Characteristics of Fibrous Absorbent Materials," *National Physical Laboratories, Aerodynamics Division Report,* AC 37 (1969) and Delany, M. E. and Bazley, E. N., "Acoustical Properties of Fibrous Absorbent Materials," Applied Acoustics, Vol. 3, pp. 105–116 (1970), used measured flow resistance to establish a semi-empirical model for predicting the characteristic impedance of fibrous materials. Others, such as described in Bies, A. and Hansen, C. H., "Flow Resistance Information For Acoustical Design," *Applied Acoustics,* Vol. 13, pp. 357–391 (1980); Dunn, P. I. and Davern, W. A., "Calculation of Acoustic Impedance of Multi-Layer absorbers," *Applied Acoustics,* Vol. 19, pp. 321–334 (1986); and Voronia, N., "Acoustic Properties of Fibrous Materials," *Applied Acoustics,* Vol. 42, pp. 165–174 (1994) have also tried to predict the acoustic impedance of porous materials with empirical relations expressed purely in terms of flow resistance. In Ingard, K. U. and Dear, T. A., "Measurement of Acoustic Flow Resistance," *Journal of Sound and Vibration,* Vol. 103, No. 4, pp. 567–572 (1985), a method was proposed to measure the dynamic flow resistance of materials. It was found that the measured dynamic flow resistance is very close to the steady flow resistance at sufficiently low frequency. Woodcock and Hodgson, in Woodcock, R. and Hodgson, M., "Acoustic Methods For Determining the Effective Flow Resistivity of Fibrous Materials," *Journal of Sound and Vibration,* Vol. 153, No. 1, Feb. 22, pp. 186–191 (1992) predicted the flow resistance by measuring the acoustic impedance. Besides the studies of the flow resistance and modeling thereof in the acoustical literature, there are other flow resistance studies in the fields of geophysics, aerosol science, and filtration.

Well known Darcy's law, as shown in Equation 1, gives the relation between the flow rate (Q) and pressure difference ($\Delta p$) defining flow resistance (W) for fibrous porous materials. In other words, flow resistance of a layer of fibrous porous material is defined as the ratio between the pressure drop ($\Delta p$) across the layer and the average velocity, i.e., steady flow rate (Q) through the layer.

$$W = \frac{\Delta p}{Q} \quad \text{Equation 1}$$

Therefore, flow resistivity (σ) can be defined as shown Equation 2.

$$\sigma = \frac{WA}{h} = \frac{\Delta pA}{Qh} = \frac{\Delta p}{vh} \quad \text{Equation 2}$$

wherein the variables shown therein and others included in flow resistivity Equations below are:

Δp, the pressure drop across the layer of material

Q, the flow rate

A, the area of the layer of material h, the thickness of the layer of material

η, the viscosity of the gas

ρ, the material's density

λ, the mean free path of the material's molecules r, the mean radius of fibers of the material c, the packing density or solidity of the material.

Based on Darcy's law, Davies as described in Davies, C. N., "The Separation of Airborne Dust and Particles," *Proc. Inst. Mech. Eng.* 1B (5), pp. 185–213 (1952), derived the following functional relationship of Equation 3.

$$f\left\{\frac{\Delta pAr^2}{\eta Qh}, \frac{Qr\rho}{A\eta}, c, \frac{\lambda}{r}\right\} = 0 \quad \text{Equation 3}$$

The first term of the function expresses Darcy's law, the second term of the expression is referred to as Reynold's number, the third term is the packing density or solidity, and the fourth term is referred to as Knudsen's number. For fibrous materials, Knudsen's number and Reynold's number, are typically neglected. Therefore, Equation 4 results.

$$\frac{\Delta pAr^2}{\eta Qh} = f(c) \quad \text{Equation 4}$$

From Equation 4, flow resistivity is as defined in Equation 5.

$$\sigma = \frac{\Delta pA}{Qh} = \frac{\eta}{r^2}f(c) \quad \text{Equation 5}$$

Based on Equation 5, as described in Davies (1952), an empirical expression for flow resistivity is set forth as noted in Equation 6.

$$\sigma = \frac{\eta 16c^{15}(1+56c^3)}{r^2} \quad \text{Equation 6}$$

Various other empirical relations have been expressed for flow resistivity. For example, in Bies and Hanson (1980), flow resistivity has been defined as shown in Equation 7.

$$\sigma = \frac{27.3\eta}{4r^2}\left(\frac{\rho_b}{\rho_f}\right)^{1.53} = \frac{27.3\eta}{4r^2}(c)^{1.53} \quad \text{Equation 7}$$

In addition, various other theoretical expressions for flow resistivity have been described. For example, in Langmuir, I., "Report on Smokes and Filters," Section I. U.S. Office of Scientific Research and Development No.865, Part IV (1942) as cited in Davies, C. N., *Air Filtration,* Academic Press, London, England, pp. 35–36 (1973), the theoretical expression shown in Equation 8 is described.

$$\sigma = \frac{1.4\times 4c\eta}{r^2(-\ln c + 2c - c^2/2 - 3/2)} \quad \text{Equation 8}$$

In Happel, J., "Viscous Flow Relative to Arrays of Cylinders," *American Institute of Chemical Engineering Journal,* 5, pp.174–177 (1959), the theoretical expression shown in Equation 9 is described.

$$\sigma = \frac{8c\eta}{r^2[-\ln c - (1-c^2)/(1+c^2)]} \quad \text{Equation 9}$$

In Kuwabara, S., "The Forces Experienced by Randomly Distributed Parallel Circular Cylinders or Spheres in Viscous Flow at Small Reynolds Numbers," *Journal of the Physical Society of Japan,* 14, pp. 527–532 (1959), the theoretical expression shown in Equation 10 is described.

$$\sigma = \frac{8c\eta}{r^2(-\ln c + 2c - c^2/2 - 3/2)} \quad \text{Equation 10}$$

Further, for example, in Pich, J., *Theory of Aerosol Filtration by Fibrous and Membrane Filters,* Academic Press, London and New York (1966), the theoretical expression shown in Equation 11 is described.

$$\sigma = \frac{8c\eta(1+1.996\,Kn)}{r^2[-\ln c + 2c - c^2/2 - 3/2 + 1.996\,Kc(-\ln c + c^2/2 - 1/2)]} \quad \text{Equation 11}$$

As noted previously herein, flow resistivity is an important macroscopic property for the design of porous materials, e.g., particularly, flow resistivity of a fibrous material has a large influence on its acoustical behavior. Therefore, even though various flow resistivity models are available for use, improved flow resistivity models are needed for improving the prediction of acoustical properties of porous materials, particularly fibrous materials.

Various materials, such as, for example, those modeled as described generally above, including fibrous materials, may be used in acoustical systems including multiple components. For example, an acoustical system may include a fibrous material and a resistive scrim having an air cavity therebetween. Systems and methods are available for determining various acoustical properties of materials, e.g., porous materials, and of acoustical properties of acoustical systems (e.g., acoustical properties such as sound absorption coefficients, impedance, etc.). For example, systems for creating graphs representative of absorption characteristics versus at least thickness for an absorber consisting of a rigid resistive sheet backed by an air layer have been described. This and several other similar programs are described in Ingard, K. U., "Notes on Sound Absorption Technology,"

Version 94-02, published and distributed by Noise Control Foundation, Poughkeepsie, N.Y. (1994).

However, although acoustical properties have been determined in such a manner, such determination has been performed with the use of macroscopic properties of materials. For example, such characteristics have been generated using macroscopic property inputs to a specifically defined program for a prespecified acoustical system for generating predesignated outputs. Such macroscopic properties used as inputs to the system include flow resistivity, bulk density, etc. Such systems or programs do not allow a user to predict and optimize acoustical properties using parameters of the materials, such as, for example, fiber size of fibers in fibrous materials, fiber shape, etc. which are directly controllable in the manufacturing process for such fibrous materials.

As indicated above, various methods by way of numerous models are available for predicting acoustical properties. However, such methods are not adequate for predicting acoustical properties of limp fibrous materials as the frames of limp fibrous materials are neither rigid nor elastic. The rigid porous material models are simpler and more numerically robust than the elastic porous material models. However, such rigid methods are not capable of predicting the frame motion induced by external force with respect to limp frames. In elastic porous material methods, the bulk modulus can be set to zero to account for the limp frame characteristic; however, the zero bulk modulus of elasticity causes numerical instability in computations of acoustical properties for limp materials, e.g., such as instability due to the singularity of a fourth order equation. Therefore, the existing porous material prediction processes are not suitable for predicting the acoustical behavior of limp fibrous materials and there exists a need for a limp material prediction method. In addition, there exists a need for methods for predicting and optimizing acoustical properties for use in the design of homogeneous porous materials and/or multiple component acoustical systems using parameters that are directly controllable in the manufacturing process of the materials.

SUMMARY OF THE INVENTION

A computer controlled method in accordance with the present invention for predicting acoustical properties for a generally homogeneous porous material is described. The method includes providing at least one prediction model for determining one or more acoustical properties of homogeneous porous materials, providing a selection command to select a prediction model for use in predicting acoustical properties for the generally homogeneous porous material, and providing an input set of at least microstructural parameters corresponding to the selection command. One or more macroscopic properties for the homogeneous porous material are determined based on the input set of the at least microstructural parameters. One or more acoustical properties for the homogeneous porous material are generated as a function of the one or more macroscopic properties and the selected prediction model.

In one embodiment of the method, the prediction model may be a limp material model, a rigid material model, or an elastic material model.

In another embodiment of the method, the homogeneous porous material is a homogeneous fibrous material. In such a method, the one or more macroscopic properties based on the input set include flow resistivity of the homogeneous fibrous material and the acoustical properties of the homogeneous fibrous material are generated as a function of at least the flow resistivity.

In yet another embodiment of the method, the method includes repetitively predicting at least one acoustical property for the homogeneous porous material over a defined range of at least one of the microstructural parameters of the input set. Further, the method may include generating one of a two dimensional plot or three dimensional plot for the acoustical properties predicted relative to the microstructural parameters having defined ranges.

Another computer controlled method in accordance with the present invention is described for predicting acoustical properties for a generally homogeneous limp fibrous material. This method includes providing a flow resistivity model for predicting flow resistivity of homogeneous limp fibrous materials, providing a material model for predicting one or more acoustical properties of homogeneous fibrous limp materials, and providing an input set of microstructural parameters. The flow resistivity model is defined based on the microstructural parameters. Further, the method includes determining flow resistivity of the homogeneous fibrous limp material based on the flow resistivity model and the input set. One or more acoustical properties for the homogeneous fibrous limp material are generated using the material model as a function of the flow resistivity of the homogeneous fibrous limp material.

In one embodiment of the method, the homogeneous fibrous limp material is formed of one or more fiber types and the flow resistivity of the homogeneous limp fibrous material is determined as a function of the flow resistivity contributed by each of the one or more fiber types. Further, the flow resistivity for each of the one or more fiber types is determined as an inverse function of the mean radius of the fibers taken to the $n^{th}$ power, wherein n is greater than or less than 2.

Yet another computer controlled method in accordance with the present invention is described for predicting acoustical properties of multiple component acoustical systems. This method includes providing one or more selection commands for selecting a plurality of components of a multiple component acoustical system with each selection command associated with one of the plurality of components of the multiple component acoustical system. Each component of the multiple component acoustical system has boundaries with at least one of the boundaries being formed with another component of the multiple component system. Further, the method includes providing an input set of microstructural parameters or macroscopic properties corresponding to each component associated with a selection command. At least one input set including microstructural parameters for at least one component is provided. A transfer matrix is generated for each component of the multiple component acoustical system defining the relationship between acoustical states at the boundaries of the component based on the input sets corresponding to the plurality of components. The transfer matrices for the components are multiplied together to obtain a total transfer matrix for the multiple component acoustical system and values for one or more acoustical properties for the multiple component acoustical system are generated as a function of the total transfer matrix.

In one embodiment of the method, the plurality of components includes at least one homogeneous fibrous material formed of at least one fiber type. The transfer matrix for the homogeneous fibrous material is based on the flow resistivity of the fibrous material with the flow resistivity being defined using the microstructural parameters of an input set corresponding thereto.

In another embodiment of the method, the input set includes a varied set of values for one or more system configuration parameters of the multiple component acoustical system, one or more microstructural parameters of components of the multiple component acoustical system, or one or more macroscopic properties of components of the multiple component acoustical system. The method then further includes generating values for at least one acoustical property over the varied set of values.

The methods as generally described above can be carried out through use of a computer readable medium tangibly embodying a program executable for the functions provided by one or more of such methods. The methods are advantageous in the design of homogeneous porous materials and the design of acoustical systems including at least one layer of such homogeneous porous materials.

BRIEF DESCRIPTION OF THE DRAWINGS

FIG. 3 is a general embodiment of the prediction and optimization program of the main program of FIG. 1 for use with homogeneous porous materials.

FIG. 4 is a more detailed block diagram of the prediction routines of FIG. 3.

FIG. 5 is a detail block diagram of an embodiment of the prediction routines of FIG. 4.

FIGS. 16–21 are tabular, 2-D, and 3-D results of optimizations performed in accordance with the present invention.

DETAILED DESCRIPTION OF THE EMBODIMENTS

The present invention enables a user to predict various acoustical properties for both homogeneous porous materials (e.g., homogeneous fibrous materials) and acoustical systems having multiple components from basic microstructural parameters of the materials using first principles, i.e., using directly controllable manufacturing parameters of such porous materials. The present invention further enables the user to determine an optimum set of microstructural parameters for homogeneous porous materials having desired acoustical performance properties and also to determine optimum system configurations for acoustical systems having multiple components.

As used herein, microstructural parameters refers to the physical parameters of the material that can be directly controlled in the manufacturing process including physical parameters, such as, for example, fiber diameter of fibers used in fibrous materials, thickness of such materials, and any other directly controlled physical parameter.

Further, as used herein, an acoustical property may be an acoustical performance property determined as a function of frequency or incidence angle (e.g., the speed of wave propagation within the solid and fluid phase of a porous material, the rate of decay of waves propagating in the material, the acoustical impedance of the waves propagating within the material, or any other property that describes waves that may propagate within the material). For example, an acoustical performance property may be an absorption coefficient determined as a function of frequency. Further, an acoustical property may be a spatial or frequency integrated acoustical performance measure based on an acoustical performance property (e.g., normal or random incidence absorption coefficient averaged across some frequency range, noise reduction coefficient (NRC), normal or random incidence transmission loss averaged across some frequency range, or speech interference level (SIL).

Also, as used herein, the term homogeneous refers to a material having a generally consistent nature throughout with generally equivalent acoustical properties throughout the material, i.e., generally consistent throughout the material with respect to the microstructural parameters of the material and also with respect to the macroscopic properties of the material.

Figure 2:
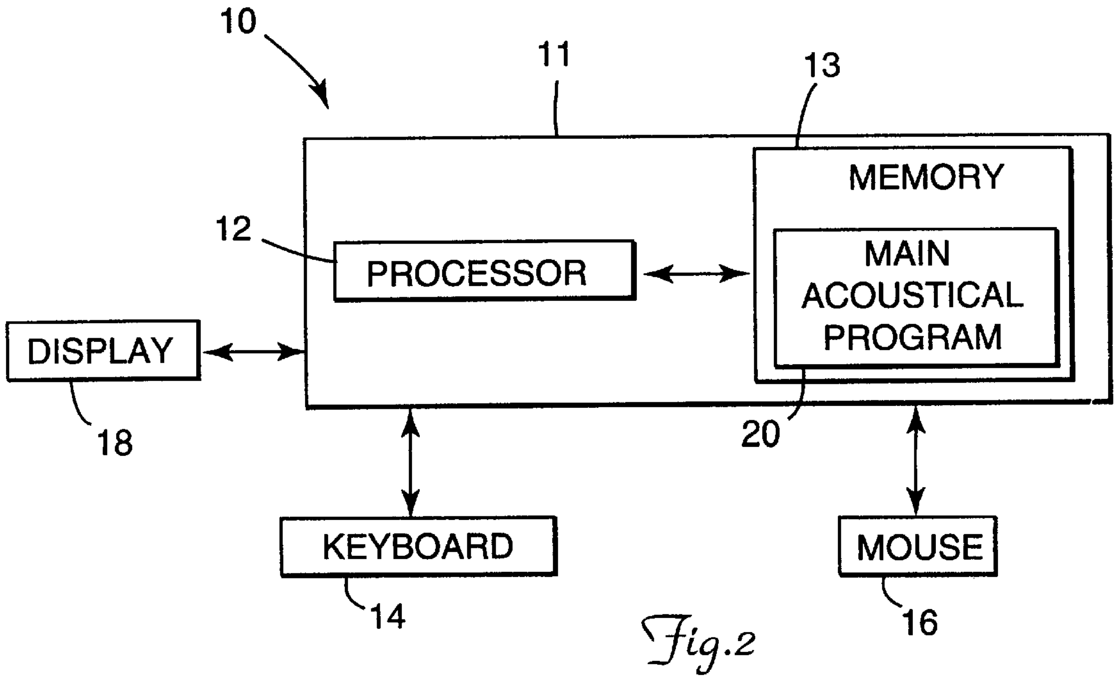
FIG. 2 is an illustrative embodiment of a computer system operable with the main program of FIG. 1.

An acoustical property prediction and optimization system 10 in accordance with the present invention is shown in FIG. 2. The acoustical property prediction and optimization system 10 includes a computer system 11 including a processor 12 and associated memory 13. It is readily apparent that the present invention may be adapted to be operable using any processing system, e.g., personal computer, and further, that the present invention is in no manner limited to any particular processing system. The memory 13 is in part used for storing main acoustical property prediction and optimization program 20. The amount of memory 13 of system 10 should be sufficient to enable the user to allow for operation of the main program 20 and store data resulting from such operation. It is readily apparent that such memory may be provided by peripheral memory devices to capture the relatively large data/image files resulting from operation of the system 10. The system 10 may include any number of other peripheral devices as desired for operation of system 10, such as, for example, display 18, keyboard 14, and mouse 16. However, it is readily apparent that the system is in no manner limited to use of such devices, nor that such devices are necessarily required for operation of the system 10. In a preferred embodiment of the present invention, the program as provided herein is created using MATLAB available from Mathworks, Inc.

Figure 1:
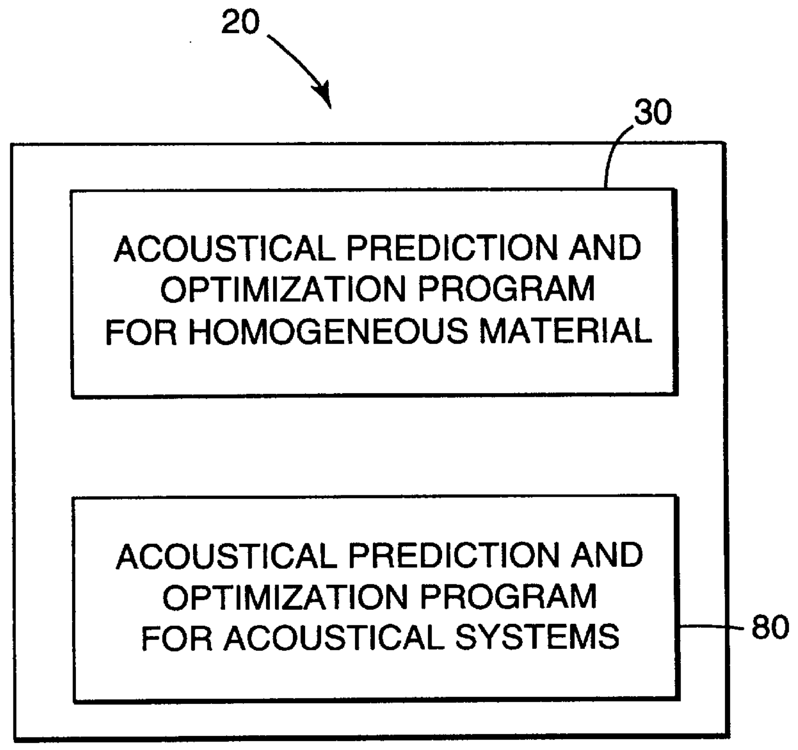
FIG. 1 is a general block diagram of a main acoustical prediction and optimization program in accordance with the present invention.

As shown in FIG. 1, main program 20 includes an acoustical prediction and optimization program 30 for predicting acoustical properties for homogeneous porous materials and/or for determining an optimum set of microstructural parameters for an acoustical property of such homogeneous porous materials. The main program 20 further includes an acoustical prediction and optimization program 80 for predicting acoustical properties for an acoustical system including multiple components, e.g., resistive scrim, porous materials, panels, air cavities, etc., and/or for determining the optimum configuration of the multiple components of the acoustical system, e.g., thickness of components, position of the components, etc.

Generally, the acoustical prediction and optimization program for homogeneous porous materials 30 of the main program 20 is for use in designing acoustical materials, such as for use in noise reduction, sound absorption, thermal insulation, filtration, barrier applications, etc. The homogeneous material program 30 predicts acoustical properties for homogeneous porous materials by "connecting" the microstructural parameters of a material (i.e., the physical parameters of the material that can be directly controlled in the manufacturing process) with the acoustical performance of the material, i.e., acoustical properties determined as a function of frequency or integrated over a frequency range, of that material in isolation. In such a manner, it is possible to adjust the manufacturing process in a predictable way to produce a material having desired and specified acoustical properties.

The connection between the material microstructural parameters and the final acoustical properties of a homogeneous porous material is made by the program 30 using a sequence of expressions for determining acoustical properties, some of which may be derived on a purely theoretical basis, some of which may be empirical (i.e., expressions resulting from fitting curves to measured data), and some of which may be semi-empirical (i.e., expressions whose general form is dictated by theory, but whose coefficients are determined by fitting the expression to measured data). With these defined expressions and the input of microstructural parameters, acoustical properties for a homogeneous porous material are predicted.

The connections between the microstructural parameters and the acoustical properties of the homogeneous porous materials is carried out through the determination of macroscopic properties of the material. The microstructural parameters of the homogeneous porous material (e.g., fiber size of a fibrous material, fiber size distribution, fiber shape, fiber volume per unit material volume, thickness of a layer, etc.) are mathematically connected to macroscopic properties of the material on which most acoustical models are based. As used herein, the term macroscopic properties (e.g., bulk density, flow resistivity, porosity, tortuosity, bulk modulus of elasticity, bulk shear modulus, etc.) include properties of the homogeneous porous materials that describe the material in bulk form and which are definable by the microstructural parameters. The acoustical properties of the homogeneous porous material are determined based on the macroscopic properties. However, although the macroscopic properties allow the acoustical properties to be predicted, without the use of input microstructural parameters mathematically connected to the macroscopic properties, the manufacturing level of control of the acoustical properties is not available.

If a particular set of microstructural parameters does not result in predicted desired, i.e., targeted, acoustical properties using the acoustical properties prediction portion of program 30 as generally described above, the program 30 allows the user to perform optimization routines to determine a set of microstructural parameters that will result in the desired acoustical performance. The optimization routines of the program 30 allow a loop to be closed between the output of acoustical properties for the material being optimally designed and the microstructural parameters of the material used for determining such predictions. In the optimization, a set of microstructural parameters can be determined for achieving the desired properties. In other words, prediction routines for predicting acoustical properties for a material are run over particular ranges defined for one or more microstructural parameters with respect to one or more particular acoustical properties such that predicted acoustical property values can be generated over the particular defined ranges. Display of such values can then be utilized to attain optimal parameters by the user, optimal values can be generated by searching the resulting values to determine optimal values, and/or the closed loop running through the range may be stopped from further computation of values when optimum values are attained.

For operation of the optimization process, an acoustical property must first be defined by the user. To optimize the homogeneous porous material to achieve the desired acoustical property, a numerical optimization process is used to predict acoustical properties over a defined range of one or more material manufacturing microstructural parameters such that the desired acoustical property (e.g., performance measure) is attained and such that optimal manufacturing microstructural parameters can be determined by the user. As would be expected, the optimization process must be constrained to allow for realistic limits in the manufacturing process. For example, when dealing with a homogeneous fibrous material, constraints may need to be placed on bulk density of the material representative of limits in the manufacturing process. The optimization process allows an optimal design for the homogeneous material to be achieved while satisfying practical constraints on the manufacturing process.

The main program 20, as indicated above, also includes acoustical prediction and optimization program 80 for prediction of acoustical properties of an acoustical system and/or for optimizing the configuration of the multiple components of the acoustical system. For example, homogeneous porous materials which can be optimally designed, as described generally above, are commonly used in applications with other materials or within structures as layered treatments, i.e., acoustical systems. Generally, an acoustical system may include any materials which would be used by one skilled in the art for acoustical purposes (e.g., resistive scrim, impermeable membrane, stiff panel, etc.) and further may include defined spaces (e.g., air spaces). It is readily apparent that any number of layers of materials and defined spaces may be utilized in an acoustical system, including but not limited to porous materials, permeable or impermeable barriers, and air spaces. Further, any shape, e.g., curvature, and or configuration of the components for the acoustical system is contemplated in accordance with the present invention and one or more of the components of the acoustical system may be a component of a larger acoustical system, e.g., an acoustical system positioned within a room, a car, etc. The design of any multiple component layered acoustical system is contemplated in accordance with the present invention. For example, a car door filled with porous material can be treated as a double panel acoustical system and the sound absorbing material attached to the back of a car head liner is another application of a multiple component layered acoustical system. Further, for example, such acoustical systems may be used for noise reduction in automobiles, aircraft fuselages, residence, factories, etc. and the installed acoustical properties of an acoustical system when installed at different locations may vary.

The acoustical properties of an acoustical system are predicted by combining the acoustical properties of homogeneous porous components of the system and other components (e.g., air spaces) used in acoustical systems, along with boundary conditions and geometrical constraints that define an acoustical system (e.g., a system having multiple layers of one or more porous materials, one or more permeable or impermeable barriers, one or more air spaces, or any other components, and further having a finite size, depth, and curvature). Depending upon the geometry of the acoustical system under consideration, e.g., a shaped layered system, the acoustical properties for the acoustical system may be predicted using classical wave propagation techniques or numerical techniques, such as, for example, finite or boundary element methods.

Generally, in accordance with the present invention, the acoustical properties for an acoustical system are determined by recognizing that at the boundary interface of two media, if the pressure field in one medium is known, then pressure and particle velocity of the second medium can be obtained based on the force balance and the velocity continuity across the boundary. Each component of the acoustical system has two boundaries with at least one of the boundaries being formed at the interface with another component of the acoustical system. The relation between the two pressure fields and velocities across a boundary can be written in matrix form. Similarly, a transfer matrix can also be obtained for pressure and particle velocity crossing the mediums. After obtaining the transfer matrix for each component, e.g., layer, defining the relationship between acoustical states at the boundaries of the component (i.e., the acoustical states being based on the pressure fields and velocities at the boundaries), a total transfer matrix is attained by multiplying all the transfer matrices of the multiple component layered acoustical system. The total transfer matrix is then used for determination of acoustical properties, such as, for example, surface impedance, absorption coefficient, and transmission coefficient of the multiple component layered acoustical system.

Further, optimization routines of the acoustical system prediction and optimization program 80 permit the user to find optimal values for microstructural parameters of one or more components of the acoustical system, such as, for example, fiber diameter of a fibrous material used in the acoustical system, thickness of material layers, etc. Further, optimal values may be determined for macroscopic properties of one or more components of the acoustical system, e.g., macroscopic properties such as flow resistivity of a resistive element, mass per unit area of barrier elements, mass per unit area of resistive elements, thickness of a layer, etc. Yet further, optimal values can be determined for system configuration parameters of the acoustical system, i.e., physical parameters of the acoustical system (as opposed to the components of the system) that can be controlled in the manufacturing process, such as, for example, position of a layer in the acoustical system, number of layers, sequence of layers, etc. Generally, the optimization involves defining an acoustical property for which the optimization is to be performed, such as an acoustical property (e.g., acoustical performance measure) described above with respect to the homogeneous material optimization program 30. A loop is then closed between the determination of acoustical properties for the acoustical system and the input of a range or set of values defined for one or more microstructural parameters of a component of an acoustical system, one or more macroscopic properties of a component of the acoustical system, or one or more system configuration parameters of the acoustical system. The loop provides for determination of the acoustical properties over the defined range or set of values. As described above with the optimization of homogeneous porous materials, display of acoustical property values can then be utilized to attain optimal parameters by the user, optimal values can be generated by searching the resulting values to determine optimal values, and/or the closed loop running through the range or set of values may be stopped from further computation of values when optimum values are attained.

As would be known to one skilled in the art, the design process can be confirmed through physical experimentation at the final stage of the design of a homogeneous material and/or an acoustical system, i.e., after a prototype optimal material or system has been manufactured. Further, one will recognize that various theoretical mathematical expressions, empirical and semi-empirical expressions providing for the connection of the microstructural parameters to the acoustical properties of the materials and/or the acoustical systems are continuously updated as improved theoretical models and more accurate and/or comprehensive experimental data becomes available. As such, it is readily apparent that the various elemental expressions forming such connections as described herein may evolve, but the overall process as described herein is fixed and contemplates such future change in the underlying connection expressions.

GENERAL EMBODIMENT OF PREDICTION/ OPTIMIZATION FOR HOMOGENEOUS MATERIAL

In one embodiment of the main program 20, the acoustical prediction and optimization program 30 for use in design of homogeneous porous materials is provided by homogeneous material prediction and optimization program 31 as shown in FIG. 3. The homogeneous porous material prediction and optimization program 31 includes prediction routines 32 for predicting acoustical properties for homogeneous porous materials by "connecting" the microstructural parameters of the materials with the acoustical properties of that material in isolation. As previously mentioned, in such a manner, it is possible to adjust the manufacturing process in a predictable way to produce a homogeneous porous material having specified acoustical properties.

PREDICTION ROUTINES

The prediction routines 32 for predicting acoustical properties for homogeneous porous materials is further shown in a more detailed block diagram in FIG. 4. The prediction routines 32 generally include macroscopic property determination routines 23 for determination of macroscopic properties of a homogeneous porous material being designed as a function of microstructural parameter inputs 22, i.e., the connection of the process between the controllable manufacturing parameters of the homogeneous porous material to the macroscopic properties of the material. The prediction routines 32 further include material models 24 for determination of acoustical properties 25 of the homogeneous porous material. It is readily apparent to one skilled in the art that the details of the microstructural inputs 22, the macroscopic property determination routines 23, the material models 24, and the acoustical properties 25, will vary depending upon the types of materials to be designed.

The general embodiment of the prediction process 32 shall be described in a manner in which a user would interface with the acoustical property prediction and optimization system 10 (FIG. 2) including main program 20. Upon initializing main program 20, an initial screen allows the user to choose to design a particular homogeneous porous material or an acoustical system. If the user chooses to work with an acoustical system, the user is given options for use of acoustical system prediction and optimization program 80 such as program 81 as further described below. If the user chooses to work with a particular homogeneous porous material, then a second screen allows the user to choose whether the user wants to work with the manufacturing microstructural parameters of the homogeneous porous material, whether the user wishes to determine a set of microstructural parameters for desired acoustical properties of a particular homogeneous porous material, i.e., optimization of the homogeneous material, or whether the user wishes to calculate certain acoustical properties for a set of user specified macroscopic properties of the homogeneous porous material.

If the user chooses to calculate certain acoustical properties for a set of user specified macroscopic properties of a homogeneous porous material, the user is prompted to enter such macroscopic properties and then calculates the acoustical properties of the material so specified using one of the material models 24 resulting in the acoustical properties 25. For example, as described below, the material models 24 may be rigid, elastic, or limp frame porous material models. Alternatively, or in addition to input of macroscopic properties, the user may be prompted to choose the acoustical properties to be determined. Such calculated information or data is then provided to the user in some form, e.g., tabular or graph form, as would be readily apparent to one skilled in the art.

If the user chooses to determine a set of microstructural parameters for desired acoustical properties of a particular homogeneous porous material, i.e., optimization of the material, then the user is given options for use of optimization routines of the homogeneous material prediction and optimization program 31 such as routines 34 as further described below.

If the user chooses to work with the manufacturing microstructural parameters of a homogeneous porous material, then prediction routines 32 of the homogeneous material prediction and optimization program 31 gives the user further options with respect to the prediction of acoustical properties for the homogeneous porous material based on manufacturing microstructural parameters. Upon choosing to work with the manufacturing microstructural parameters of a material, the system 10 prompts the user to choose one of the various porous material models 24 for calculating the acoustical properties. As shown in FIG. 4, material models 24 may include any porous material model for predicting acoustical properties based on the macroscopic properties generated per the macroscopic property determination routines 23. Such material models 24 may include a limp porous model, a rigid frame model, and an elastic frame model for use with the porous material, such as those in the embodiment of FIG. 5 to be described further below. Upon selection of a porous material model 24 to be used, the system 10 prompts the user to provide the manufacturing microstructural parameters necessary for the macroscopic determination routines 23 to determine the macroscopic properties necessary to calculate the acoustical properties 25 using the material model 24 chosen by the user.

Acoustical properties 25 of a porous material can be quantified in many different ways with respect to different applications and all acoustical properties known to one skilled in the art are contemplated as being determinable in accordance with the present invention. In noise related applications, in particular, the acoustical properties 25 can be generally divided into two categories: those with regard to the capability of the material to absorb sound and those with regard to the capability of the material to block sound transmission. Sound absorbing treatments are usually used to improve the interior acoustical conditions where the sound source exists and the sound blocking treatments are mostly used to prevent sound transmitting from one space to another. For example, the material models 24, such as shown in FIG. 5 (i.e., rigid, elastic, and limp) are capable of determining at least the acoustical properties 50 shown in FIG. 5 (i.e., specific acoustical impedance (Z), reflection coefficient (R), sound absorption coefficient (α), random incidence sound transmission loss (TL)).

Generally, with respect to absorption coefficient (α), when a traveling acoustical wave encounters the surface of two different media, part of the incident wave is reflected back to the incident medium and the rest of the wave is transmitted into the second medium. The absorption coefficient (α) of the second medium is defined as the fraction of the incident acoustical power absorbed by the second medium. The absorption coefficient at a particular frequency and incidence angle can be calculated as $1-|R|^2$. The pressure reflection coefficient (R) is a complex quantity and is defined as the ratio of the reflected acoustical pressure to the incident acoustical pressure. If the normalized surface normal impedance ($z_n$) of a material is known, the absorption coefficient (α) can be determined by applying the following Equation 12 for the reflection coefficient (R).

$$R=\frac{z_n\cos\theta-1}{z_n\cos\theta+1} \qquad \text{Equation 12}$$

where $z_n$ is the normalized normal specific acoustical impedance, i.e., $Z_n/\rho_0c_0$, wherein $c_0$ is the speed of sound in air.

From Equation 12, it is seen that the reflection coefficient (R) is a function of incident angle. Therefore, the absorption coefficient (α) is also a function of incident angle. Both quantities are also functions of frequency.

With respect to transmission loss (TL), when the media on both sides of the material are the same, which is generally the case, the transmission loss $TL=10\log(1/\bar{\tau})$. The power transmission coefficient (τ) is defined as the acoustical power transmitted from one medium to another and is a function of incident angle and frequency and is equal to $|T|^2$ where T is the plane wave pressure transmission coefficient. To estimate the random incident sound transmission, the power transmission coefficient (τ) needs to be averaged over all the possible incident angles. According to the Paris formula, as described in the context of absorption in Pierce, A. D., *Acoustics, An Introduction to Its Physical Principle and Applications.* New York: McGraw-Hill (1981), Shiau in Shiau (1991) has shown that the averaged power transmission coefficient can be approximated by Equation 13.

$$\bar{\tau}=2\int_0^{\theta_{lim}}\tau(\theta)\sin\theta\cos\theta d\theta \qquad \text{Equation 13}$$

where $\theta_{lim}$ is the limiting angle as defined in Mulholland, K. A., Parbrook, H. D., and Cummings, A., "The Transmission Loss of Double Panels," *Journal of Sound and Vibration,* 6, pp. 324–334 (1967).

To apply the material models 24 to determine the acoustical properties 25, macroscopic properties of the materials determined by macroscopic determination routines 23 need to be known as further described below. For example, for homogeneous porous materials, one or more of the properties including bulk density, loss factor, tortuosity, porosity and flow resistivity, need to be known when using a material model 24 such as a limp model, rigid model, or elastic model to determine acoustical properties. In particular, flow resistivity is of importance in the determination of acoustical properties for fibrous materials and provides the connection between the microstructural parameters and acoustical properties for such fibrous materials.

Rigid Material Model

The material models 24 may include rigid frame models. Such rigid frame models may include any rigid frame model available for determining acoustical properties 25 for a material defined by macroscopic properties, such as the macroscopic properties determined by macroscopic property determination routines 23. Various rigid models were described in the Background of the Invention section herein and each of these rigid models and any other rigid models available may be utilized in accordance with the present invention. The frame of a porous material can be treated as rigid if the frame bulk modulus is about ten times greater than that of air and if the frame is not directly excited by attachment to a vibrating surface. In a rigid frame porous material, like sintered metals or air-saturated porous rocks, only one compression wave can propagate through the fluid phase within the porous material and no structure borne wave is allowed to propagate through the frame when the material is subject to airborne excitation. The macrostructural properties that control the acoustical behavior of a rigid porous material include tortuosity, flow resistivity, porosity and shape factors.

One rigid frame model is based on the work of Zwikker and Kosten [1949]. The derivations of the rigid model start by considering the acoustical pressure and air velocity within the cylindrical pores of porous materials. For a typical high porosity acoustical materials, the value of 0.98 may be assumed for porosity ($\phi$), 1.2 for tortuosity ($\alpha_\infty$) (the dynamic tortuosity as frequency approaches infinity), $1.4\times 10^5$ Pa for air bulk modulus ($\gamma P_o$) and 0.71 for Prandtl's number. The pores of the porous materials are simplified as perfect cylinders; therefore, the shape factor c is equal to 1. Other values may be used for the parameters listed as appropriate for the particular material being considered and the present invention is in no manner limited to any particular values.

With all the assumed parameters and flow resistivity ($\sigma$), the rigid model is described for the rigid porous material as an equivalent fluid by the complex bulk modulus (K) as shown in Equation 15 and the complex effective density ($\rho$) as shown in Equation 14 (both quantities being functions of frequency). (Further details with regard to this model are found in Allard (1993))

$$\rho = \alpha_\infty \rho_o\left[1 + \frac{\sigma\phi}{j\omega\rho_o\alpha_\infty}G_c(s)\right] \qquad \text{Equation 14}$$

$$K = \gamma P_o \Big/ \left[\gamma - (\gamma - 1)\left[1 + \frac{\sigma\phi}{jB^2\omega\rho_0\alpha_\infty}G_c(Bs)\right]^{-1}\right] \qquad \text{Equation 15}$$

where $$G_c(s) = \frac{s\sqrt{-j}\,J_1(s\sqrt{-j})}{4J_o(s\sqrt{-j})} \Big/ \left[1 - \frac{2J_1(s\sqrt{-j})}{s\sqrt{-j}\,J_o(s\sqrt{-j})}\right],$$

and $$s = \left(\frac{8\omega\alpha_\infty\rho_o}{\phi\sigma}\right)^{1/2},$$

and further wherein $\rho_o$ is the ambient density of the saturating fluid.

The surface impedance (Z) of the rigid porous material mounted above an infinitely hard backing surface presented to a normally incident wave and the wave number of acoustical waves traveling in the material can be obtained from the bulk density and the effective density as shown in the following Equation 16.

$$Z = -j\frac{Z_c}{\phi}\cos(kd) \qquad \text{Equation 16}$$

where $k=\omega(\rho/K)^{1/2}$, $Z_c=(K\rho)^{1/2}$ is the characteristic impedance of the rigid porous material, and d is the thickness of the layer of porous material.

One skilled in the art can easily generalize these expressions to the case of non-normal incidence.

The normal incidence reflection coefficient (R), absorption coefficient ($\alpha$), and transmission coefficient (T) of the rigid porous materials can be obtained using the following Equations: Equation 17, Equation 18, and Equation 19.

$$R = \frac{Z_n - \rho_o c_o}{Z_n + \rho_o c_o} \qquad \text{Equation 17}$$

$$\alpha = 1 - |R|^2 \qquad \text{Equation 18}$$

$$T = \frac{2e^{j\frac{\omega}{c_o}d}}{2\cos(kd) + j\sin(kd)\left(\frac{\frac{\omega}{c_o}}{k}\frac{\rho}{\rho_o} + \frac{k}{\frac{\omega}{c_o}}\frac{\rho_o}{\rho}\right)} \qquad \text{Equation 19}$$

Note the above equations are applicable for the case of normal incidence, but equivalent expressions can be derived by one skilled in the art for non-normal incidence. Further, the present invention is in no manner limited by the illustrative rigid model described above.

Elastic Material Model

The porous material models 24 may include elastic frame models. The elastic frame models may include any elastic frame model available for determining acoustical properties 25 for a material defined by macroscopic properties such as determined by macroscopic property determination routines 23. Various elastic models were described or referenced in the Background of the Invention section herein and each of these elastic models and any other elastic model available may be utilized in accordance with the present invention.

The frame of a porous material can be considered as elastic if the frame bulk modulus is comparable to the air bulk modulus. In a homogeneous isotropic elastic porous material, like polyurethane foam, there are a total of three types of waves allowed to propagate through both fluid and solid phases, i.e., two dilatational waves (one structure-borne wave and one air borne wave) and one rotational wave (structure-borne only). The macrostructural properties that control the acoustical behavior of an elastic porous material include the in vacuo bulk Young's modulus, bulk shear modulus, Poisson's ratio, porosity, tortuosity, loss factor, and flow resistivity. Anisotropic elastic porous material models can also be developed in which case the list of macrostructural properties whose values must be known is more extensive, such as described in Kang, Y. J., "Studies of Sound Absorption by and Transmission Through Layers of Elastic Noise Control Foams: Finite Element Modeling and Effects of Anisotropy," Ph.D. Thesis, School of Mechanical Engineering, Purdue University (1994).

One example of an elastic porous model for determining acoustical properties of a homogeneous porous material is based on the work of Shiau [1991], Bolton, Shiau, and Kang (1996) and Allard [1993]. The derivations for such an elastic model start from the stress-strain relations of the solid and fluid phases of the porous material using Biot's theory [1956B] and are clearly shown in the above cited and incorporated works by Shiau [1991], Bolton, Shiau, and Kang (1996) and Allard [1993], resulting in computations for determining reflection and transmission coefficients from which other acoustical properties can be determined. In such derivations, a fourth order equation must be solved to attain wave numbers for two dilatational waves in the solid phase of the porous material, and also a rotational wave number is obtained. After all the wave numbers are obtained, one can determine the reflection coefficient and the transmission coefficient by solving acoustical pressure field parameters by applying boundary conditions. Portions of the derivation of the elastic model described in the above referenced works are shown and used in the limp model to follow.

Although both the rigid and the elastic models, previously described and included by reference, are suitable for use in determining acoustical properties for many porous materials, the rigid and elastic porous models do not adequately predict acoustical properties for limp fibrous materials (e.g., fibrous materials whose frames do not support structure-borne waves and whose bulk frames can be moved by external force or by inertial or viscous coupling to the interstitial fluid), because the frames of the limp fibrous materials are neither rigid nor elastic. Rigid porous material models are simpler and more numerically robust than the elastic porous material model, however, it is not capable of predicting the frame motion induced by the external applied force or internal coupling forces. In any of the elastic porous material models, the bulk modulus can be set to zero to account for the limp frame characteristic; however, the zero bulk modulus of elasticity causes numerical instability due to the singularity of the fourth order equation. Therefore, a limp frame model of the material models is used for predicting the acoustical behavior of limp fibrous materials.

Limp Material Model

The following described limp frame model, one of the material models 24, is a modification of elastic porous material theory taking into consideration the specific characteristics of limp fibrous materials. In arriving at a limp frame model (e.g., model 42), the most general model for predicting wave propagation in elastic porous materials, as developed by Biot [1956B], is utilized. The derivation of this model starts from the stress-strain relations of porous elastic solid and saturated fluid. Such relations are given by Equation 20, Equation 21, Equation 22, and Equation 23.

$$\sigma_i=2Ne_i+Ae_s+Q\epsilon,\ i=x,y,z. \qquad \text{Equation 20}$$

$$\tau_{ij}=\tau_{ji=N\gamma ij},\ i,j=x,y,z. \qquad \text{Equation 21}$$

$$s=Qe_s+R\epsilon \qquad \text{Equation 22}$$

$$e_s=e_x+e_y+e_z. \qquad \text{Equation 23}$$

Figure 8A:
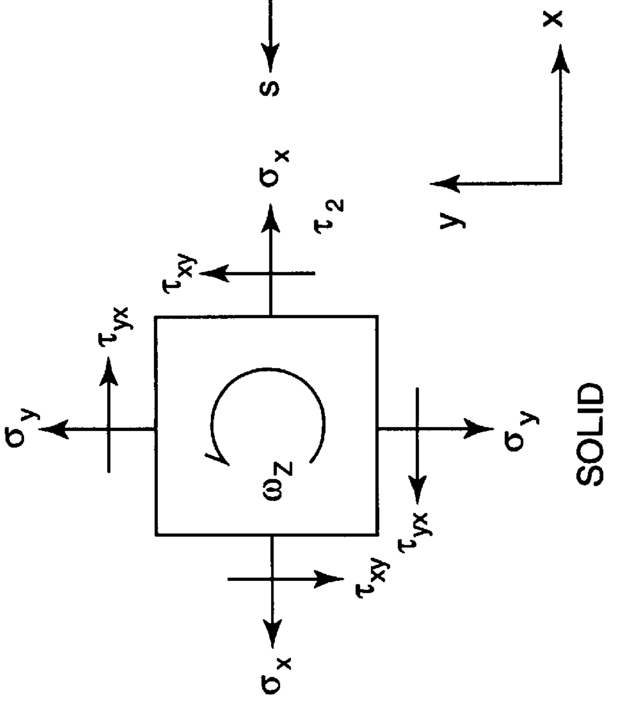
FIGS. 8A–8B and FIGS. 9A–9B are illustrative diagrams for describing the derivation of a limp porous model for limp fibrous materials.
Figure 8B:
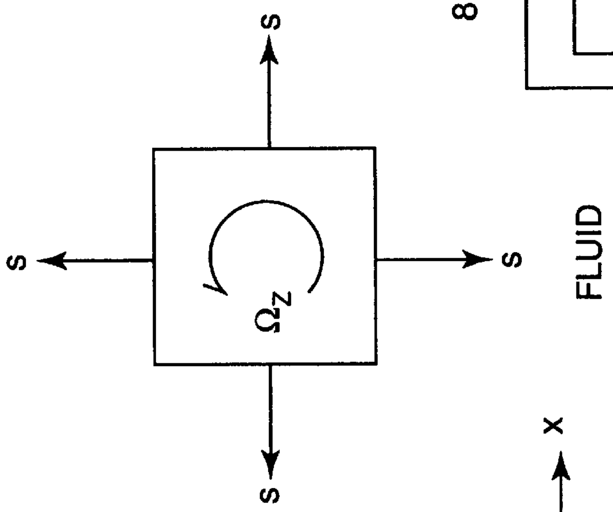

Further, s and $\tau$ are the normal stress and shear stress of the solid phase, respectively, and $\epsilon$ is the normal stress of the fluid phase which is negatively proportional to the fluid pressure. The sign convention is defined in FIGS. 8A and 8B. The $e_s$ and $e_i$ are the strains of the solid phase and the fluid phase, respectively. The coefficient A is the Lamé constant (equal to $vK_s/(1+v)(1-2v)$, where v is the Poisson's ratio and $K_s$ is the in vacuo Young's modulus of the elastic solid in the porous material) and the coefficient N (defined as $K_s/2(1+v)$) represents the shear modulus of the elastic porous material. The coefficient Q is the coupling factor between the volume change of the solid and that of the fluid. The coefficient R is the measure of the required pressure to force the fluid phase in certain volume while the total volume remains constant.

The equations of motion for the solid phase and the fluid phase in the pores are given, respectively, as following Equation 24 and Equation 25.

$$\frac{\partial\sigma_{xi}}{\partial x}+\frac{\partial\sigma_{yi}}{\partial y}+\frac{\partial\sigma_{zi}}{\partial z}= \rho_1\frac{\partial^2 u_i}{\partial t^2}+\rho_2(q^2-1)\frac{\partial^2}{\partial t^2}(u_i-U_i)+b\frac{\partial}{\partial t}(u_i-U_i),\ i=x,\ y,\ z. \qquad \text{Equation 24}$$

$$\frac{\partial s}{\partial i}=\rho_2\frac{\partial^2 U_i}{\partial t^2}+\rho_2(q^2-1)\frac{\partial^2}{\partial t^2}(U_i-u_i)+ b\frac{\partial}{\partial t}(U_i-u_i),\quad i=x,\ y,\ z. \qquad \text{Equation 25}$$

where $\sigma_{ii}=\sigma_i$, $\sigma_{ij}=\tau_{ij}$, $q^2$ is the tortuosity, $u_i$ and $U_i$ are the displacements of the solid and fluid phases in the i direction, and $\rho_i$ is the bulk density of the solid phase, $\rho_2$ is the density of the fluid phase (as defined below). The last portions on the right hand side of the two equations are the viscous coupling force proportional to the relative velocity of the two phases, and b is a viscous coupling factor.

From the stress-strain relations and the dynamic equations, two sets of differential equations governing the wave propagation can be obtained. Biot's poroelastic model predicted two dilatational waves and one rotational wave traveling in an elastic porous material. The elastic coefficients of elastic porous materials are expressed in terms of the frame bulk modulus, the bulk modulus of the solid and the fluid phases, and the porosity. The A, N, Q and R are called Biot-Gassmann coefficients. In Biot's theory, the porous elastic material is described by these four coefficients and a characteristic frequency. With the definition of P equal to A+2N, one can describe the physical properties of an elastic porous material by P, Q and R. These three elastic coefficients are expressed in terms of porosity and measurable coefficients $\gamma$, $\mu$, $\delta$ and $\kappa$ [Biot, 1957], given by the following Equation 26, Equation 27, and Equation 28.

$$P=\frac{\frac{\gamma}{\kappa}+f^2+(1-2f)\left(1-\frac{\delta}{\kappa}\right)}{\gamma+\delta-\frac{\delta^2}{\kappa}}+\frac{4}{3}\mu \qquad \text{Equation 26}$$

$$Q=\frac{f\left(1-f-\frac{\delta}{\kappa}\right)}{\gamma+\delta-\frac{\delta^2}{\kappa}} \qquad \text{Equation 27}$$

$$R = \frac{f^2}{\gamma + \delta - \frac{\delta^2}{\kappa}} \quad \text{Equation 28}$$

where f is the porosity (defined as $\phi$ in this work), $\kappa$ is the jacketed compressibility at the constant fluid pressure, $\delta$ is the unjacketed compressibility with the fluid pressure penetrating the pores completely, $\gamma$ is the unjacketed compressibility of the fluid in the pore and $\mu$ is the shear modulus of the porous material.

Based on the assumption of micro-homogeneity as described in Allard (1993), the elastic coefficients can also be given in terms of three moduli and the porosity, i.e., $K_f$, $K_s$, $K_b$ and $\phi$, as shown in Equation 29, Equation 30, and Equation 31.

$$P = \frac{(1-\phi)\left[1-\phi-\frac{K_b}{K_s}\right]K_s + \phi\frac{K_s}{K_f}K_b}{1-\phi-\frac{K_b}{k_s}+\phi\frac{K_s}{K_f}} + \frac{4}{3}N \quad \text{Equation 29}$$

$$Q = \frac{\left[1-\phi-\frac{K_b}{K_s}\right]\phi K_s}{1-\phi-\frac{K_b}{K_s}+\phi\frac{K_s}{K_f}} \quad \text{Equation 30}$$

$$R = \frac{\phi^2 K_s}{1-\phi-\frac{K_b}{K_s}+\phi\frac{K_s}{K_f}} \quad \text{Equation 31}$$

where $\phi$ is the porosity of the material, $K_b$ is the bulk modulus of the frame (defined as 2N(v+1)/3(1−2 v)) of the porous material at the constant pressure in the fluid, and $K_f$ is the elastic bulk modulus of the fluid phase in the pore of the porous material.

For the porous materials having limp frames, the frame bulk modulus is insignificant compared with the compressibility of air. Therefore, the bulk modulus $K_b$ and the shear modulus N are set equal to zero and the elastic coefficients are defined as shown in Equation 32, Equation 33, and Equation 34.

$$P = \frac{(1-\phi)^2 K_s}{1-\phi+\phi\frac{K_s}{K_f}} \quad \text{Equation 32}$$

$$Q = \frac{(1-\phi)\phi K_s}{1-\phi+\phi\frac{K_s}{K_f}} \quad \text{Equation 33}$$

$$R = \frac{\phi^2 K_s}{1-\phi+\phi\frac{K_s}{K_f}} \quad \text{Equation 34}$$

To further modify the expressions of these elastic coefficients for limp fibrous materials, it is assumed that the stiffness of the material comprising the solid phase $K_s$ is much larger than that of the fluid phase $K_f$ and is approximately equal to infinity, i.e., the constituent of fibers is incompressible compared to the interstitial fluid within the porous material. This assumption yields the final expressions of P, Q and R as Equation 35, Equation 36, and Equation 37.

$$P = \frac{(1-\phi)^2}{\phi}K_f \quad \text{Equation 35}$$

$$Q=(1-\phi)\,K_f \quad \text{Equation 36}$$

$$R=\phi K_f \quad \text{Equation 37}$$

Once the elastic coefficients have been determined, the wave equation of the limp fibrous materials can be determined.

Based on the Biot's theory, the wave numbers of the two dilatational waves and the rotational wave are given by the following Equation 38 and Equation 39, respectively.

$$k_{1,2}^2 = \frac{A_1 \pm \sqrt{A_1^2 - 4A_2}}{2} \quad \text{Equation 38}$$

$$k_t^2=(\omega^2/N)[\rho_{11}^*-\rho_{12}^{*2}/\rho_{22}^*] \quad \text{Equation 39}$$

where $A_1=\omega^2(\rho_{11}^*R-2\rho_{12}^*Q+\rho_{22}^*P)/(PR-Q^2)$, and $A_2=\psi^4(\rho_{11}^*\rho_{12}^*-\rho_{12}^{*2})/(PR-Q^2)$ , and further where $\rho_{11}^*=\rho_1+\rho_a+b/j\omega$, $\rho_{12}^*=-\rho_a-b/j\omega$, $\rho_{22}^*=\rho_2+\rho_a+b/j\omega$, and $\rho_a=\rho_2(q^2-1)$.

As indicated previously, $\rho_1$, $\rho_2$ are the densities of the solid and fluid phases, respectively; $\rho_1$ is the bulk density of the solid phase of the fiber which is a given measured value, $\rho_2$ is the complex density of the fluid phase determined as a function of flow resistivity as shown in Equation 15, and $\rho_a$ is the coupling between the fluid and solid phases. From the elastic coefficients derived for limp porous materials, it is noted that $PR-Q^2$ was equal to zero which led to singularities in Equation 38. Therefore, the strain-stress relations in Biot's theory need to be solved under the condition of $PR-Q^2=0$ and the strain-stress relations are obtained as shown in Equation 40.

$$(2\rho_{12}^*Q-\rho_{22}^*P-\rho_{11}^*R)\nabla^2\epsilon+\omega^2(\rho_{12}^{*2}-\rho_{11}^*\rho_{22}^*)\epsilon=0 \quad \text{Equation 40}$$

Equation 40 is a Helmholtz equation implying the existence of a single compressional wave with the wave number given as Equation 41.

$$k_p^2 = \frac{\omega^2(\rho_{12}^{*2}-\rho_{11}^*\rho_{22}^*)}{(2\rho_{12}^*Q-\rho_{22}^*P-\rho_{11}^*R)} \quad \text{Equation 41}$$

In addition, from solving for the wave equation, the relation between the solid volumetric strain and the fluid volumetric strain was obtained as Equation 42.

$$e_s = \frac{(\rho_{12}^* Q - \rho_{22}^* P)}{(\rho_{12}^* P - \rho_{11}^* Q)}\varepsilon = \frac{(\rho_{12}^* R - \rho_{22}^* Q)}{(\rho_{12}^* Q - \rho_{11}^* R)}\varepsilon \triangleq \frac{1}{a}\varepsilon \quad \text{Equation 42}$$

where $\triangleq$ denotes: defined as.

Under the assumptions of $K_b$ and N equal to zero, the predicted types of waves traveling in the limp porous material based on the Biot's poroelastic model are reduced from two compressional waves and one rotational wave to a single compressional wave.

Figure 9A:
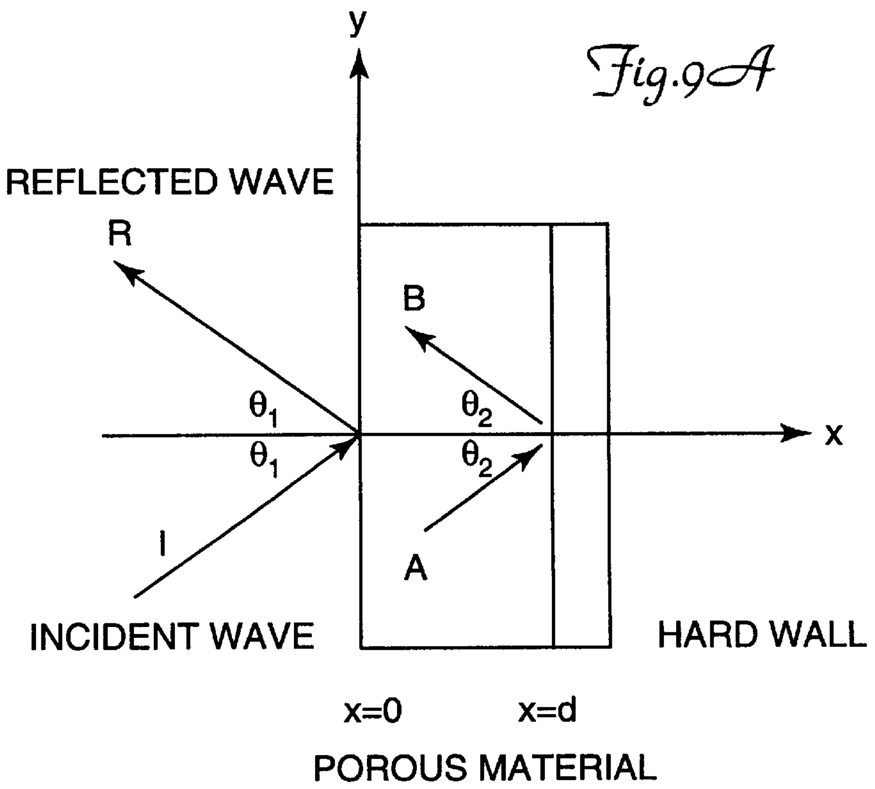

When the dimensions of the limp fibrous material are much larger than the wave length, the layer can be approximated as infinitely large and the problem can be expressed by a two-dimensional form, i.e., as the x-y plane of FIG. 9A which shows an oblique incident wave hitting a layer of porous material backed with a hard backing. In addition, the harmonic time dependence $e^{j\omega t}$ was assumed for all the field variables and was omitted throughout the derivations. In the finite depth of a limp fibrous material, the strain waves of the solid phase and the fluid phase can be expressed as the following Equation 43 and Equation 44, respectively.

$$e_s = (C_1 e^{-jk_{px}x - jk_y y} + C_2 e^{jk_{px}x - jk_y}) \quad \text{Equation 43}$$

$$\epsilon = a(C_1 e^{-ik_{px}x - ik_y y} + C_2 e^{ik_{px}x - ik_y}) \quad \text{Equation 44}$$

where c is the ambient speed of sound, $k=\omega/c_o$, $k_y = k \sin(\theta)$, $k_{px} = (k_p^2 - k_y^2)^{1/2}$, $\omega$ is the frequency in radians, and $\theta$ is the incident angle. By applying the relations of $\epsilon = \nabla \cdot \overline{U}$, $e_s = \nabla \cdot \overline{u}$ and $\nabla \times \overline{U} = \nabla \times \overline{u} = 0$, the displacements of the solid phase and the fluid phase in the x and y directions are shown in the following Equation 45, Equation 46, Equation 47, and Equation 48.

$$u_x = \frac{jk_{px}}{k_p^2}(C_1 e^{-jk_{px}x - jk_y y} - C_2 e^{jk_{px}x - jk_y}) \quad \text{Equation 45}$$

$$u_x = \frac{jk_y}{k_p^2}(C_1 e^{-jk_{px}x - jk_y y} - C_2 e^{jk_{px}x - jk_y}) \quad \text{Equation 46}$$

$$U_x = a\frac{jk_{px}}{k_p^2}(C_1 e^{-jk_{px}x - jk_y y} - C_2 e^{jk_{px}x - jk_y}) \quad \text{Equation 47}$$

$$U_y = a\frac{jk_y}{k_p^2}(C_1 e^{-jk_{px}x - jk_y y} - C_2 e^{jk_{px}x - jk_y}) \quad \text{Equation 48}$$

By substituting the volumetric strains of the solid and fluid phases into Equation 20 and Equation 22 the stresses of the solid and fluid phases can be expressed as Equation 49 and Equation 50.

$$\sigma_y = Pe_s + Q\epsilon = (P + aQ)(C_1 e^{-jk_{px}x - jk_y y} + C_2 e^{jk_{px}x - jk_y y}) \quad \text{Equation 49}$$

$$s = R\epsilon + Qe_s = (Ra + Q)(C_1 e^{-jk_{px}x - jk_y y} + C_2 e^{jk_{px}x - jk_y y}) \quad \text{Equation 50}$$

The acoustical properties, like acoustical impedance, absorption coefficient, and transmission loss, of a limp fibrous material can be predicted based on the limp model derived above by applying the proper boundary conditions at each boundary. For example, the surface impedance of a layer of limp fibrous material having depth d and backing by a hard wall can be obtained by calculating the ratio of the surface acoustical pressure and the normal particle velocity under the plane sound wave traveling toward the surface of the material with incident angle $\sigma_1$ (FIG. 9A). The boundary conditions at the surface (x=0) of the fibrous material are $-\phi P_i = s$ and $-(1-\theta)P_i = \sigma_x$ and the boundary conditions at the end (x=d) of the material are $u_x=0$ and $U_x=0$.

The stresses and the strains of the solid and fluid phases are given as described above and the incident wave having unit amplitude can be written as shown in Equation 51.

$$P_i = e^{j(\omega t - k_x x - k_y y)} + Re^{j(\omega t - k_x x + k_y y)} \quad \text{Equation 51}$$

and the particle velocity can be written as Equation 52.

$$V_i = \frac{\cos\theta_1}{\rho_o c_o}[e^{j(\omega t - k_x x - k_y y)} - Re^{j(\omega t - k_x x + k_y y)}] \quad \text{Equation 52}$$

The normal specific impedance of the fibrous material is then defined as shown in Equation 53.

$$z_n = \frac{1}{\rho_o c_o}\left(\frac{P_i}{V_i}\right)_{x=0} \quad \text{Equation 53}$$

By solving the equations, $P_i = -s/\phi$ and $V_x = j\omega(1-\phi)u_x + j\omega\phi U_x$, the surface impedance of the limp porous material is as shown in the following Equation 54, as a function of flow resistivity as shown in the previous limp model equations.

$$z_n = -j\frac{(Ra + Q)k_p \cos(k_p d)}{\rho_o c_o \phi\omega(1 - \phi + \phi a)} \quad \text{Equation 54}$$

The reflection coefficient (R) of the limp porous material backed by hard wall can be obtained by substituting the assumed solutions into the boundary conditions as described above with respect to surface impedance, and expressed in terms of $z_n$ as the following Equation 55.

$$R = \frac{Z\cos\theta_1 - \rho_o c}{Z\cos\theta_1 + \rho_o c}, \text{ or } = \frac{z_n \cos\theta_1 - 1}{z_n \cos\theta_1 + 1} \quad \text{Equation 55}$$

The absorption coefficient ($\alpha$) can be obtained by the following Equation 56.

$$\alpha = 1 - |R|^2 \quad \text{Equation 56}$$

Figure 9B:
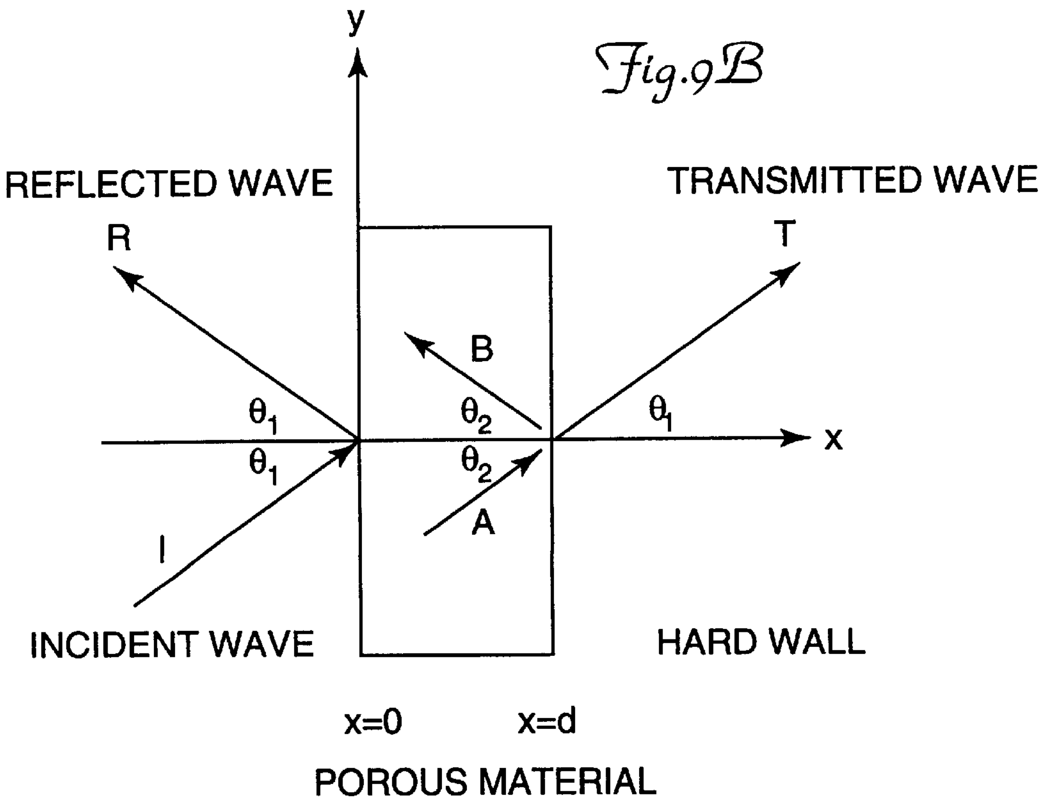

The pressure field, $P_t$, and the particle velocity of the x-component, $U_{tx}$, at the transmitted side can be expressed as the following Equation 57 and Equation 58 with reference to FIG. 9B which shows an oblique incident wave hitting on one layer of porous material, with part of the energy being reflected and the rest of transmitted through the material.

$$P_i = Te^{j(\omega t - k_x x - k_y y)} \quad \text{Equation 57}$$

$$U_{tx} = \frac{\cos\theta_1}{\rho_o c_o} Te^{j(\omega t - k_x x - k_y y)} \quad \text{Equation 58}$$

The assumed solutions need to satisfy the same boundary conditions at x=0 and new boundary conditions at x=d, i.e., $P_p=P_t$ and $U_{px}=U_{tx}$. Substituting all the assumed solutions to the four boundary conditions and rewriting them into the matrix form, yields Equation 59.

$$\begin{bmatrix} 1+R \\ \frac{\cos\theta_1}{\rho_o c_o}(1-R) \end{bmatrix} = \begin{bmatrix} T_{11} & T_{12} \\ T_{21} & T_{22} \end{bmatrix} \begin{bmatrix} Te^{-jk_x d} \\ \frac{\cos\theta_1}{\rho_o c_o} Te^{-jk_x d} \end{bmatrix} \quad \text{Equation 59}$$

The pressure transmission coefficient (T) in terms of the elements of the transfer matrix is expressed as Equation 60.

$$T = \frac{2e^{jk_x d}}{T_{11} + \frac{\cos\theta_1}{\rho_o c_o}T_{12} + \frac{\rho_o c_o}{\cos\theta_1}T_{12} + T_{22}} \quad \text{Equation 60}$$

Finally, the random transmission loss can be obtained by averaging the power transmission coefficient, $|T(\theta)|^2$, over all the incident angles based on the Paris formula described previously (Equation 13). The transmission loss (TL)=10 log $(1/\bar{\tau})$.

Generally with regard to the limp fibrous model described above, under the assumption of negligible frame elastic modulus, the limp model reduces the two dynamic equations (a fourth order equation and a second order equation) of the elastic model to a single second order equation which gives only one compressional wave. With the input of flow resistivity, the acoustical properties are calculable using the limp model as described above. However, it should be apparent that any limp model using flow resistivity connected to microstructural inputs in accordance with the present invention is contemplated for use in the present invention.

Determination of Flow Resistivity for Use by Material Models

As shown in FIG. 4, prior to using the material models 24 to calculate acoustical properties 25, macroscopic properties must be determined using the macroscopic determination routines 27. By identifying the macroscopic properties that control the acoustical properties of a material, e.g., limp polymeric fibrous materials, models providing better predictions of the acoustical properties for the porous material can be applied.

As previously described, in porous material theory, acoustical behavior is generally determined by flow resistivity, porosity, tortuosity, and shape factor. For example, for fibrous materials, the deviations of tortuosity and shape factor are not as large as such deviation for foam materials. In addition, unlike closed cell foam or partially reticulated foam, the porosity of the fibrous material can be obtained directly from the bulk density and the fiber density of the fibrous material. Therefore, once flow resistivity of a fibrous material is determined, a limp porous material model, such as described above can be used to predict the material's acoustical properties.

The manufacturing of porous materials are controlled by microstructural parameters, e.g., for fibrous materials, such parameters may include the fiber size, fiber density, percentage by weight and type of fiber constructions, etc. Therefore, the process of determining flow resistivity using the macroscopic determination routines 23 is preferably a flow resistivity model expressed in terms of the microstructural parameters such that the acoustical properties 25 can be controlled in the manufacturing process. In particular, as flow resistivity dominates the acoustical behavior of fibrous materials, a flow resistivity model expressed in terms of the microstructural parameters is particularly important in determination of acoustical properties 25 for fibrous materials, e.g., limp fibrous materials.

It will be readily apparent that although a particular flow resistivity model is expressed below, any flow resistivity model available for determining flow resistivity for a porous material may be utilized. Various flow resistivity models were described in the Background of the Invention section herein and each of these flow resistivity models and any other flow resistivity models available may be utilized in accordance with the present invention and connect the microstructural parameters to the acoustical properties to be predicted.

One particular flow resistivity model includes the following derived semi-empirical model illustrating the influences of microstructural parameters on the acoustical properties of a fibrous material. As described in the Background of the Invention section, Darcy's law gives the flow resistivity relation between the flow rate and pressure difference.

The flow resistivity model described herein predicts the flow resistivity ($\sigma$), particularly for fibrous materials, based on the microstructural parameters which can be controlled under the manufacturing process. For fibrous materials, the flow resistivity is determined by various microstructural parameters, for example, fiber diameter, as further described below with reference to FIG. 5. Although the flow resistivity model further described below is particularly relative to limp porous fibrous materials, wherein the limp fibrous materials are constituted by two fiber components, similar flow resistivity models, or the derivation thereof, for other fibrous materials will be apparent from the description herein, including materials having any number of fiber components.

With respect to the two fiber component limp fibrous material, the limp material may include a major fiber component made from a first polymer such as polypropylene and the second fiber component made from a second polymer such as polyester. Various types of fibers may be used and the present invention is not limited to any particular fibers. Each fibrous sample can be specified by the following parameters: radius $r_1$ and density $\rho_1$ of the first fiber component, radius $r_2$ density $\rho_2$ of the second fiber component, the percentage by weight of the second component $\chi$, the basis weight $W_b$ and the thickness of the fibrous material d. However, the diameters of both fiber components are not uniform over the whole material; more likely, they have a distribution over a range of fiber size. Instead of using the exact fiber diameter, the effective fiber diameter (EFD) is used. The below flow resistivity model is established based on these material parameters.

Considering Darcy's law, the flow resistivity of a fibrous material is determined by the fiber surface area per unit volume and the fiber radius of the material. Further, it is assumed that the flow resistivity of a fibrous material of low solidity containing more than one fiber component is the sum of the individual flow resistivities contributed by each component. The surface area per unit volume of the ith component can be expressed as the following Equation 61.

$$S_{vi}=p_i 2\pi r_i l_i \quad \text{Equation 61}$$

where $p_i$ is the number of fibers per unit volume, $l_i$ is the length of those fibers per unit volume, and $r_i$ is the radius of the ith fiber type. The bulk density of each component, $\rho_{bi}$, can be expressed as shown in Equation 62.

$$\rho_{bi}=p_i l_i \rho_i \pi r_i^2 \qquad \text{Equation 62}$$

where $\rho_i$ is the density of the ith fiber material. If the bulk density is known, then Equation 62 may be used to determine $p_i l_i$ as shown in Equation 63.

$$p_i l_i = \frac{1}{\pi r_i^2}\frac{\rho_{bi}}{\rho_i} \qquad \text{Equation 63}$$

Substitution of Equation 63 into Equation 61 for $S_{vi}$ then gives Equation 64.

$$S_{vi} = \frac{2}{r_i}\frac{\rho_{bi}}{\rho_i} \qquad \text{Equation 64}$$

The total fiber surface area per unit volume of a fibrous material containing n fiber components can be written as shown in Equation 65.

$$S_v = \sum_{i=1}^{n} S_{v_i} = \sum_{i=1}^{n} p_i 2\pi r_i l_i = \sum_{i=1}^{n}\frac{2\rho_{bi}}{r_i\rho_i} \qquad \text{Equation 65}$$

Therefore, this parameter which represents the contribution of each component can be used to characterize the flow resistivity of a multiple fiber component material.

Based on the assumption that the flow resistivity of each component can be expressed in terms of the fiber surface area per unit material volume and the fiber radius of each component fiber, the flow resistivity contributed from the ith fiber component can be defined as shown in Equation 66.

$$\sigma_i = A\frac{S_{Vo}^n}{r_i^m} \qquad \text{Equation 66}$$

where A is a constant, and n and m can be determined empirically. Substituting Equation 64 into Equation 66 and rearranging the variables, the flow resistivity of a fibrous material made up of a single component can be expressed as Equation 67.

$$\begin{aligned}\sigma_i &= A\left(\frac{2}{r_i}\frac{\rho_{bi}}{\rho_i}\right)^n\frac{1}{r_i^m},\\ &= A2^n\left(\frac{\rho_{bi}}{\rho_i}\right)^n\frac{1}{r_i^{m+n}},\\ &= \frac{B}{r_i^{m+n}}\left(\frac{\rho_{bi}}{\rho_i}\right)^n,\end{aligned} \qquad \text{Equation 67}$$

where $B=2^nA$ that can be treated as a constant to be determined from experimental data. When a fibrous material is made up of two components, the total flow resistivity for a two component mixture may be written as Equation 68.

$$\sigma = \sigma_1 + \sigma_2 = B\left[\frac{1}{r_1^{n+m}}\left(\frac{\rho_{b1}}{\rho_1}\right)^n + \frac{1}{\rho_2^{n+m}}\left(\frac{\rho_{b2}}{\rho_2}\right)^n\right]. \qquad \text{Equation 68}$$

Equation 68 can then be expressed in terms of microstructural parameters that are controllable in the material manufacturing process. The fraction that the second material contributes to the total density is defined as shown in Equation 69.

$$\chi = \frac{\rho_{b2}}{\rho_b} \qquad \text{Equation 69}$$

From a practical point of view, it is useful to know $(\rho_{b1}/\rho_1)$ and $(\rho_{b2}/\rho_2)$ in terms of $\rho_b$ and $\chi$, and these two quantities are defined as shown in Equation 70 and Equation 71.

$$\frac{\rho_{b1}}{\rho_1} = (1-\chi)\frac{\rho_b}{\rho_1} \qquad \text{Equation 70}$$

$$\frac{\rho_{b2}}{\rho_2} = \chi\frac{\rho_b}{\rho_2} \qquad \text{Equation 71}$$

Therefore, flow resistivity of the two component mixture can be written as Equation 72.

$$\sigma = B\rho_b^n\left[\frac{(1-\chi)^n}{\rho_1^n r_1^{n+m}} + \frac{\chi^n}{\rho_2^n r_2^{n+m}}\right] \qquad \text{Equation 72}$$

Equation 72 contains three parameters B, m and n that can be determined by finding the values that result in the best fit with the measured data. For example, three fibrous materials can be used in measurements to identify these three constants. With the three fibrous materials containing only one type of fiber having different radii $r_1$, the weight fraction $\chi$ of the second fiber is zero for each of the three fiber samples. By taking the advantage of single fiber component, the Equation 72 can be simplified and rewritten as Equation 73.

$$m\log r_1 = \log\left[\frac{B}{\sigma}\left(\frac{\rho_b}{\rho_1 r_1}\right)^n\right] \qquad \text{Equation 73}$$

The value of m is then adjusted to achieve the optimum collapse of three data sets for the three fibers and found to be 0.64. By the same token, the constant n can then be determined from the slope of the logarithmic form of Equation 72 as shown in Equation 74.

$$\log\sigma = \log B + n\log\rho_b + \log\left[\frac{1}{\rho_1^n r_1^{n+m}}\right] \qquad \text{Equation 74}$$

With m set equal to 0.64, n was determined to be 1.61 and B, the intercept, was determined as $10^{-5.7}$ from the slope and the intercept of the line fitted to all the data sets for the three fibers simultaneously. The final expression that can be used to compute the flow resistivity of a two fiber component fibrous material is shown in Equation 75.

$$\sigma = 10^{-5.7}\rho_b^{1.61}\left[\frac{(1-\chi)^{1.61}}{\rho_1^{1.61}r_1^{2.25}} + \frac{\chi^{1.61}}{\rho_2^{1.61}r_2^{2.25}}\right] \qquad \text{Equation 75}$$

This final semi-empirical expression allows the flow resistivity of a fibrous material to be expressed in terms of parameters that are controllable in the manufacturing process.

In addition to the macroscopic property determination routines 23 including routines for determining flow resistivity, the other macroscopic properties also have routines for calculating values for such properties which are known to one skilled in the art. For example, the porosity ($\phi$) can be expressed in terms of the bulk density ($\rho_b$) of the expanded porous material and the density ($\rho_f$) of the material from which the expanded material is made (i.e., $\phi=1-\rho_b/\rho_f$). For example, for fibrous materials, porosity is typically slightly less than 1, e.g., 0.98, and tortuosity is slightly greater than about 1, e.g., 1.2).

Example—Prediction for Homogeneous Material

This example gives an illustrative embodiment of the use of the present invention for prediction of acoustical properties for a homogeneous porous two fiber component fibrous material for which the limp porous model 42 described above is applicable. The example shall be described with reference to FIG. 1 and FIG. 5; FIG. 5 being an embodiment of the prediction routines of the main program 20 for predicting acoustical properties of homogeneous porous two fiber component fibrous materials. Although the routines hereafter will be described relative to the design of a two type fiber component fibrous material, the general flow of the program routines for the design of other materials is substantially similar such that the general concepts as defined by the accompanying claims are applicable to various other single and multiple fiber materials, as well as other materials, as would be apparent to one skilled in the art from the detailed description herein.

Upon initiation of the main program 20, the user selects a command to choose to design homogeneous materials, followed by the user selecting to work with the manufacturing controls of a two fiber component fibrous material. The limp polymeric fibrous material considered here is comprised of two different fibers; one made from polypropylene and the other made from polyester, although various other materials may be used. The former fiber component is Blown Micro Fiber (BMF), which is the major constituent of the material; the latter fiber component is staple fiber which has a much larger fiber diameter and is used to provide the lofty thickness. The acoustical properties of the fibrous materials are determined by the sets of parameters of these two fiber components and the ratio of their weights. Since the limp fibrous materials may vary in thickness, the basis weight (i.e., the mass per unit area) of the materials is more frequently used than the bulk density.

In addition, since the fibers contained in a real material do not have a uniform diameter, the Effective Fiber Diameter (EFD, a mean value calculated via a flow resistivity measurement) is used in the acoustical model. As described in U.S. Pat. No. 5,298,694, EFD can be estimated by measuring the pressure drop of air passing through the major face of the web and across the web of the material as outlined in the ASTM F 778.88 test method. Further, EFD means that fiber diameter calculated according to the method set forth in Davies, C. N., "The Separation of Airborne Dust and Particles," Institution of Mechanical Engineers, London, Proceedings 1B (1952). The air flow resistance is defined as the ratio of the pressure difference across a testing sample to the air flow rate through it and the air flow resistivity is the flow resistance normalized by the sample thickness. The porosity of the fibrous material which is defined as the ratio of the volume occupied by fluid within the material to its total volume can be calculated from the measurable fiber density and bulk density of the sample. The tortuosity is defined as the ratio of the path length for an air particle to pass through the porous material to the straight distance. For fibrous materials, the tortuosity is typically slightly greater than 1, e.g., 1.2 for typical fibrous materials.

After choosing to work with the microstructural parameters of the material, the user is prompted to choose a material model 42 for use in predicting the acoustical properties 50, i.e., rigid material model 44, elastic material model 46, and limp material model 42. As the user recognizes that the limp model was specifically determined for use with such fibrous materials, the user selects the limp frame model 42.

Upon choosing the limp model 42, the system 10 prompts the user to enter critical microstructural parameters that the macroscopic determination routines 37 need to determine the macroscopic properties, i.e., flow resistivity ($\sigma$), bulk density ($\rho$), and porosity ($\phi$). Such microstructural parameters include BMF fiber EFD (micron), staple fiber diameter (denier), percentage of staple fiber by weight (%), thickness of the material (cm), basis weight (gm/$m^2$), density of BMF fiber (kg/$m^3$), and density of staple fiber (kg/$m^3$). After confirming that the correct information is input, the system 10 prompts the user to choose one of various acoustical properties, including performance measures, 50. Such acoustical properties 50 may include the group of normal absorption coefficient ($\alpha$), reflection coefficient (R), specific acoustical impedance (Z) as shown by block 48, normal transmission loss (TL) as shown by block 51, or may include other acoustical properties such as random transmission loss, random absorption coefficient, arbitrary incidence absorption, and arbitrary incidence transmission. Further, the acoustical properties may be defined in terms of a performance measure, such as noise reduction coefficient (NRC) as shown in block 52 or may include other performance measures such as speech interference level (SIL).

It is apparent from FIG. 5, that if the user had chosen the elastic model 46, a set of microstructural parameters would be input and also the macroscopic property of frame bulk elasticity ($E_1$) as shown in block 39 would be input. This elasticity input 39 (which is an input macroscopic property as opposed to a program calculated macroscopic property) is required to calculate acoustical properties 50 using the elastic model, along with the other microstructural inputs 36.

Figure 16:
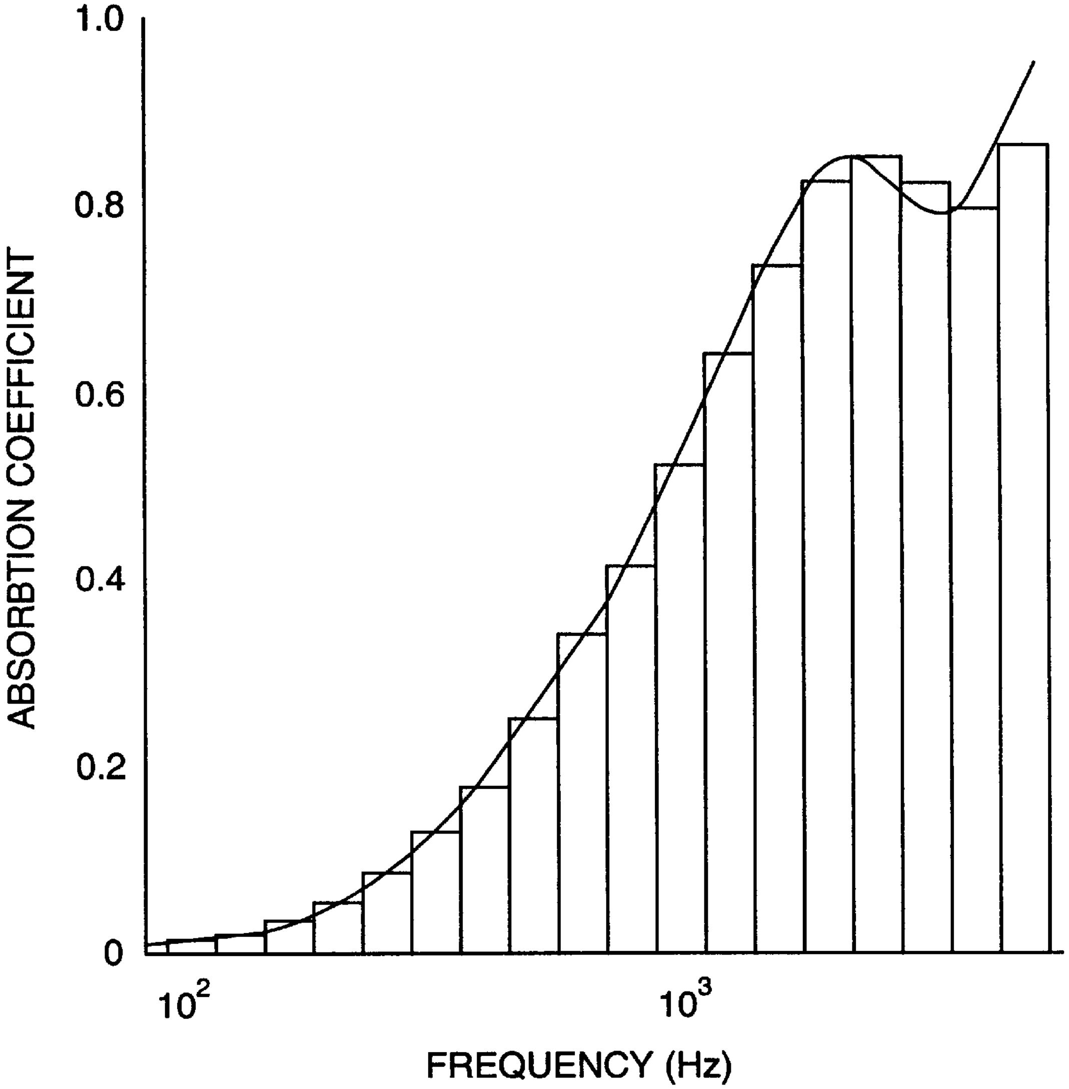

With the microstructural parameters including BMF fiber EFD=x1 micron, and, for example, staple fiber diameter=6 denier, percentage of staple fiber by weight=35%, thickness of the material=3.5 cm, basis weight=400 gm/$m^2$, density of BMF fiber=910 kg/$m^3$, density of staple fiber=1380 kg/$m^3$ and normal absorption coefficient chosen as the to be determined acoustical property, the system provides a response to the user that flow resistivity=6.1785e+003; porosity=0.9893; bulk density=11.4286; and that over a frequency range of 100.00 Hz to 6300.00 Hz, the normal absorption coefficient varies from 0.01 to 0.93. A graph showing such absorption coefficient determinations is shown in FIG. 16. The noise reduction coefficient (NRC) can be determined based on the normal absorption coefficients determined over the range of frequencies and NRC=0.4143. These values are determined through the calculations using the Equations of the limp model derived above and the flow resistivity model as derived above.

OPTIMIZATION ROUTINES

As described previously above, if the user chooses to determine a set of microstructural parameters for desired acoustical properties of a particular material, i.e., optimization of the particular material (for example, when the acoustical properties of a material as predicted using the prediction routines do not satisfy the properties as desired by the user), then the user is given options for use of optimization routines of the homogeneous material prediction and optimization program 30 such as program 34 as further described below.

Figure 6:
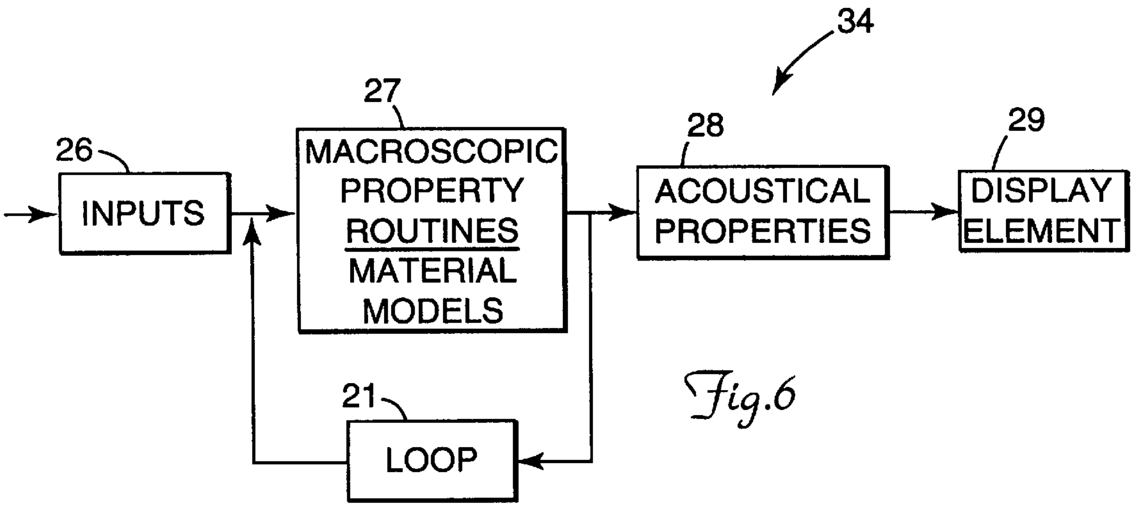
FIG. 6 is a more detailed block diagram of the optimization routines of FIG. 3.

The optimization routines 34 (FIG. 3) for determining an optimum set of microstructural parameters for desired acoustical properties for homogeneous porous materials is further shown in a more detailed block diagram form in FIG. 6. The optimization routines 34 generally include macroscopic property determination routines and material model routines 27 for determination of macroscopic properties of a homogeneous porous material being designed as a function of microstructural parameter inputs 26 and for determination of acoustical properties 28 for the homogeneous porous material. For example, the routines 27 may include the macroscopic determination routines 37 and the materials models 40 of FIG. 5. The acoustical properties. Values for acoustical properties, e.g., performance measures such as acoustical properties averaged over some frequency range, based on the specified input material manufacturing microstructural parameters can be calculated.

The optimization routines 34 include a closed loop 21 between the generation of acoustical properties 28 for the material being optimally designed and the microstructural parameters 26 of the material such that an optimal set of microstructural parameters can be determined for the particular acoustical property 28, e.g., absorption coefficient averaged across some frequency range (NRC) or the random incidence transmission loss averaged across some frequency range (SIL). The closed loop provides for repetitive processing of the acoustical property value over ranges specified for one or more microstructural parameters. As described previously, to optimize the material to achieve desired acoustical properties, the numerical optimization process is used to adjust the material manufacturing parameters in such a way that the desired acoustical property value is achieved.

As would be expected, the optimization process must be constrained to allow for realistic limits in the manufacturing process. The optimization process allows an optimal design for the homogeneous material to be achieved while satisfying practical constraints on the manufacturing process. The results of the optimization routines, e.g., values for the acoustical property versus one or more ranges for one or more microstructural parameters, is then provided by a display, e.g., 2-dimensional plot or 3-dimensional plot, or in tabular form, to the user as will be shown further below and as generally represented by the display element 29.

It is readily apparent to one skilled in the art that the details of the microstructural inputs 26, the macroscopic property determination routines and material models 27, the acoustical properties 28, and the display elements 29 will vary depending upon the types of materials to be designed. The optimization routines hereafter will be described relative to the design of a two fiber component fibrous material, but the general flow of the program routines for the design of other materials is substantially similar such that the general concepts as defined by the accompanying claims are applicable to various other single and multiple fiber materials, as well as other porous materials, as would be apparent to one skilled in the art from the detailed description herein.

Example—Optimization of Homogeneous Material

Figure 7:
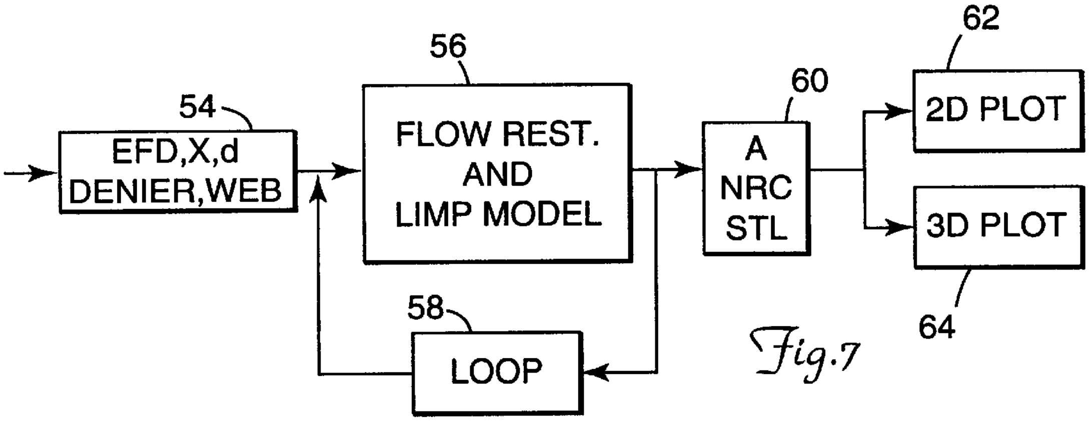
FIG. 7 is a detail block diagram of an embodiment of the optimization routines of FIG. 6.

In further detail with respect to the optimization routines 34 including the microstructural inputs 26, the macroscopic property determination routines and material models 27, the acoustical properties 28, and the display elements 29, this example shall be described with further reference to FIG. 7. The illustrative embodiment of the optimization process 34 shall be described in a manner in which a user would interface with the acoustical property prediction and optimization system 10 (FIG. 2) including main program 20.

If the user chooses to determine a set of microstructural parameters for desired acoustical properties of a material, i.e., optimization of the particular material, then the user is given options for use of optimization routines of the homogeneous material prediction and optimization program 30 such as the program shown by the block diagram of FIG. 7. Upon choosing to determine an optimized set of manufacturing microstructural parameters of a material, the system 10 prompts the user to choose whether the user wishes to use one of various material models of the routines 56. The material models of routines 56 may include a limp frame model 42, a rigid frame model 44 and an elastic frame model 46 for use with the material like that described with reference to the example of the prediction routines (See FIG. 5).

Upon selection of the material model to be used, the system 10 prompts the user to provide the manufacturing microstructural properties necessary for the macroscopic determination routines of routines 56 to determine the macroscopic properties necessary to calculate the acoustical performance measures 60 using the selected material model of the routines 56. Further, the user is also prompted to enter minimum and maximum values along with incremental steps within the minimum/maximum range for use in stepping the routines through acoustical property calculations for the incremental steps specified. A loop 58 is closed between the acoustical properties 60, e.g., absorption coefficient, noise reduction coefficient, etc., for the material being optimally designed and the microstructural parameters 54 of the material such that the microstructural parameters 54 can be optimized using the calculated acoustical property values.

Fibrous materials are useful in many noise reduction applications, and in many cases, there are restrictions on the usage of such fibrous materials, such as weight limitation, space constraint, etc. From an economic viewpoint, it is important to achieve the optimal acoustical properties of a fibrous material based on the requirements of each specific application. In general, the acoustical properties of fibrous materials are determined by fiber parameters like fiber density, diameter, shape, percentage by weight of each component and the construction of fiber. However, the fiber density, fiber shape and the fiber construction will be fixed for a fibrous material made from a certain type of material and produced by a particular manufacturing process. Therefore, as previously described, optimization of the acoustical performance of the fibrous material can be conducted, for example, by controlling such microstructural parameters, e.g., the fiber diameter, percentage by weight of each component, etc.

This example described with reference to FIG. 7, is specifically illustrative of fibrous materials constituted of two fiber components, e.g., fibers made from polypropylene and polyester. There are five variables (two fiber radii, i.e., expressed as EFD and denier; percentage by weight of the second component $\chi$; material thickness d; and material basis weight $W_b$), that can be varied to search for the fibrous materials having optimal acoustical properties, subject to certain manufacturing limiting restrictions.

The optimization process is described for the five parameters for single layers of homogeneous polymeric fibrous materials using the acoustical properties, i.e., absorption coefficients and transmission loss, based on the limp porous material model and the semi-empirical flow resistivity equation as described herein which was particularly derived for limp porous materials. In other words, macroscopic determination routines and material model routines 56 of the optimization routines 34 as shown in FIG. 7 include the use of the flow resistivity Equation 75 and the limp porous material model previously derived herein.

Although this illustrative example is described relative to two fiber component fibrous material, and specific flow resistivity and material models, it is readily apparent that other flow resistivity equations and material models may be used in accordance with the present invention and that the present invention is in no manner limited to the illustrative equation and models used in this illustration or to the design of a particular material, e.g., two fiber component fibrous material.

As generally described above with regard to this example, upon initiation of the main program 20, the user selects a command to choose to design homogeneous materials, followed by a selection to optimize the design of the manufacturing controllable microstructural parameters of a two fiber component fibrous material. The two fiber component fibrous material used in this example is as described in the above example of the prediction routines, i.e., two different fiber components: the major fiber (BMF) made from polypropylene and the other fiber (staple fiber) made from polyester. The EFD of BMF is measured by micron, and the diameter of staple fiber is measured by Denier (the mass in grams of 9000 meters of fiber). In the following context, EFD is used to indicate the diameter of BMF and Denier is used for that of staple fiber.

Example of Optimization for Sound Absorption

To analyze and optimize the five microstructural parameters of the fibrous material on its acoustical properties, the normal absorption coefficients are calculated for the fibrous materials having a material parameter varied over a range of values in order to find the optimal values for those parameters to form a fibrous material giving the best sound absorption. The acoustical property of the material for the optimization is defined as the acoustical performance measure of the average absorption coefficient (e.g., the normal incidence absorption coefficient averaged over a range from 500 Hz to 4K Hz) divided by its bulk density. In other words, the optimization process is to achieve the highest sound absorption per unit density of the fibrous material being designed. A constraint on the optimization process was applied such that the average sound absorption coefficient is always 0.9 or greater.

The range of the EFD used in this optimization process is based on the current manufacturing capability; the values were set to x1, x2, x3, and x4 microns respectively. The staple fiber diameter was allowed to vary from 2 to 16 Deniers, and the percentage of staple fiber by weight was varied from 10% to 70%. The thickness and the basis weight were varied from 2 cm to 6 cm and from 50 g/m$^2$ to 2000 g/m$^2$, respectively. Reasonably fine intervals were used for each of the parameters and an optimal search was then performed to find the material having the best sound absorption per unit density within this five-dimensional parameter space.

Within all possible combinations of the five parameters, an optimal diameter of fibers is found. Two tabular lists of a few of the resulting acoustical properties of the materials for defined microstructural properties having defined ranges associated therewith are shown in FIGS. 17A and 17B, wherein absorption coefficient per unit density is shown in the first column.

Optimization of NRC Based on Thickness and Basis Weight

Sound absorption coefficient is a function of frequency and sound incident angle. There are various definitions of sound absorbing efficiency, e.g., averaging absorption coefficients over frequencies. From an optimization viewpoint, it is desirable to use a single number to indicate the sound absorbing performance of a material. Therefore, instead of averaging the absorption coefficient over frequencies or using some other definition of sound absorbing performance which could be used in the optimization illustration that follows, NRC (Noise Reduction Coefficient) is used as the performance measure in the following illustrations of optimization. NRC is defined as Equation 76.

$$NRC = \frac{\alpha_{250} + \alpha_{500} + \alpha_{1000} + \alpha_{2000}}{4} \quad \text{Equation 76}$$

where $\alpha_n$ is the normal absorption coefficient averaged over an octave band centered on n Hz. It should be noted that the NRC gives a greater emphasis to the low frequency absorption than does the linearly averaged absorption and the materials having the same NRC may give different absorption coefficients over a range of frequencies. In this illustration, the band $\alpha_{250}$ is replaced by $\alpha_{4000}$ to have the same frequency average of SIL for transmission loss as described further below.

Figure 18A:
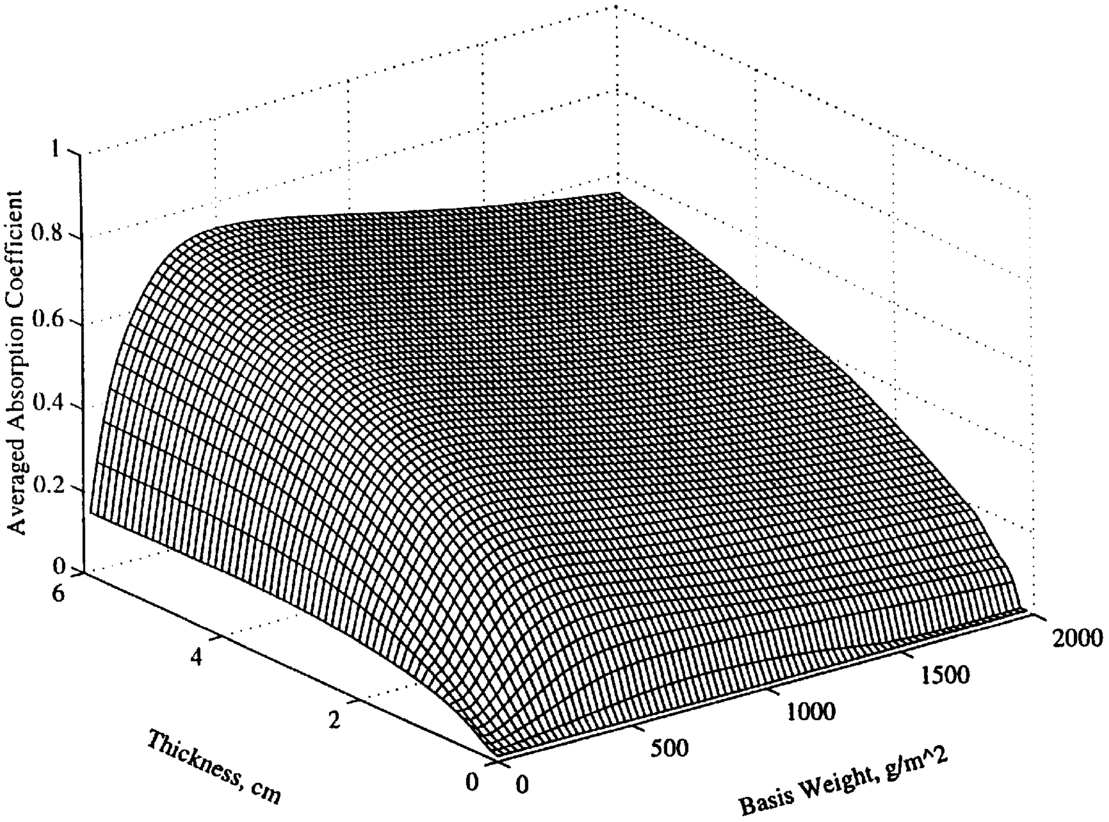
Figure 18B:
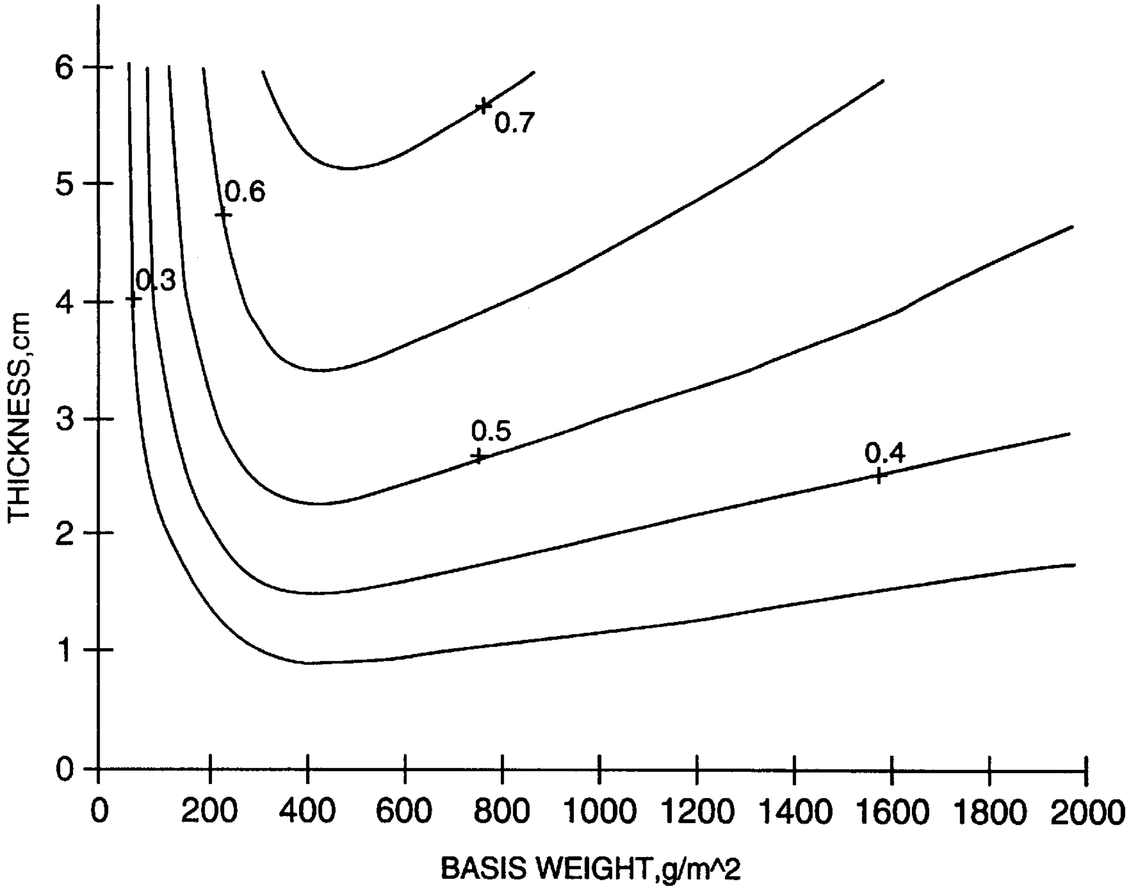
Figure 18C:
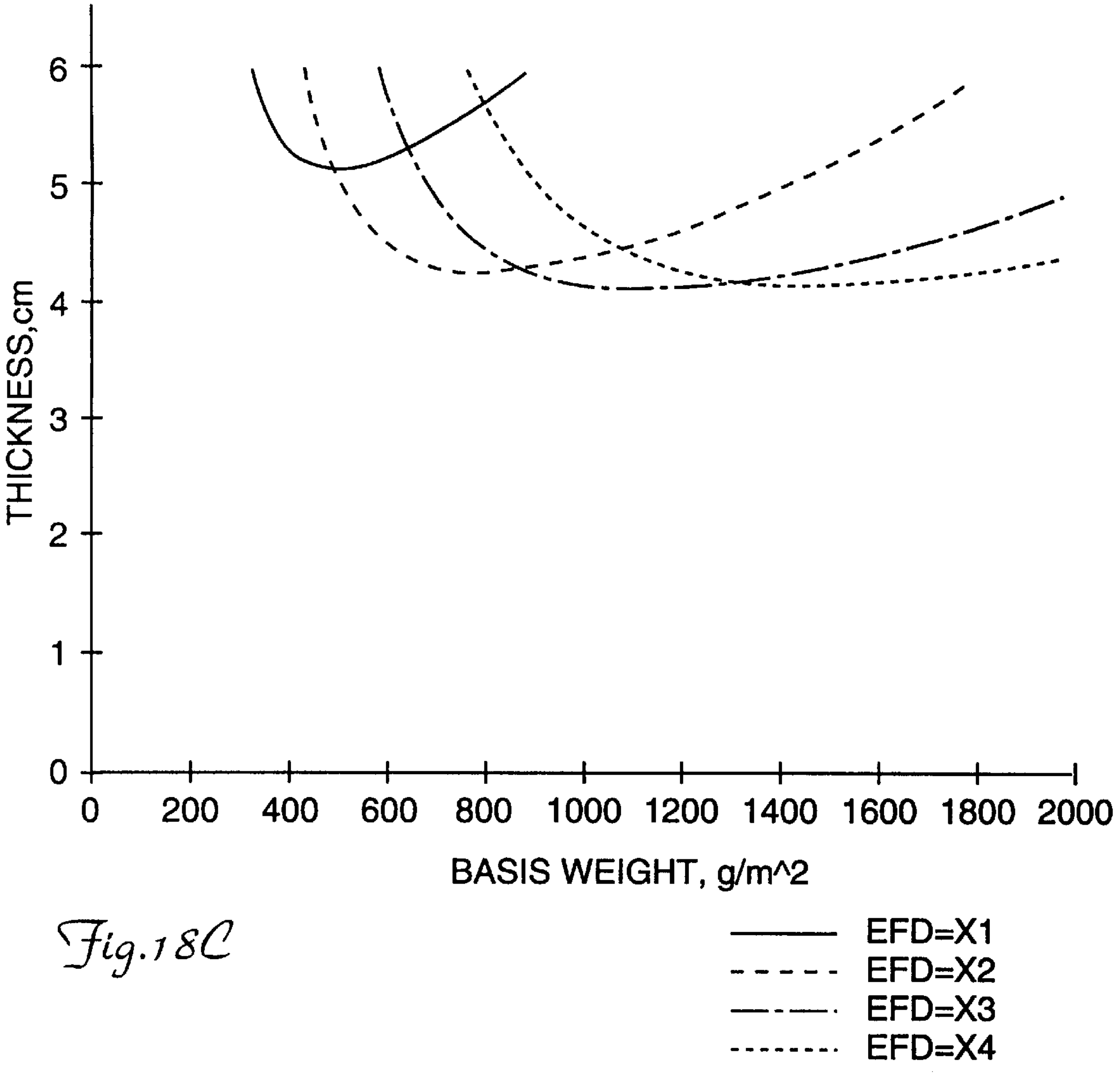

Using the limp porous material model and the semi-empirical flow resistivity equation derived herein, the optimal thickness and the optimal basis weight of fibrous materials having EFD of x1, x2, x3, and x4 microns, respectively, were searched using the closed loop 58. In this particular optimization, the user chose to vary the thickness from 0 to 6 cm, and the basis weight of the fibrous material was varied from 0 to 2 Kg/m$^2$; the staple fiber diameter and its percentage by weight were kept constant as 6 Denier and 10%, respectively. The results are illustrated by showing the NRC of each material versus thickness and basis weight graphically; a 3-D surface plot and a 2-D constant NRC contour plot of the materials having x1 micron EFD are shown in FIG. 18A and FIG. 18B, respectively. Further, the four contours of NRC equal to 0.7 with respect to different EFDs can be plotted as shown in FIG. 18C.

Optimization of NRC Based on EFD and Basis Weight

Figure 19A:
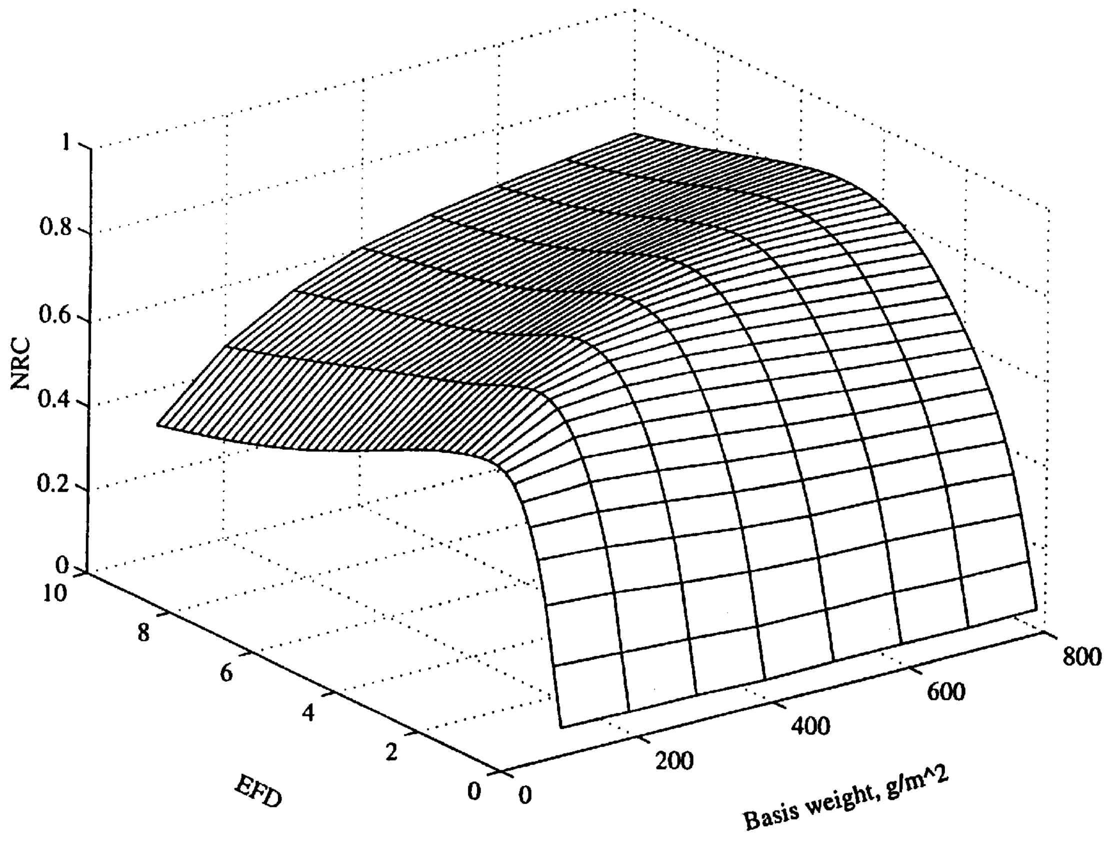
Figure 19B:
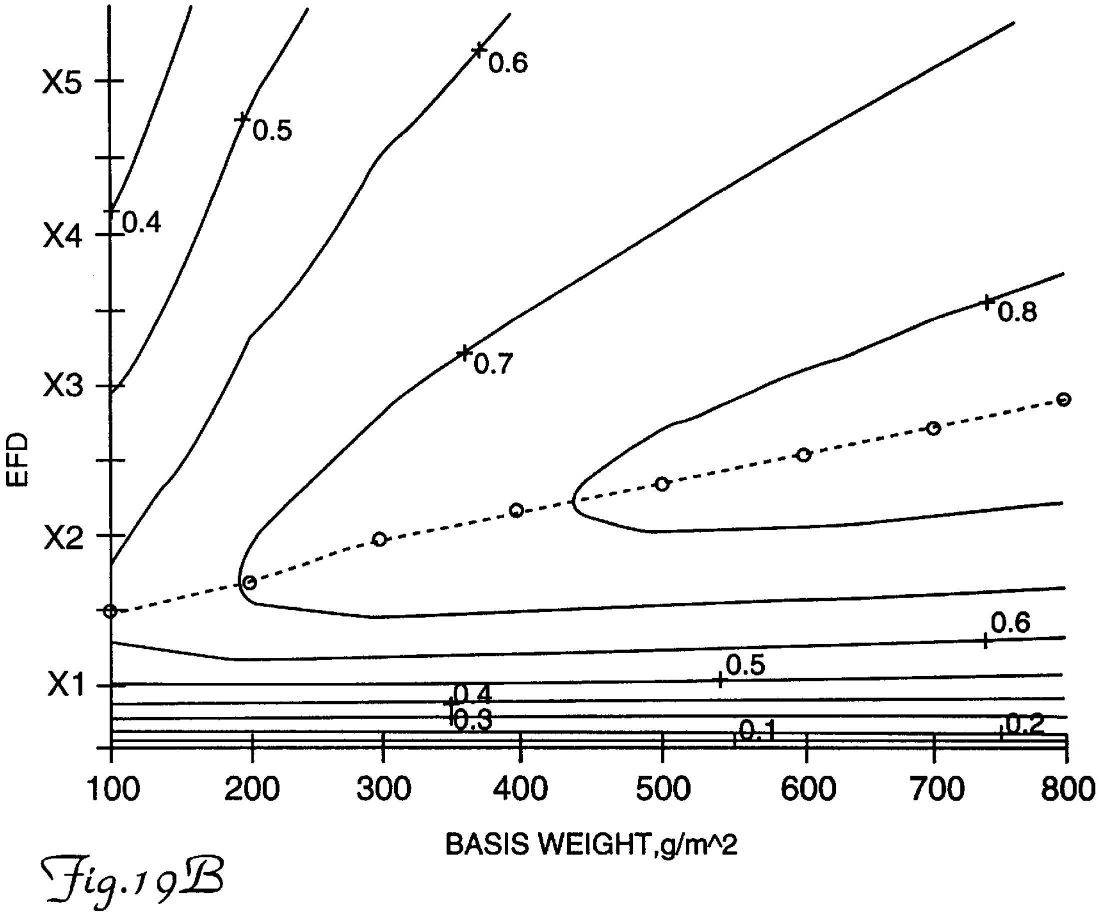

The optimal EFD and basis weight for the fibrous material providing the best NRC when the thickness and constituents of staple fiber are kept the same can also be determined through an optimization process. For example, when the user varies the EFD from x1 to x6 microns and the basis weight from 0 to 800 g/m$^2$, when the fibrous materials have a 3.0 cm thickness and 35% by weight of 6 Denier staple fiber, NRC is computed over the ranges of EFD versus basis weight using the routines 56 and calculations for NRC. The results are shown by a 3-D plot 64 of FIG. 19A and a 2-D plot 62 as shown in FIG. 19B. As shown in FIG. 19B, the dotted line indicates the optimal fiber EFD.

Optimization of SIL Based on Thickness and Basis Weight

To optimize the fibrous materials for transmission loss, a single number (SIL) is used as a performance measure. The Speech Interference Level SIL, standardized by the American National Standard in 1977, is an unweighted average of the noise levels in the four octave bands centered on 500 Hz, 1000 Hz, 2000 Hz and 4000 Hz, and is shown as Equation 77.

$$SIL = \frac{TL_{500} + TL_{1000} + TL_{2000} + TL_{4000}}{4} \qquad \text{Equation 77}$$

Given that the incident sound field has equal energy in each of the four octave bands, the SIL as defined here gives an indication of the Speech Interference Level.

Figure 20A:
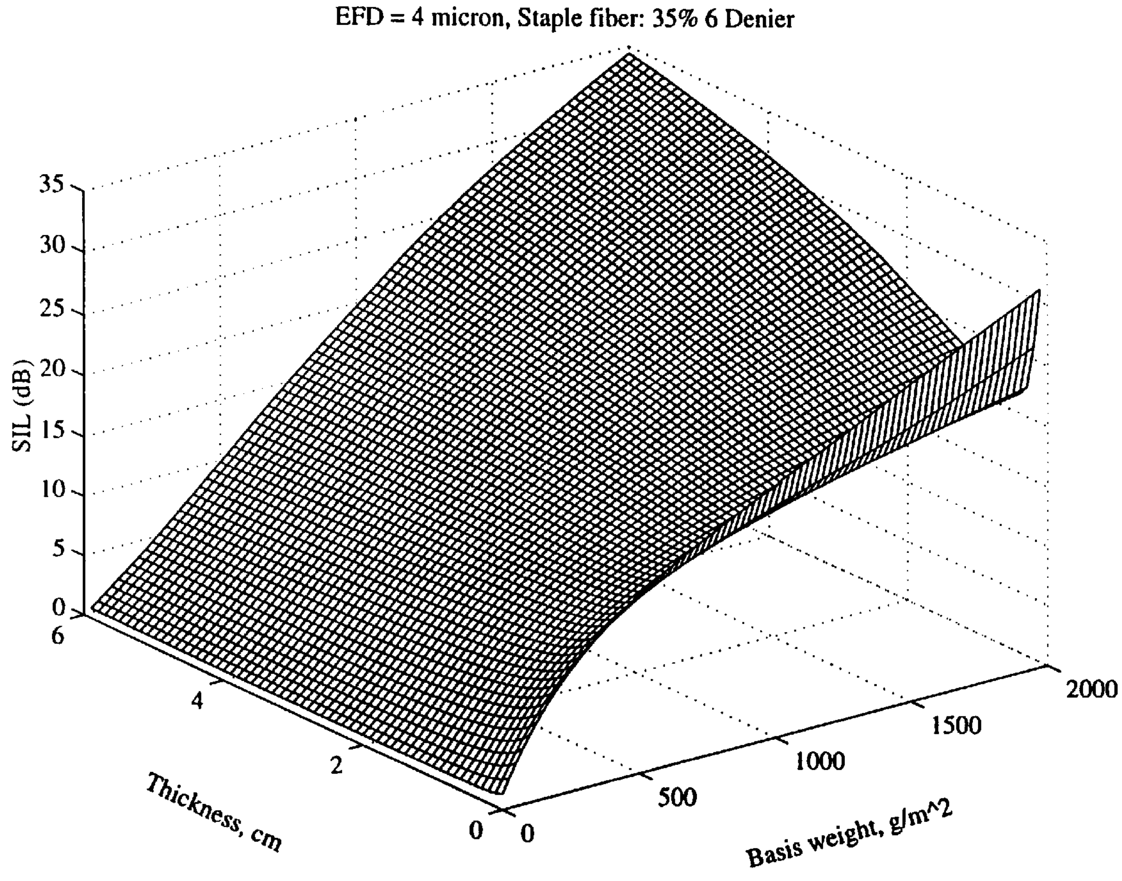
Figure 20B:
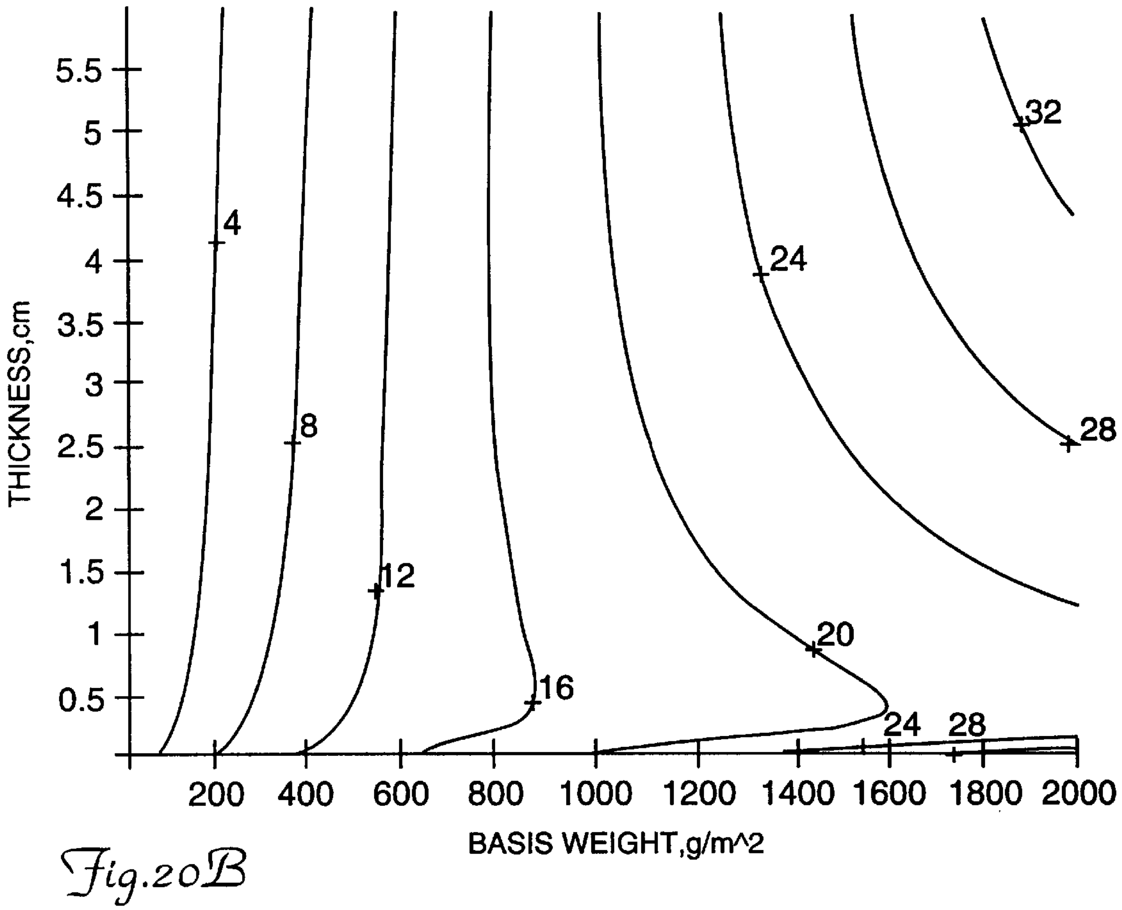

An illustration of optimizing SIL based on fibrous materials defined by the user having x1 micron EFD and 35% of 6 Denier staple fiber is performed for the variable parameters of thickness versus basis weight of the material. The 3-D surface SIL plot and 2-D constant SIL contour plots resulting from the computations using the routines 56 are shown in FIG. 20A and FIG. 20B, respectively. Similar optimizations can be performed for the fibrous materials having different EFDs with additional surface and contour plots then being available.

Optimization of SIL Based on EFD and Basis Weight

Likewise, EFD and basis weight can be varied and optimized for the fibrous material providing the best SIL when the thickness and constituents of staple fiber are kept the same. Similar 3-D and contour plots can be provided for such optimization.

GENERAL EMBODIMENT OF PREDICTION/ OPTIMIZATION FOR ACOUSTICAL SYSTEMS

Figure 10:
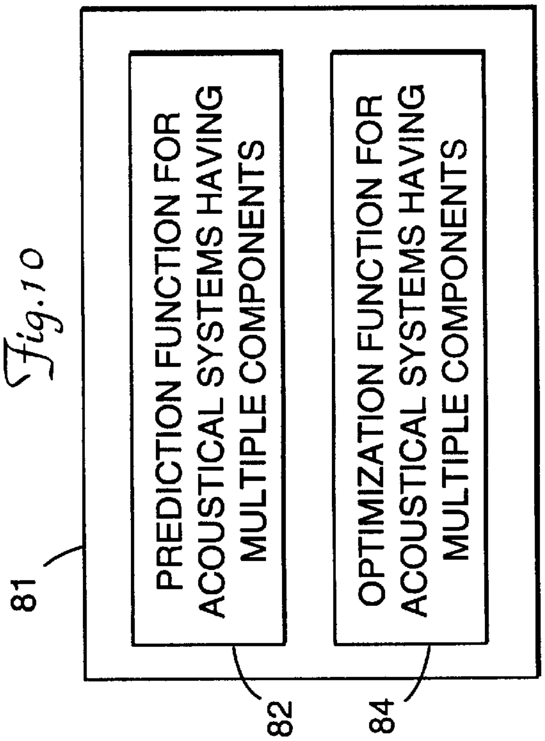
FIG. 10 is a general embodiment of the prediction and optimization program of the main program of FIG. 1 for use with acoustical systems.

In one embodiment of the main program 20, the acoustical prediction and optimization program 80 for use in design of acoustical systems is provided by acoustical system prediction and optimization program 81 as shown in FIG. 10. The acoustical system prediction and optimization program 81 includes prediction routines 82 for predicting acoustical properties of an acoustical system having multiple components and optimization routines 84 for optimizing the configuration of the multiple components of the acoustical system. Generally, an acoustical system may include any type of component such as material layers which would be used by one skilled in the art for acoustical purposes, e.g., porous materials such as fibrous materials, permeable or impermeable barriers such as resistive scrim or stiff panels, and defined spaces, e.g., air spaces. It is readily apparent that any number of layers of materials and defined spaces may be utilized in an acoustical system as shown by the acoustical system generally represented in FIG. 11. The design of any multiple component acoustical system is contemplated in accordance with the present invention.

PREDICTION ROUTINES

Generally, the acoustical system prediction routine 82 is used to predict the acoustical properties of multiple component layered systems. The acoustical system prediction routine 82 is used to predict the acoustical properties of multiple component layered acoustical systems with use of a transfer matrix process.

Generally, in the interface of two media, if the sound field in one medium is known, we can obtain the pressure and particle velocity of the second medium based on the force balance and the velocity continuity across the boundary. The relations between the two pressure fields and velocities across a boundary can be written in the form of a 2 by 2 matrix. Similarly, a transfer matrix can also be obtained for pressure and particle velocity crossing the medium. After obtaining the transfer matrix for each component defining the relationship between acoustical states at the boundaries of the component based on the input set of parameters and/or properties provided for the component, the total transfer matrix for the acoustical system is attained by multiplying all the component transfer matrices as shown by the following Equation 78.

$$[T]=[T_1][T_2] \ldots [T_n] \qquad \text{Equation 78}$$

Figure 11:
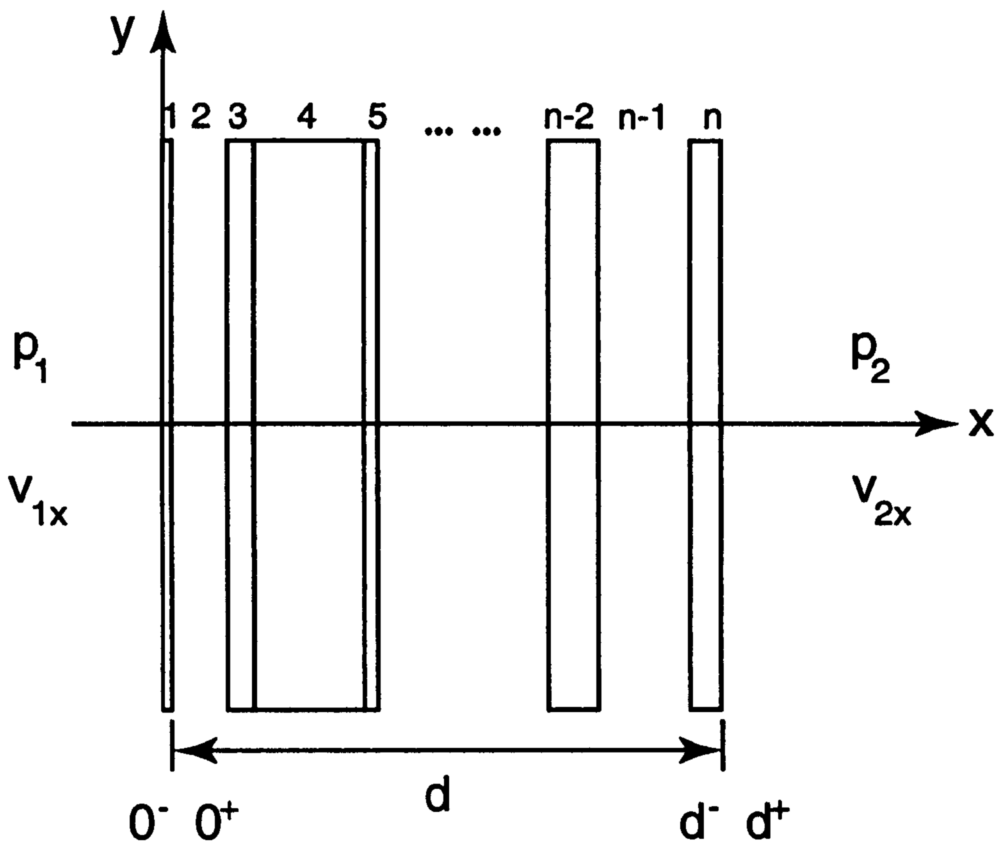
FIG. 11 is an illustrative diagram generally showing an acoustical system.

Since the total transfer matrix T is also a 2 by 2 matrix, the relationships between the two pressure fields and the normal component of the particle velocities crossing the multi-layered structure can be expressed as Equation 79.

$$\begin{bmatrix} p_1 \\ v_{1x} \end{bmatrix}_{x=0} = \begin{bmatrix} T_{11} & T_{12} \\ T_{21} & T_{22} \end{bmatrix} \begin{bmatrix} p_2 \\ v_{2x} \end{bmatrix}_{x=d} \qquad \text{Equation 79}$$

where $p_1$ and $p_2$ are the pressure on both surfaces, $v_{1x}$ and $v_{2x}$ are the air velocities of the x-component (normal to the surface of the structure) and d is the total thickness of the multi-layered acoustical system as shown in FIG. 11. By using the transfer matrix process, acoustical properties of the acoustical system, e.g., surface impedance, absorption coefficient, and transmission coefficient, can be determined.

Transfer Matrix Process for Normal Impedance and Absorption Coefficient

Considering a layer of porous material backed by a hard wall, the normal impedance of the material can be obtained with use of the transfer matrix. The acoustical pressure fields in front of the material can be written in terms of the incident plane wave with unit amplitude and the reflected wave as shown in Equation 80.

$$p_1=e^{-j(k_x x+k_y y)}+Re^{j(k_x x-k_y y)} \qquad \text{Equation 80}$$

Based on the assumption of small amplitude, the particle velocity is obtained by applying the linear inviscid force equation to $p_i$ resulting in Equation 81.

$$v_{1x} = \frac{\cos\theta}{\rho_0 c_o}\left[e^{-j(k_x x+k_y y)} - Re^{j(k_x x-k_y y)}\right] \qquad \text{Equation 81}$$

The harmonic time dependence term $e^{jwt}$ is assumed for each field variable and is omitted through out the derivations. In addition, the term $e^{-jk_y y}$ disappears under the assumption of infinite structure which was valid when the wave length l is much less than the geometry of the structure. Due to the hard wall backing, the normal component of the fluid velocity is zero, i.e., $v_{2x}=0$; and the surface pressure and normal velocity are expressed as the following Equation 82 and Equation 83.

$$p_1|_{x=0}=T_{11}p_2|_{x=d} \qquad \text{Equation 82}$$

$$v_{1x}|_{x=0}=T_{21}p_2|_{x=d} \qquad \text{Equation 83}$$

By taking the ratio of the acoustical pressure and the normal particle velocity, the normal impedance of the material is shown in Equation 84.

$$z_n = \frac{1}{\rho_0 c_o} \frac{p_1}{v_{1x}}\Big|_{x=0} = \frac{1}{\rho_0 c_o} \frac{T_{11}}{T_{21}} \quad \text{Equation 84}$$

The normal incidence reflection coefficient (R) and the absorption coefficient ($\alpha$) are given in the following Equation 85 and Equation 86, respectively.

$$R = \frac{z_n - 1}{z_n + 1} \quad \text{Equation 85}$$

$$\alpha = 1 - |R|^2 \quad \text{Equation 86}$$

One skilled in the art may generalize these equations to the case of non-normal incidence.

Transfer Matrix Process for Pressure Transmission Coefficient

Similarly, the sound transmission of a multiple component layered acoustical system can be obtained by applying the transfer matrix method. The pressure field and the normal particle velocity on the other side of the material are expressed as Equation 87 and Equation 88.

$$p_2 = Te^{-j(k_x x + k_y y)} \quad \text{Equation 87}$$

$$v_{2y} = \frac{\cos\theta}{\rho_0 c_o} Te^{-j(k_x x + k_y y)} \quad \text{Equation 88}$$

If the same media are on both sides of the material, the wave number would be the same on both sides and the transmission angle would be the same as the reflection angle. By substituting Equation 80, Equation 81, Equation 87, and Equation 88 into Equation 79, one can obtain the following matrix Equation 89.

$$\begin{bmatrix} 1 + R \\ \frac{\cos\theta}{\rho_o c_o}(1 - R) \end{bmatrix} = \begin{bmatrix} T_{11} & T_{12} \\ T_{21} & T_{22} \end{bmatrix} \begin{bmatrix} Te^{-jk_x d} \\ \frac{\cos\theta}{\rho_o c_o} Te^{-jk_x d} \end{bmatrix} \quad \text{Equation 89}$$

and the pressure transmission coefficient (7) can be obtained as Equation 90 from which transmission loss can be determined as previously described.

$$T = \frac{2e^{jk_x d}}{T_{11} + \frac{\cos\theta}{\rho_0 c_o} T_{12} + \frac{\rho_0 c_o}{\cos\theta} T_{21} + T_{22}} \quad \text{Equation 90}$$

Transfer Matrices of Various Materials for Use in the Transfer Matrix Process Various components may be used for multiple component layered acoustical systems. For example, such components may include but are clearly not limited to resistive scrims, limp impermeable membranes, limp fibrous materials, air spaces and stiff panels. The transfer matrix for each of such above listed components is provided below. However, the transfer matrix for other components can similarly be derived as is known to one skilled in the art and the present invention is in no manner limited to use of such transfer matrices or particular components listed or derived. For the layered materials having negligible thickness, the wave propagation inside the material layer can be ignored and only the material impedance needs to be considered. For fibrous materials and air space, the wave propagation within the media and across the boundaries needs to be considered.

Transfer Matrix for Resistive Scrim

A resistive scrim is a thin layer of material having area density $m_s$ (Kg/m$^2$), flow resistance $\sigma_s$ (Rayls), negligible thickness and no stiffness. The force balance equation and the velocity continuity equation are given as Equation 91 and Equation 92.

$$p_1 - p_2 = Z_r v_{1x} \quad \text{Equation 91}$$

$$v_{1x} = v_{2x} \quad \text{Equation 92}$$

These two equations can be rewritten into a matrix Equation 93.

$$\begin{bmatrix} p_1 \\ v_{1x} \end{bmatrix}_{x=0} = \begin{bmatrix} T_{11} & T_{12} \\ T_{21} & T_{22} \end{bmatrix} \begin{bmatrix} p_2 \\ v_{2x} \end{bmatrix}_{x=d} \quad \text{Equation 93}$$

Then, the transfer matrix for a resistive scrim by using its mechanical impedance is expressed as Equation 94 and Equation 95.

$$[T] = \begin{bmatrix} 1 & Z_r \\ 0 & 1 \end{bmatrix} \quad \text{Equation 94}$$

$$Z_r = \frac{1}{\frac{1}{j\omega m_s} + \frac{1}{\sigma_s}} \quad \text{Equation 95}$$

where $Z_r$ is the mechanical impedance of a resistive scrim and [T] is its transfer matrix.

Transfer Matrix for Limp Impermeable Membrane

One type of membrane used has a negligible thickness and an area density $m_s$, and its frame is limp and impermeable (i.e., no fluid particle can penetrate through the membrane). The transfer matrix of such a membrane can be obtained, by writing its force balance equation and the velocity continuity equation into a linear system as shown in the following Equation 96.

$$[T] = \begin{bmatrix} 1 & Z_m \\ 0 & 1 \end{bmatrix} \quad \text{Equation 96}$$

where $Z_m$ is the mechanical impedance of the membrane and is given as $Z_m = j\omega m_s$.

Transfer Matrix for Stiff Panel

A stiff panel has an area density denoted as $m_s$ and the flexural bending stiffness per unit width is denoted as D. The thickness of the panel is ignored in the derivation of the transfer matrix. However, the bending stiffness D is a function of its thickness and is defined as Equation 97.

$$D = \frac{Eh^3(1 + j\eta)}{12(1 - v^2)} \quad \text{Equation 97}$$

where h is the thickness, E is the Young's modulus, v is the Poisson's ratio and η is the loss factor of the panel, respectively. The equation of motion of a stiff panel is given as the following Equation 98.

$$(p_1 - p_2)_{x=0} = D\frac{\partial^4 w}{\partial x^4} + m_s\frac{\partial^2 w}{\partial t^2} \quad \text{Equation 98}$$

The vibration of the panel is assumed to be harmonic motion and expressed as $w(y,t)=We^{j(\omega t-k_y y)}$. By substituting this assumed solution into Equation 98 and solving for the boundary conditions, the mechanical impedance $Z_p$ and the transfer matrix of the stiff panel are expressed as the following Equation 99 and Equation 100, respectively.

$$Z_p = j\left[\omega m_s - \frac{D}{\omega}k_y^4\right] \quad \text{Equation 99}$$

$$[T] = \begin{bmatrix} 1 & Z_p \\ 0 & 1 \end{bmatrix} \quad \text{Equation 100}$$

Transfer Matrix for Air Space

With an air space inside the multiple component layered acoustical system being d which starts from position $x_1$ and ends at position $x_2$ of the system, the acoustical pressure and air velocity within the air space are expressed as Equation 101 and Equation 102.

$$p_a = Ae^{-j(k_x x+k_y y)} + Be^{j(k_x x-k_y y)} \quad \text{Equation 101}$$

$$v_{ax} = \frac{\cos\theta}{\rho_0 c_o}\left[Ae^{-j(k_x x+k_y y)} - Be^{j(k_x x-k_y y)}\right] \quad \text{Equation 102}$$

where $$k_x = \frac{\omega}{c_o}\cos\theta \text{ and } k_y = \frac{\omega}{c_o}\sin\theta.$$

By substituting the acoustical pressure and air velocity into the boundary conditions, the force balance equation and the velocity continuity equation can be expressed in the form of matrix Equation 103 and Equation 104.

at $x=x_1$:

$$\begin{bmatrix} p_1 \\ v_{1x} \end{bmatrix}_{x=x_1} = \begin{bmatrix} e^{-jk_x x_1} & e^{jk_x x_1} \\ \left(\frac{\cos\theta}{\rho_o c_o}\right)e^{-jk_x x_1} & -\left(\frac{\cos\theta}{\rho_o c_o}\right)e^{-jk_x x_1} \end{bmatrix}\begin{bmatrix} A \\ B \end{bmatrix} \quad \text{Equation 103}$$

at $x=x_2$:

$$\begin{bmatrix} p_2 \\ v_{2x} \end{bmatrix}_{x=x_2} = \begin{bmatrix} e^{-jk_x x_2} & e^{jk_x x_2} \\ \left(\frac{\cos\theta}{\rho_o c_o}\right)e^{-jk_x x_2} & -\left(\frac{\cos\theta}{\rho_o c_o}\right)e^{-jk_x x_2} \end{bmatrix}\begin{bmatrix} A \\ B \end{bmatrix} \quad \text{Equation 104}$$

The pressure and air velocity on each side can be related by the following Equation 105.

$$\begin{bmatrix} p_1 \\ v_{1x} \end{bmatrix}_{x_1} = \begin{bmatrix} e^{-jk_x x_1} & e^{jk_x x_1} \\ \left(\frac{\cos\theta}{\rho_o c_o}\right)e^{-jk_x x_1} & -\left(\frac{\cos\theta}{\rho_o c_o}\right)e^{-jk_x x_1} \end{bmatrix}\begin{bmatrix} e^{-jk_x x_2} & e^{jk_x x_2} \\ \left(\frac{\cos\theta}{\rho_o c_o}\right)e^{-jk_x x_2} & -\left(\frac{\cos\theta}{\rho_o c_o}\right)e^{-jk_x x_2} \end{bmatrix}^{-1}\begin{bmatrix} p_2 \\ v_{2x} \end{bmatrix}_{x_2}. \quad \text{Equation 105}$$

The two matrices can be simplified by one transfer matrix as shown in Equation 106.

$$[T] = \begin{bmatrix} \cos k_x(x_2 - x_1) & j\frac{\rho_0 c_o}{\cos\theta}\sin k_x(x_2 - x_1) \\ j\frac{\cos\theta}{\rho_0 c_o}\sin k_x(x_2 - x_1) & \cos k_x(x_2 - x_1) \end{bmatrix} \quad \text{Equation 106}$$

It should be noted that $x_2-x_1=d$, the distance of the air space, and that the expression of the transfer matrix can be applied to the air space at any location within the acoustical system by using d.

Transfer Matrix for Limp Fibrous Material

The transfer matrix for limp fibrous material is derived with field solutions based on the limp frame model described previously herein. First, a matrix to relate the pressure and normal fluid velocity inside the fibrous material from one end to the other is derived. Two more matrices are derived to relate the pressure fields and normal fluid velocities across boundaries. Finally, the total transfer matrix of the fibrous material is obtained by multiplying the three matrices, for example, sequentially, to relate the acoustical state a one boundary of the fibrous material to the acoustical state at the other boundary of the material. Using the same notations as described above in the limp frame model, the fluid stress (i.e., the acoustical pressure) and the fluid particle velocity can be expressed as the following Equation 107 and Equation 108, respectively.

$$s = (Ra+Q)(C_1 e^{-jk_p x-jk_y y} + C_2 e^{jk_p x-jk_y y}) \quad \text{Equation 107}$$

$$V_x = j\omega\left[a\frac{jk_{px}}{k_p^2}(C_1 e^{-jk_{px}x-jk_y y} - C_2 e^{jk_{px}x-jk_y y})\right] \quad \text{Equation 108}$$

where R, Q and a are as defined previously; $V_x$ is the time derivative of $U_x$; and $k_{px}$ is the normal component of the wave number. Based on the assumption of infinite structure, the term $e^{-jk_y y}$ is canceled throughout the derivation. Then, one can rewrite the above two equations in terms of trigonometric functions as shown by the following Equation 109 and Equation 110.

$$s=[(Ra+Q)\cos(k_{px}x)(C_1+C_2)-j(Ra+Q)\sin(k_{px}x)(C_1-C_2)] \quad \text{Equation 109}$$

$$V_x = j\omega\left[a\frac{jk_{px}}{k_p^2}\cos(k_{px}x)(C_1 - C_2) + a\frac{k_{px}}{k_p^2}\sin(k_{px}x)(C_1 + C_2)\right] \quad \text{Equation 110}$$

These two equations are then combined into a single matrix as shown in Equation 111.

$$\begin{bmatrix} s \\ V_x \end{bmatrix} = \begin{bmatrix} (Ra+Q)\cos(k_{px}x) & -j(Ra+Q)\sin(k_{px}x) \\ j\omega a\frac{k_{px}}{k_p^2}\sin(k_{px}x) & -\omega a\frac{k_{px}}{k_p^2}\cos(k_{px}x) \end{bmatrix}\begin{bmatrix} C_1+C_2 \\ C_1-C_2 \end{bmatrix} \quad \text{Equation 111}$$

By definition, as shown in Equation 112, $$[A(x)] \triangleq \begin{bmatrix} (Ra+Q)\cos(k_{px}x) & -j(Ra+Q)\sin(k_{px}x) \\ j\omega a\frac{k_{px}}{k_p^2}\sin(k_{px}x) & -\omega a\frac{k_{px}}{k_p^2}\cos(k_{px}x) \end{bmatrix} \quad \text{Equation 112}$$

a simpler expression for the fluid stresses and velocities at two surfaces of the fibrous layer is expressed as the following Equation 113 and Equation 114.

at $x=0^{30}$, $$\begin{bmatrix} s \\ V_x \end{bmatrix}_{x=o^+} = [A(0)]\begin{bmatrix} C_1+C_2 \\ C_1-C_2 \end{bmatrix} \quad \text{Equation 113}$$

at $x=d^-$, $$\begin{bmatrix} s \\ V_x \end{bmatrix}_{x=d^-} = [A(d)]\begin{bmatrix} C_1+C_2 \\ C_1-C_2 \end{bmatrix} \quad \text{Equation 114}$$

where $0^+$ and $d^-$ indicates the locations inside the fibrous material. The boundary conditions of force balance and velocity continuity need to be satisfied on each end of the fibrous material, i.e., $s=-\phi p_1$ and $(1-\phi)\dot{u}_x+\phi V_x=v_x$, where $\dot{u}_x$ is the normal solid particle velocity in the fibrous material. Recall that $V_x=a\dot{u}_x$, therefore two sets of equations at two ends of the material result and can be rewritten into a matrix form, Equation 115 and Equation 116, respectively.

$$\begin{bmatrix} p_1 \\ v_{x1} \end{bmatrix}_{x=0^-} = \begin{bmatrix} \frac{-1}{\phi} & 0 \\ 0 & \frac{1-\phi}{a}+\phi \end{bmatrix}\begin{bmatrix} s \\ V_x \end{bmatrix}_{x=0^+} \quad \text{Equation 115}$$

$$\begin{bmatrix} p_2 \\ v_{x2} \end{bmatrix}_{x=d^+} = \begin{bmatrix} \frac{-1}{\phi} & 0 \\ 0 & \frac{1-\phi}{a}+\phi \end{bmatrix}\begin{bmatrix} s \\ V_x \end{bmatrix}_{x=d^-} \quad \text{Equation 116}$$

Combining the Equation 113, Equation 114, Equation 115, and Equation 116, the final form of the transfer matrix for the limp fibrous material is shown as Equation 117, wherein [T] is based at least in part on flow resistivity and porosity.

$$[T] = \begin{bmatrix} \frac{-1}{\phi} & 0 \\ 0 & \frac{1-\phi}{a}+\phi \end{bmatrix}[A(0)][A(d)]^{-1}\begin{bmatrix} \frac{-1}{\phi} & 0 \\ 0 & \frac{1-\phi}{a}+\phi \end{bmatrix}^{-1} \quad \text{Equation 117}$$

Figure 12:
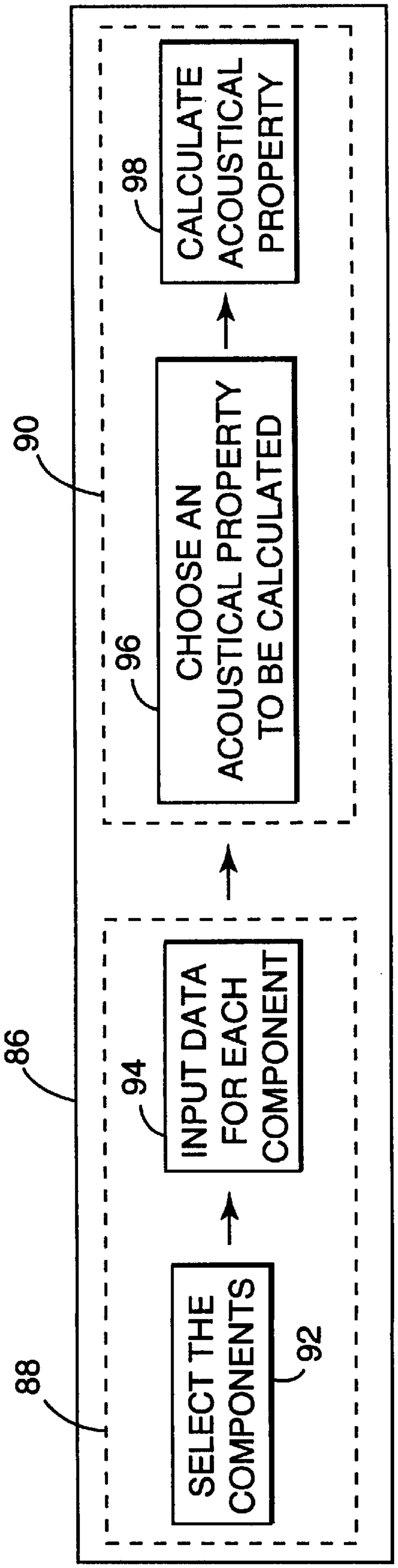
FIG. 12 is a more detailed block diagram of the prediction routines of FIG. 10.

In general, as shown in FIG. 12, the transfer matrix process for prediction of acoustical properties for an acoustical system includes defining the acoustical system per definition routines 88. The definition routines 88 include component selection routines 92 for allowing the user to select the components from a list of the components commonly used in the multiple component layered acoustical systems, including but not limited to resistive scrim, impermeable membrane, stiff panel, fibrous materials and air space, through use of an interface to initiate selections commands of the system corresponding to the components.

Upon such selection of a component, the user is prompted to input manufacturing microstructural parameters for the component or macroscopic properties of the component via component data input routines 94 of definition routines 88. Further, the user chooses system configuration parameters such as sequence of the components, position thereof, etc. After the acoustical system has been defined, the definition routines 88 further determine the total transfer matrix for the acoustical system by multiplying individual transfer matrices determined for each component of the acoustical system, such as with use of the derived component transfer matrices and total transfer matrix equations as described above.

After the total transfer matrix is defined per the definition routines 88, acoustical property determination routines 90 allow the user to select an acoustical property to be calculated per acoustical property selection routines 96. By applying the corresponding boundary condition to each end of the system, acoustical properties of the acoustical system, e.g., specific impedance, absorption coefficient and transmission coefficient, can be determined, such as with use of the above derived equations based on the total transfer matrix using calculation routines 98 of the acoustical property determination routines 90. In other words, the acoustical properties for the acoustical system are predicted by combining the acoustical properties of each component in the acoustical system, along with boundary conditions and geometrical constraints that define the actual acoustical system (e.g., a system having multiple layers of one or more materials, one or more permeable or impermeable barriers, one or more air spaces, or any other components, and further having a finite size, depth, and curvature). Depending upon the geometry of the acoustical system under consideration, the prediction of acoustical properties for the acoustical system may be predicted using classical wave propagation techniques or numerical techniques, such as, for example, finite or boundary element methods.

Example—Prediction for Acoustical Systems

Figure 13:
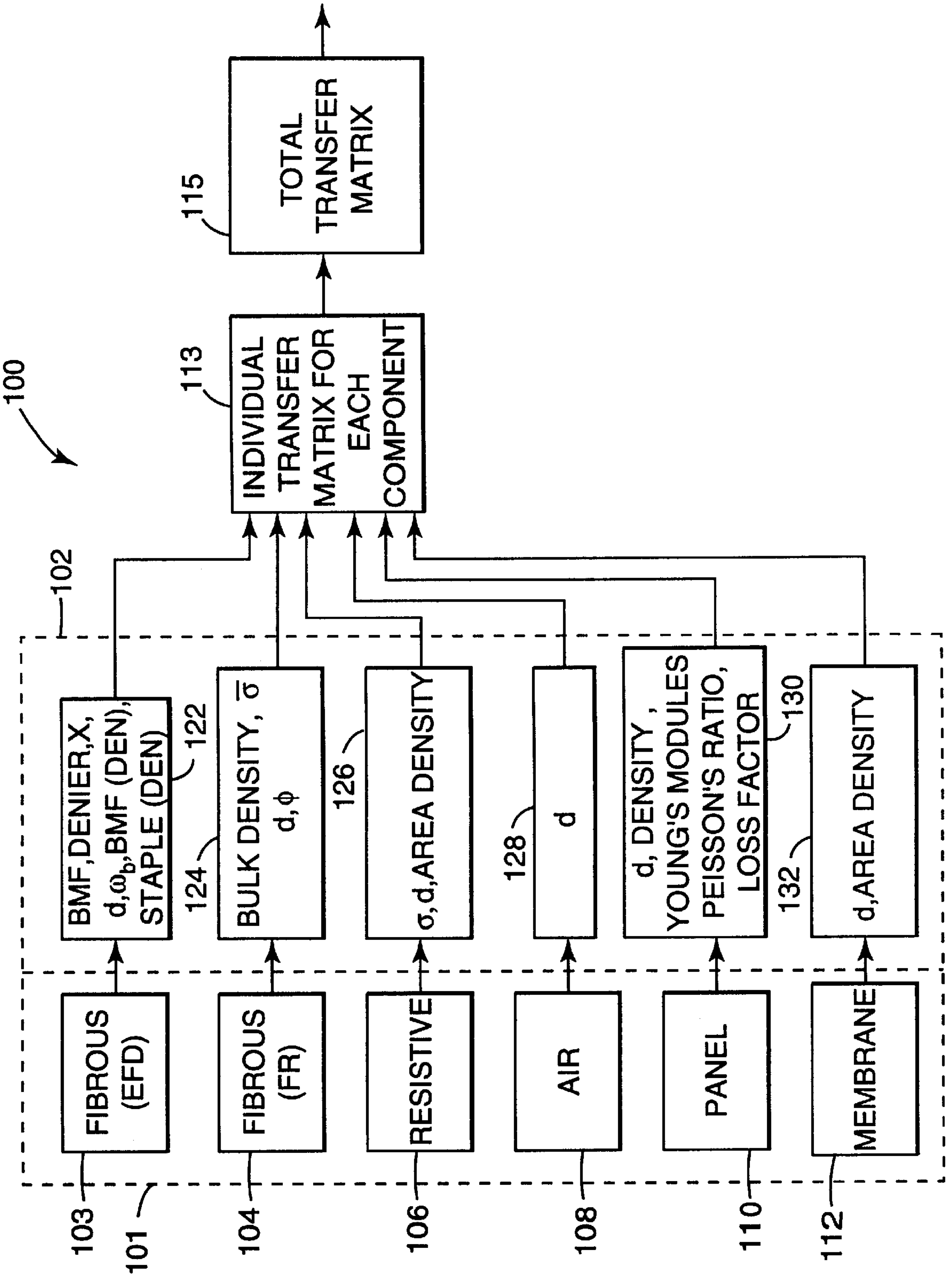
FIG. 13 and FIG. 14 are detail block diagrams of an embodiment of the prediction routines of FIG. 12.
Figure 14:
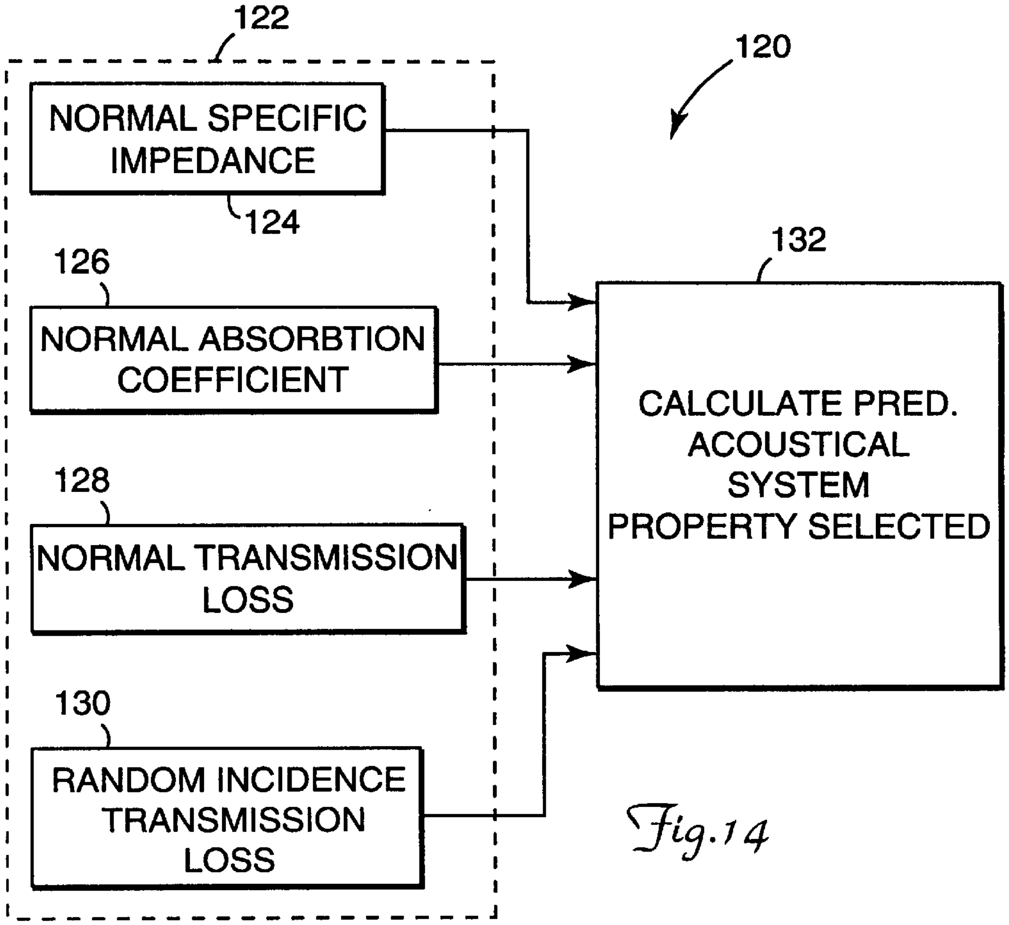

This example is an illustrative embodiment of an acoustical system prediction process as shown in FIG. 12 which shall be described with further reference to FIGS. 13 and 14. The illustrative embodiment of the prediction process shall be described in a manner in which a user would interface with the acoustical property prediction and optimization system 10 (FIG. 2) including main program 20.

The system 10 prompts a user to choose whether the user wants to work with a homogeneous material or an acoustical system. If the user chooses to work with an acoustical system, the user is given options for use of an acoustical system prediction and optimization program, such as the program illustrated in FIGS. 13 and 14; an embodiment of the general program 81. The user may then be given the option to predict acoustical properties of an acoustical system or attempt to optimize the configuration of an acoustical system as further described below. If the user chooses to predict acoustical properties of an acoustical system, the user is prompted by the system to define an acoustical system for which acoustical properties are to be calculated. Although the user may be given an option to use components of a system previously defined, to use the entire acoustical system previously defined, or to modify a previously defined system, the following illustration shall be set forth as if the user is starting from an initial defining point and has no previously defined systems to access.

As shown in FIG. 13, component selection routines 101 of acoustical system definition routines 100 allow the user to select from six different components: a two fiber component fibrous material 103, a general fibrous material 104, a resistive scrim 106, an air space 108, an elastic panel 110, or a limp impermeable membrane 112. The user is prompted to specify the number of components to be included in the acoustical system. Thereafter, the user is given a list of the components which can be selected and allows the user to specify the sequence, and any other system configuration parameters for the acoustical system. After each component is selected, the component data input routines 122 of definition routines 100 prompt the user to input pertinent data with respect to the component selected, for example, microstructural parameters or macroscopic properties.

For the two fiber component fibrous material 103 the user is prompted to input microstructural parameters including BMF fiber EFD (micron), staple fiber diameter (denier), fraction ($\chi$) of staple fiber by weight, thickness (d) of the material (cm), basis weight ($W_b$, gm/m$^2$), density of BMF fiber (kg/m$^3$), and density of staple fiber (kg/m$^3$). For the general fibrous material 104, the user is prompted to input flow resistivity ($\sigma$) of the material (Rayls/m), thickness (d) of the material (cm), bulk density (kg/m$^3$), and porosity ($\phi$). For the resistive scrim 106, the user is prompted to input flow resistivity ($\sigma$) of the scrim (Rayls/m), thickness (d) of the scrim (cm), and mass per unit area of the scrim (g/m$^2$). For the air space 108, the user is prompted to enter the thickness (d). For the elastic panel 110, the user is prompted to enter the thickness of the panel (d, cm), density of the panel (kg/m$^3$), Young's modulus of the panel (Pa), Poisson's ratio, and the loss factor of the panel ($\eta$). For the limp impermeable membrane 112, the user is prompted to enter the thickness of the membrane (d, cm) and mass per unit area of the membrane (kg/m$^2$).

After all the components are defined for the acoustical system, the transfer matrix for each individual component layer is determined as shown in block 113 using the transfer matrix equations as described above for the individual components. Then, the individual transfer matrices are combined to obtain the total transfer matrix as represented by block 115, e.g., a sequential multiplication of the individual transfer matrices.

Further, after the acoustical system is defined, the user is prompted to choose one of a number of acoustical properties to be calculated per acoustical property selection routines 122 of acoustical property determination routines 120 as shown in FIG. 14. Such acoustical properties may include normal specific impedance 124, absorption coefficient 126 (e.g., the noise reduction coefficient may be calculated), transmission loss 128 (e.g., the speech interference level may be calculated), and random incidence transmission loss 130. The calculation of the selected acoustical property is then performed by acoustical property calculation routines 132 by way of the equations previously described using the total transfer matrix. The result may then be displayed in graphical or tabular form.

OPTIMIZATION ROUTINES

If the user chooses to determine an optimal configuration for the acoustical system, then the user is given options for use of optimization routines 84 of the prediction and optimization program 81 (FIG. 10). Such optimization routines 84 of the acoustical system prediction and optimization program 81 permit the user to find optimal values for the acoustical system, such as, for example, position of layers, optimal fiber diameter of a fibrous layer of the system, etc. Since multiple component layered acoustical systems are used in many applications, configuration optimization for the multiple components used in the system is beneficial to a user.

Figure 15:
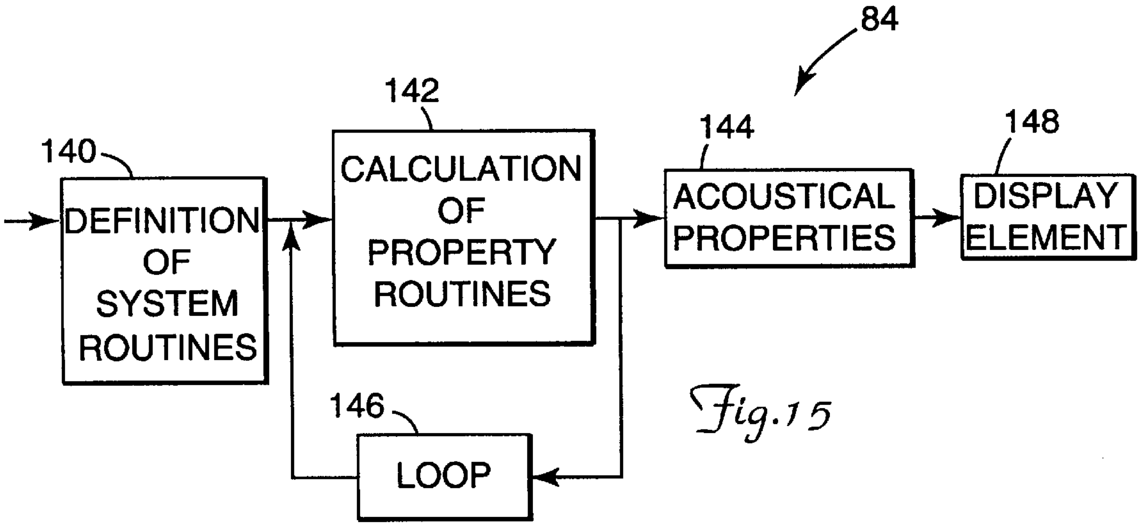
FIG. 15 is a more detailed block diagram of the optimization routines of FIG. 10.

As shown in FIG. 15, optimization routines 84 include definition system routines 140 for defining the acoustical system such as previously described with reference to routines 88 of FIG. 12. Further, the optimization routines 84 include calculation routines 142 for calculating acoustical properties 144 as selected by the user in much the same manner as previously described with reference to acoustical prediction routines 90 of FIG. 12. In addition, the optimization routines include a closed loop between the acoustical properties 144 and the acoustical system definition which allows for repetitive calculations to be performed over particular defined ranges (or set of values) of one or more parameters and/or properties defining the acoustical system. For example, the range may include a varied position of a resistive scrim, a fiber diameter of fibers in a fibrous layer of the acoustical system, a thickness of an air space, or any other microstructural parameter of a component of the acoustical system, macroscopic property of a component, or a system configuration parameter of the acoustical system.

Illustrations of Acoustical System Configuration Optimization

For illustration of the optimization routines 84, for example, an impermeable membrane and a resistive scrim may be used as a cover sheet for a fibrous material to prevent accumulation of moisture or dust. The acoustical properties of a limp impermeable membrane is affected by its area density only; the acoustical properties of a limp resistive scrim is controlled by its area density and its flow resistivity. When fibrous materials are combined with a resistive scrim or a limp impermeable membrane, the acoustical properties of the composite acoustical system is affected by the location, the flow resistivity and the area density of the inserted material. Therefore, the goal of the optimization for such composite materials is to find the optimal values of position, area density and flow resistivity for the acoustical system.

Figure 21A:
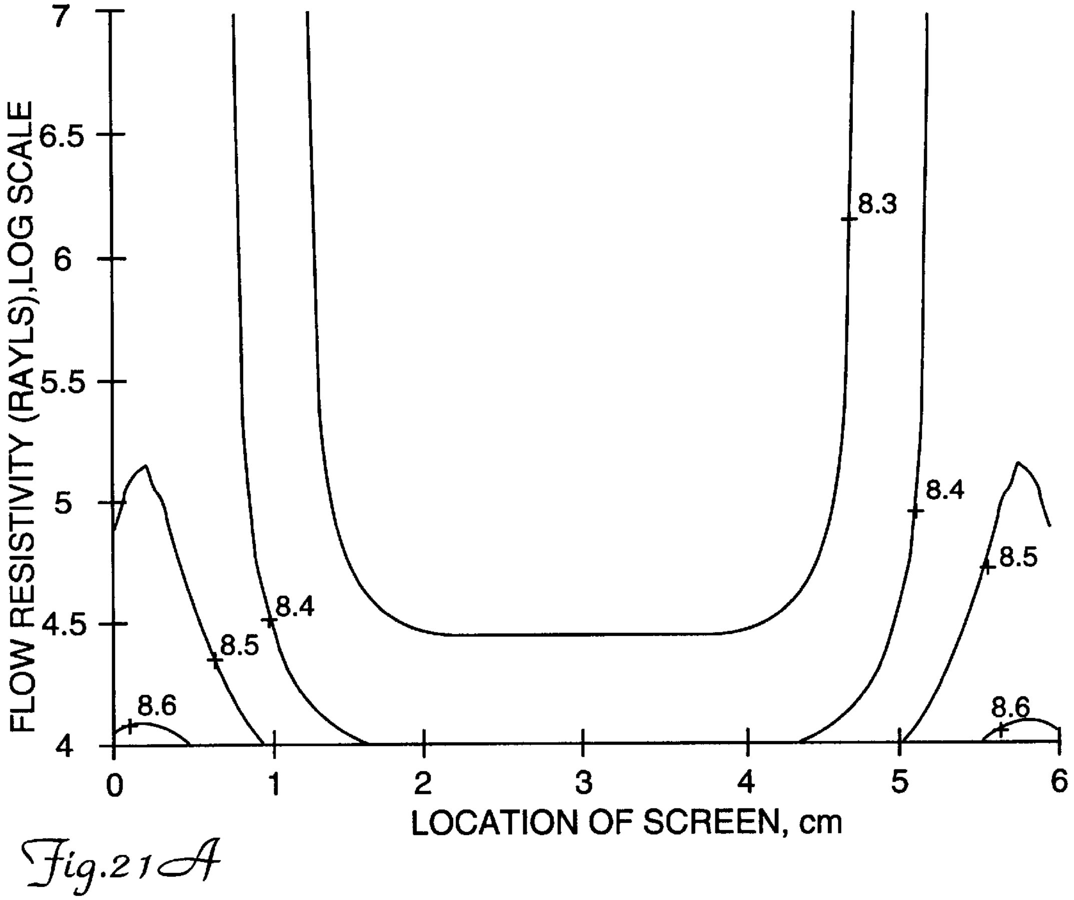

Optimization Examples of SIL for Resistive Scrims Combined with Fibrous Materials To search for the best location to insert a layer of resistive scrim, in this particular optimization illustration (i.e., the location being a system configuration parameter of the acoustical system), SIL of the acoustical system is chosen to be the acoustical property of interest. The results are illustrated by a 2-D constant contour plot shown in FIG. 21A which shows a contour plot of the SIL optimization based on the locations of the scrim versus the flow resistivity (i.e., a macroscopic property of a component of the acoustical system) of the resistive scrim having an area density of 33 $g/m^2$ within a fibrous material that contains x1 microns EFD fiber, 35% by weight of 6 Denier staple fiber, total basis weight of 400 $g/m^2$ and thickness of 6.0 cm. It is shown, for example, that the resistive scrim contributes the least sound barrier performance at the center of a composite material.

Figure 21B:
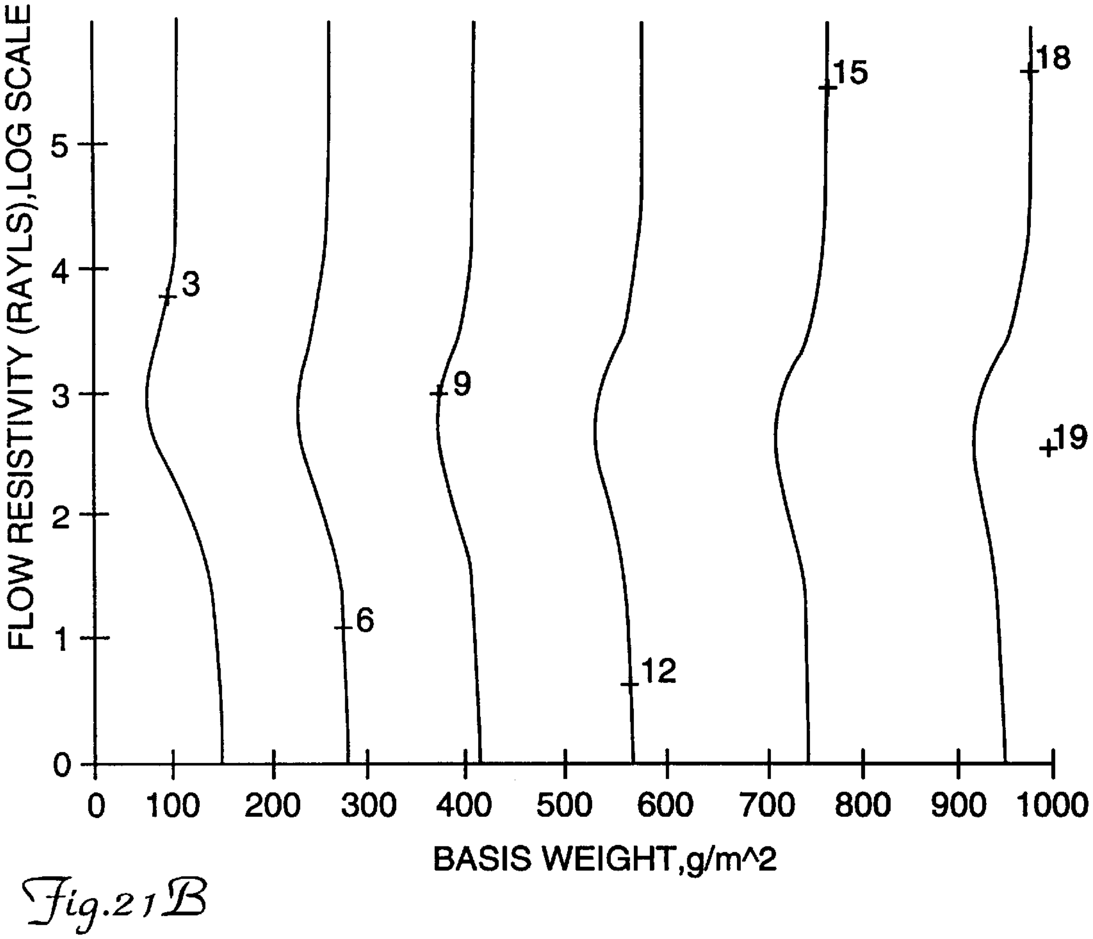

Further, another illustrative optimization is to determine the optimal flow resistivity of a resistive scrim which was placed in the middle of a fibrous material to achieve the best SIL. The total thickness of the acoustical system is maintained as one inch. The resulting contour plot of SIL is shown in FIG. 21B which is a contour plot of the SIL optimization based on the flow resistivity of a resistive scrim which has an area density of 33 $g/m^2$ and which was inserted in the middle of the fibrous material versus the basis weight of the fibrous material of the acoustical system (basis weight being a microstructural parameter of the fibrous material of a fibrous layer) that contains x1 microns EFD fiber, 35% by weight of 6 Denier staple fiber, total basis weight of 400 $g/m^2$ and has a thickness of 1.0 cm.

It is readily apparent to one skilled in the art that any acoustical system may be used and that the acoustical behavior of the acoustical system is much more complicated than that of a homogeneous material. For example, the multiple layers of fibrous materials having different bulk density and fiber constituents within the system can be separated by air gaps, resistive scrims, impermeable membranes, etc. Therefore, there are many combinations of variables including but not limited to the properties of each component, the sequence of the components, and the application constraints which provide various manners to optimize the acoustical systems defined by the user.

All the patents and references cited herein are incorporated by reference in their entirety, as if individually incorporated. Although the present invention has been described with particular reference to specific embodiments, it is to be understood, that variations and modifications of the present invention as would be readily known to those skilled in the art may be employed without departing from the scope of the appended claims.

What is claimed is:

1. A computer controlled method for predicting acoustical properties for a generally homogeneous porous material, the method comprising the steps of:

- providing at least one prediction model for determining one or more acoustical properties of homogeneous porous materials;
- providing a selection command to select a prediction model for use in predicting acoustical properties for the generally homogeneous porous material;
- providing an input set of at least microstructural parameters corresponding to the selection command;
- determining one or more macroscopic properties for the homogeneous porous material based on the input set of the at least microstructural parameters; and
- generating one or more acoustical properties for the homogeneous porous material as a function of the one or more macroscopic properties and the selected prediction model.

2. The method according to claim 1, wherein the at least one prediction model includes at least one of a limp material model, a rigid material model, and an elastic material model.

3. The method according to claim 1, wherein the homogeneous porous material is a homogeneous fibrous material, and further wherein the one or more macroscopic properties based on the input set include flow resistivity of the homogeneous fibrous material, the acoustical properties of the homogeneous fibrous material being generated as a function of at least the flow resistivity.

4. The method according to claim 3, wherein the flow resistivity of the homogeneous fibrous material is determined based on the microstructural parameters of the input set.

5. The method according to claim 4, wherein the homogeneous fibrous material is formed of at least one fiber type, and further wherein the flow resistivity of the homogeneous fibrous material is determined as an inverse function of the mean radius of the fiber type taken to the $n^{th}$ power, wherein n is greater than or less than 2.

6. The method according to claim 5, wherein n is approximately 2.25.

7. The method according to claim 3, wherein the at least one prediction model includes a limp material model.

8. The method according to claim 7, wherein the limp material model is of the form of a single second order equation.

9. The method according to claim 7, wherein the limp material model determines acoustical properties as a function of at least bulk density of the homogeneous fibrous material.

10. The method according to claim 7, wherein the limp material model determines acoustical properties independent of bulk modulus of elasticity of the homogeneous fibrous material.

11. The method according to claim 3, wherein the homogeneous fibrous material is formed of at least one type of fiber, and further wherein the microstructural parameters of the input set include fiber diameter of the at least one type of fiber, a percentage by weight of the at least one type of fiber in the homogeneous fibrous material, a thickness of the homogeneous fibrous material, and a basis weight of the homogeneous fibrous material.

12. The method according to claim 11, wherein the input set includes macroscopic properties including frame bulk elasticity of the homogeneous fibrous material when the selection command corresponds to the elastic material model.

13. The method according to claim 1, wherein the one or more acoustical properties includes at least one of acoustical impedance, reflection coefficient, sound absorption coefficient, noise reduction coefficient, transmission loss, and speech interference level.

14. The method according to claim 1, wherein the method further includes repetitively predicting at least one acoustical property for the homogeneous porous material over a defined range of at least one of the microstructural parameters of the input set.

15. The method according to claim 14, wherein the input set providing step includes receiving a defined range and incremental steps for the defined range for the at least one of the microstructural parameters.

16. The method according to claim 15, wherein the homogeneous porous material is a homogeneous fibrous material formed of at least one fiber type, and further wherein the microstructural parameters of the input set include fiber diameter of the at least one fiber type, a percentage by weight of the at least one fiber type in the homogeneous fibrous material, a thickness of the homogeneous fibrous material, and a basis weight of the homogeneous fibrous material.

17. The method according to claim 16, wherein the acoustical property is noise reduction coefficient, and further wherein ranges are defined for the basis weight of the homogeneous fibrous material and one of the diameter of the at least one fiber type and the thickness of the homogeneous fibrous material.

18. The method according to claim 16, wherein the output acoustical property is speech interference level, and further wherein ranges are defined for the basis weight of the homogeneous fibrous material and one of the diameter of the at least one fiber type and the thickness of the homogeneous fibrous material.

19. The method according to claim 14, wherein the method further includes generating one of a two dimensional plot or three dimensional plot for the acoustical properties predicted relative to the microstructural parameters having defined ranges.

20. A computer controlled method for predicting acoustical properties for a generally homogeneous limp fibrous material, the method comprising the steps of:

- providing a flow resistivity model for predicting flow resistivity of homogeneous limp fibrous materials;
- providing a material model for predicting one or more acoustical properties of homogeneous fibrous limp materials;
- providing an input set of microstructural parameters, the flow resistivity model being defined based on the microstructural parameters;
- determining flow resistivity of the homogeneous fibrous limp material based on the flow resistivity model and the input set; and
- generating one or more acoustical properties for the homogeneous fibrous limp material using the material model as a function of the flow resistivity of the homogeneous fibrous limp material.

21. The method according to claim 20, wherein the homogeneous fibrous limp material is formed of one or more fiber types, and further wherein the flow resistivity of the homogeneous limp fibrous material is determined as a function of the flow resistivity contributed by each of the one or more fiber types, the flow resistivity for each of the one or more fiber types being determined as an inverse function of the mean radius of the fibers taken to the re power, wherein n is greater than or less than 2.

22. The method according to claim 21, wherein n is equal to approximately 2.25.

23. The method according to claim 21, wherein the material model is a limp material model, and further wherein the limp material model is of the form of a single second order equation.

24. The method according to claim 23, wherein the limp material model determines acoustical properties as a function of at least bulk density of the homogeneous fibrous material.

25. The method according to claim 23, wherein the limp material model determines acoustical properties independent of bulk modulus of elasticity of the homogeneous fibrous material.

26. The method according to claim 20, wherein the generation step includes the step of generating values for at least one acoustical property incrementally over a range defined for at least one of the microstructural parameters.

27. The method according to claim 26, wherein the homogeneous fibrous material is formed of at least one fiber type, and further wherein the microstructural parameters of the input set include fiber diameter of the at least one fiber type, a percentage by weight of the at least one fiber type in the homogeneous fibrous material, density of the at least one fiber type, a thickness of the homogeneous fibrous material, and a basis weight of the homogeneous fibrous material.

28. The method according to claim 27, wherein the acoustical property is noise reduction coefficient, and further wherein ranges are defined for the basis weight of the homogeneous fibrous material and one of a diameter of the at least one fiber type and a thickness of the homogeneous fibrous material.

29. The method according to claim 27, wherein the acoustical property is speech interference level, and further wherein ranges are defined for the basis weight of the homogeneous fibrous material and one of a diameter of the at least one fiber type and a thickness of the homogeneous fibrous material.

30. The method according to claim 26, wherein the method further includes generating at least one of a two dimensional plot or three dimensional plot for the acoustical properties predicted relative to the at least one microstructural parameters having a defined range or an optimal value for the acoustical properties predicted relative to the at least one microstructural parameters having a defined range.

31. A computer controlled method for predicting acoustical properties of multiple component acoustical systems, the method comprising the steps of:

- providing one or more selection commands for selecting a plurality of components of a multiple component acoustical system, each selection command associated with one of the plurality of components of the multiple component acoustical system, each component of the multiple component acoustical system having boundaries with at least one of the boundaries being formed with another component of the multiple component system;
- providing an input set of at least one of microstructural parameters or macroscopic properties corresponding to each component associated with a selection command, at least one input set including microstructural parameters for at least one component;

generating a transfer matrix for each component of the multiple component acoustical system defining the relationship between acoustical states at the boundaries of the component based on the input sets corresponding to the plurality of components;

multiplying the transfer matrices for the components together to obtain a total transfer matrix for the multiple component acoustical system; and generating values for one or more acoustical properties for the multiple component acoustical system as a function of the total transfer matrix generated for the multiple component acoustical system.

32. The method according to claim 31, wherein the input sets for one or more of the plurality of components of the multiple component acoustical system include macroscopic properties for generating transfer matrices for the one or more components.

33. The method according to claim 32, wherein the method further includes providing system configuration parameters of the acoustical system.

34. The method according to claim 31, wherein the one or more acoustical properties includes at least one of acoustical impedance, reflection coefficient, sound absorption coefficient, noise reduction coefficient, transmission loss, and speech interference level.

35. The method according to claim 31, wherein the plurality of components includes at least one homogeneous fibrous material formed of at least one fiber type, the transfer matrix for the homogeneous fibrous material is based on the flow resistivity of the fibrous material, the flow resistivity being defined using the microstructural parameters of an input set corresponding thereto.

36. The method according to claim 35, wherein the homogeneous fibrous limp material is formed of one or more fiber types, and further wherein the flow resistivity of the homogeneous limp fibrous material is determined as a function of the flow resistivity contributed by each of the one or more fiber types, the flow resistivity for each of the one or more fiber types being determined as an inverse function of the mean radius of the fibers taken to the $n^{th}$ power, wherein n is greater than or less than 2.

37. The method according to claim 31, wherein the plurality of components include components selected from the group comprising limp fibrous material, rigid fibrous material, elastic fibrous material, resistive scrim, air spaces, stiff panel, and limp impermeable membrane.

38. The method according to claim 31, wherein the input set includes a varied set of values for one or more system configuration parameters of the multiple component acoustical system, one or more microstructural parameters of components of the multiple component acoustical system, or one or more macroscopic properties of components of the multiple component acoustical system, and further wherein the method includes generating values for at least one acoustical property over the varied set of values.

39. The method according to claim 38, wherein the varied set of values includes varied position values for at least one of the components of the multiple component acoustical system.

40. The method according to claim 38, wherein the varied set of values includes a range for a microstructural parameter of a homogeneous fibrous material component of the multiple acoustical system or a macroscopic property of a homogeneous fibrous material component.

41. A computer readable medium tangibly embodying a program executable for predicting acoustical properties for a generally homogeneous limp fibrous material, the computer readable medium comprising:

a flow resistivity model for predicting flow resistivity of homogeneous limp fibrous materials;

a material model for predicting one or more acoustical properties of homogeneous limp fibrous materials;

means for allowing a user to provide an input set of microstructural parameters, the flow resistivity model being defined based on the microstructural parameters;

means for determining flow resistivity of the homogeneous fibrous limp material based on the flow resistivity model and the input set; and means for generating one or more acoustical properties for the homogeneous fibrous limp material using the material model as a function of the flow resistivity of the homogeneous fibrous limp material.

42. The computer readable medium according to claim 41, wherein the homogeneous fibrous limp material is formed of one or more fiber types, and further wherein the means for determining flow resistivity of the homogeneous limp fibrous material includes means for determining flow resistivity as a function of the flow resistivity contributed by each of the one or more fiber types, the flow resistivity for each of the one or more fiber types being determined as an inverse function of the mean radius of the fibers taken to the n power, wherein n is greater than or less than 2.

43. The computer readable medium according to claim 42, wherein the material model is a limp material model, and further wherein the limp material model is of the form of a single second order equation.

44. The computer readable medium according to claim 41, wherein the means for generating one or more acoustical properties includes means for generating values for at least one acoustical property incrementally over a range defined for at least one of the microstructural parameters.

45. The computer readable medium according to claim 44, further wherein the medium includes means for generating at least one of a two dimensional plot or three dimensional plot for the acoustical properties predicted relative to the at least one microstructural parameters having a defined range or an optimal value for the acoustical properties predicted relative to the at least one microstructural parameters having a defined range.

46. A computer readable medium tangibly embodying a program executable for predicting acoustical properties of multiple component acoustical systems, computer readable medium comprising:

means for allowing a user to select one or more of a plurality of components of a multiple component acoustical system, each component of the multiple component acoustical system having boundaries with at least one of the boundaries being formed with another component of the multiple component system;

means for allowing a user to provide an input set of at least one of microstructural parameters or macroscopic properties for each component with microstructural parameters being required for at least one component;

means for generating a transfer matrix for each component of the multiple component acoustical system defining the relationship between acoustical states at the boundaries of the component based on the input set for each component;

means for multiplying the transfer matrices for the components together to obtain a total transfer matrix for the multiple component acoustical system; and means for generating values for one or more acoustical properties for the multiple component acoustical system as a function of the total transfer matrix generated for the multiple component acoustical system.

47. The computer readable medium according to claim 46, wherein the plurality of components includes at least one homogeneous fibrous material formed of at least one fiber type, and further wherein the means for generating a transfer matrix for the homogeneous fibrous material includes means for generating a transfer matrix for the homogeneous fibrous material is based on the flow resistivity of the homogeneous fibrous material, the flow resistivity being defined using the microstructural parameters of an input set corresponding thereto.

48. The computer readable medium according to claim 47, wherein the means for allowing a user to provide an input set includes means for allowing a user to provide a varied set of values for one or more system configuration parameters of the multiple component acoustical system, one or more microstructural parameters of components of the multiple component acoustical system, or one or more macroscopic properties of components of the multiple component acoustical system, and further wherein the means for generating values for at least one acoustical property includes means for generating values over the varied set of values.

* * * * *

UNITED STATES PATENT AND TRADEMARK OFFICE

CERTIFICATE OF CORRECTION

PATENT NO. : 6,256,600 B1
DATED : July 3, 2001
INVENTOR(S) : John Stuart Bolton et al.

It is certified that error appears in the above-identified patent and that said Letters Patent is hereby corrected as shown below:

Column 6,
Line 42, "$Kc$" should read as -- $Kn$ --.

Column 18,
Line 8, "cos" should read as -- cot --.

Column 19,
Line 61, "$_{Nyij}$" should read as -- $N\gamma_{ij}$, --.

Column 22,
Line 34, "$A2=\Psi^4$" should read as -- $A2=\omega^4$ --.

Column 23,
Line 41, "$u_x$" should read as -- $u_y$ --.

Column 24,
Line 6, "$\sigma_1$" should read as -- $\theta_1$ --.
Line 8, "$\theta$" should read as -- $\emptyset$ --.
Line 34, "cos" should read as -- cot --.

Column 27,
Line 36, "$S_{v\ o}^{n}$" should read as -- $S_{vi}^{n}$ --.

Line 60, "$\rho_2^{n+m}$" should read as -- $r_2^{n+m}$ --

Column 31,
Line 13, delete "The acoustical properties." and insert -- The routines 27 provide the connection of the material microstructural parameters to the acoustical properties. --

UNITED STATES PATENT AND TRADEMARK OFFICE

CERTIFICATE OF CORRECTION

PATENT NO. : 6,256,600 B1 
DATED : July 3, 2001
INVENTOR(S) : John Stuart Bolton et al.

It is certified that error appears in the above-identified patent and that said Letters Patent is hereby corrected as shown below:

Column 37,
Line 46, "(7)" should read as -- (*T*) --.

Column 41,
Line 46, "$x=0^{30}$," should read as -- $x=0^{+}$, --.

Column 48,
Line 8, "re" should read as -- $n^{th}$ --.

Column 50,
Line 28, the first occurrence of "n" should read as -- $n^{th}$ --.

Signed and Sealed this

Nineteenth Day of February, 2002

*Attest:*

JAMES E. ROGAN

*Attesting Officer* *Director of the United States Patent and Trademark Office*